US008612189B2

(12) United States Patent
Golinveaux et al.

(10) Patent No.: US 8,612,189 B2
(45) Date of Patent: Dec. 17, 2013

(54) SYSTEM AND METHOD FOR EVALUATION OF FLUID FLOW IN A PIPING SYSTEM

(75) Inventors: James E. Golinveaux, N. Kingstown, RI (US); Vitaly Kabashnikov, Minsk (BY); Michael Mahomet, Hatfield, PA (US); Valeri Mourachko, Philadelphia, PA (US); Leonid Nikolaychik, Mequon, WI (US); Alexander Nikolayev, Newtown, PA (US); Thomas Prymak, Doylestown, PA (US); Valery Popov, Minsk (BY); Andrey Bril, Minsk (BY); Valery Babenko, Minsk (BY)

(73) Assignee: Tyco Fire Products LP, Lansdale, PA (US)

( * ) Notice: Subject to any disclaimer, the term of this patent is extended or adjusted under 35 U.S.C. 154(b) by 948 days.

(21) Appl. No.: 12/089,034

(22) PCT Filed: Oct. 3, 2006

(86) PCT No.: PCT/US2006/038360
§ 371 (c)(1),
(2), (4) Date: May 11, 2010

(87) PCT Pub. No.: WO2007/041455
PCT Pub. Date: Apr. 12, 2007

(65) Prior Publication Data
US 2010/0299122 A1     Nov. 25, 2010

Related U.S. Application Data

(60) Provisional application No. 60/722,401, filed on Oct. 3, 2005.

(51) Int. Cl.
*G06G 7/48*     (2006.01)
(52) U.S. Cl.
USPC .......................................................... 703/6

(58) Field of Classification Search
USPC .............................................................. 703/6
See application file for complete search history.

(56) References Cited

U.S. PATENT DOCUMENTS

| 5,062,068 A | 10/1991 | Kondo et al. |
| 5,414,641 A | 5/1995 | Shinoaki et al. |

(Continued)

FOREIGN PATENT DOCUMENTS

WO     WO/03/100555     12/2003

OTHER PUBLICATIONS

B. Karney and D. Mcinnis; Efficient Calculation of Transient Flow in Simple Pipe Networks; Journal of Hydraulic Engineering, Jul. 1992; pp. 1014-1030; vol. 118, No. 7; Toronto, Canada.

(Continued)

*Primary Examiner* — Dwin M Craig
(74) *Attorney, Agent, or Firm* — Perkins Coie LLP

(57) ABSTRACT

A method of and a computer program for analyzing models of dry pipe systems. The computer program includes a user interface and a model generator in communication with the user interface. The method and computer program provide for modeling a referential dry pipe system as a plurality of interconnected nodes, the nodes corresponding to a pipe connector, the interconnection between the nodes corresponding to a pipe device. The plurality of nodes can define a dry portion and a wet portion with the wet portion including a liquid source and the dry portion including a plurality of interconnected pipes to define a volume of gas. The nodes in the dry portion can define a set of nodal devices open to ambient. The method and computer program can provide for computing fluid time based parameters to simulate the liquid flowing from the wet portion to determine at least flow time of the liquid from the wet portion to the open devices. The method and computer program can provide for verification of the liquid flow time in the model within 20% of an actual liquid flow time in the referential dry pipe system.

64 Claims, 21 Drawing Sheets

(56) References Cited

U.S. PATENT DOCUMENTS

| | | | |
|---|---|---|---|
| 5,550,761 | A | 8/1996 | Pauchon et al. |
| 5,592,397 | A | 1/1997 | Shinoaki et al. |
| 5,808,905 | A | 9/1998 | Normann et al. |
| 5,950,150 | A * | 9/1999 | Lloyd et al. .............. 702/183 |
| 6,028,992 | A | 2/2000 | Henriot et al. |
| 6,223,140 | B1 | 4/2001 | Monadjemi |
| 6,324,490 | B1 | 11/2001 | Johansson et al. |
| 6,359,434 | B1 | 3/2002 | Winslow et al. |
| 8,065,110 | B2 | 11/2011 | Golinveaux et al. |
| 2002/0009015 | A1 | 1/2002 | Laugharn, Jr. et al. |
| 2005/0072580 | A1* | 4/2005 | Jackson .................. 169/16 |
| 2005/0216242 | A1 | 9/2005 | Flax et al. |
| 2010/0174516 | A1 | 7/2010 | Nikolayev et al. |

OTHER PUBLICATIONS

K. Linder; "The" Sprinkler Program; Journal of Fire Protection Engineering; 1993; pp. 11-16; V. 1.2, Software Review, SAGE Publications.

R. Wells and R. Allen; Sprinkmod—pressure and discharge simulation model for pressurized irrigation systems., 2. Case study; Irrigation Science; Jan. 1999; pp. 149-156; vol. 18, No. 3; Springer-Verlag.

Communication Re: Supplementary European Search Report; EP Application 03729004.6-1225; May 23, 2007 (4 pages).

International Preliminary Examination Report; International Application No. PCT/US03/15666; Aug. 6, 2004 (3 pages).

International Search Report; International Publication No. WO 2003/100555; Jul. 29, 2004 (3 pages).

Ryan W. Massey, Letter from representative of Third Party Consortium Re: U.S. Patent Publication No. 2005/0216242 (Jun. 28, 2006).

Soonil Nam & Hsiang-Cheng Kung, Technical Report: FMRC J.I. 0T0R8.RA, "Theoretical Prediction of Water Delay Time of Dry-Pipe Sprinkler Systems in the Event of Fire," 78 pages (Oct. 1993 Factory Mutual Research).

James Golinveaux, "A Technical Analysis: Variables That Affect the Performance of Dry Pipe System," 24 pages, (Sep. 2002 Tyco Fire & Building Prods.).

National Aeronautics and Space Administration (NASA) Mass Flow Choking [online], [retrieved by Third Party on May 3, 2006], Retrieved from the Internet:<URL:http://www.grc.nasa.gov/WWW/K-12/airplane/mflchk.html>.

National Aeronautics and Space Administration (NASA), Mass Flow Choking (updated May 18, 2006) [online], [retrieved on Mar. 19, 2007], Retrieved from the Internet: <URL:http://www.grc.nasa.gov/WWW/K-12/airplane/mflchk.html>.

Ken Edwards, Pipe Network Calculator Hardy Cross Darcy Weisbach or Hazen Williams Losses [online] [retrieved by Third Party on May 3, 2006].

Ken Edwards, Example from of Newsletter vol. 5, No. 8, (Oct. 9, 2003 LMNO Engineering, Research, and Software, Ltd.) [online] [retrieved on Aug. 15, 2006] Retrieved from the Internet:<URL:http://www.lmnoeng.com/Pipes/example3(4).htm>.

Ed Seykota, Friction Studies, Sections re: Reynolds Number and Moody Diagram (1999) [online] [retrieved by Third Party on May 3, 2006] Retrieved from the internet: <URL:http://www.seykota.com/rm/friction/friction.htm>.

Ed Seykota, Friction Studies (1999) [online] [retrieved Mar. 20, 2007] Retrieved from the Internet:<URL:http://www.seykota.com/rm/friction/friction.htm>.

Fred K. Forster, Incompressible Pipe Flow Equations, 3 pages (May 28, 2004) [online] [retrieved by Third Party] Retrieved from the Source: pipeqs.tex.

Fred K. Forster, Incompressible Pipe Flow Equations, 3 pages (May 28, 2004) [online] [retrieved by Third Party] [retrieved on Mar. 20, 2007] Retrieved from the Internet: <URL:http://faculty.washington.edu/forster/classes/common_material/pipe-flow-equations. pdf>.

Accutech 2000 Pty Ltd, Fluid Flow and Engineering Software: Application Note No. 1 & Consulting (2000, 2006) [online] [retrieved by Third Party on May 3, 2006] Retrieved from the Source: http://www.accutech2000.com.au/Support_FF/Comparison.html & http://www.accutech2000.com.au/Consulting/Project%20Services.html.

Accutech 2000 Pty Ltd, Fluid Flow and Engineering Software: Application Note No. 1 (2000, 2006, 2007) [online] [retrieved on Mar. 20, 2007] Retrieved from the Internet:<URL:http://www.accutech2000.com.au/Support_FF/Comparison.html>.

Accutech 2000 Pty Ltd, Fluid Flow and Engineering Software: Home Page & Software Selector (2000, 2006, 2007) [online] [retrieved on Apr. 20, 2007] Retrieved from the Internet:<URL: http://www.accutech2000.com.au/> & <http://www.accutech2000.com.au/Selector.html>.

Accutech 2000 Pty Ltd, Fluid Flow and Engineering Software: FLUIDFLOW$^3$ (2000, 2006, 2007) [online] [retrieved on Sep. 17, 2007] Retrieved from the Internet:<URL: http://www.accutech2000.com.au/FluidFlow3/F3_Contents.html> & links thereon.

Accutech 2000 Pty Ltd, Fluid Flow and Engineering Software: Piping Systems Fluid Flow & Application Note: Fixed fire protection & booster/spray sprinkler design (2000, 2006, 2007) [online] [retrieved on Apr. 20, 2007]; Retrieved from the Internet:<URL: http://www.accutech2000.com.au/FluidFlow/Introduction.html>; <http://www.accutech2000.com.au/Applications/FixedFire_Intro.html> & <http://www.accutech2000.com.au/Applications/FixedFire_Compare.html>.

Accutech 2000 Pty Ltd, Fluid Flow and Engineering Software: Software packages by name & descriptions of same (2000, 2006, 2007) [online] [retrieved on Apr. 20, 2007] Retrieved from the Internet:<URL: http://www.accutech2000.com.au/SoftwareByName.html> & links thereon.

Reynolds Number [online] [retrieved by Third Party on May 3, 2006]; Retrieved from the Source: http://en.wikipedia.org/wiki/Reynolds_number.

Reynolds Number (rev. Apr. 19, 2007) [online] [retrieved on Apr. 20, 2007]; Retrieved from the Internet:<URL: http://en.wikipedia.org/wiki/Reynolds_number>.

Louis C. Burmeister, Convective Heat Transfer, (2nd Ed. 1993), p. 193, [retrieved by Third Party].

Louis C. Burmeister, Convective Heat Transfer, Ch. 5: "Laminar Boundary Layers," (2nd ed. 1993), pp. 160-225, A Wiley-Interscience Publication, New York.

Robert W. Fox & Alan T. McDonald, "Introduction to Fluid Mechanics," pp. 40, 126, 246 & 247, [retrieved by Third Party].

Robert W. Fox & Alan T. McDonald, "Introduction to Fluid Mechanics," Ch. 2: "Fundamental Concepts," pp. 18-48; Ch. 4: "Basic Equations in Integral Form for a Control Volume," pp. 95-200; Ch 6: Incompressible Inviscid Flow, pp. 241-294, (3rd ed. 1985), John Wiley & Sons.

Robert A. Granger, Fluid Mechanics, pp. 199, 200, 296, 379, 380, 382 & 383 (1985 & 1995) [retrieved by Third Party]; pp. 381, (1985 & 1995) [retrieved by Third Party].

Robert A. Granger, Fluid Mechanics, Ch. 4: "Differential Forms of Fluid Behavior" pp. 153-232, Ch. 5: "Integrated Forms of Fluid Behavior," pp. 233-339; Ch. 7, "Dimensional Analysis and Similitude," pp. 359-414, (1985 & 1995), Dover Publications, New York.

Graham B. Wallis, One-dimensional Two-phase Flow, pp. 57, 288 & 289 [retrieved by Third Party] (1969) McGraw-Hill.

Graham B. Wallis, One-dimensional Two-phase Flow, Ch. 3: "Separated Flow," pp. 43-88, Ch. 10: "Slug Flow," pp. 282-314, (1969) McGraw-Hill.

John D. Anderson, Jr., Modern Compressible Flow, p. 87, (2nd. ed.) [retrieved by Third Party]; Ch. 3: "One-Dimensional Flow," pp. 45-99, (2nd ed. ).

John D. Anderson, Jr., Modern Compressible Flow, Ch. 3: "One-Dimensional Flow," pp. 45-99, (2nd ed. ).

Bruce R. Munson, Donald F. Young & Theodore H. Okiishi, Fundamentals of Fluid Mechanics, p. 481 (4th ed.) [retrieved by Third Party].

Bruce R. Munson, Donald F. Young & Theodore H. Okiishi, Fundamentals of Fluid Mechanics, Ch. 8: "Viscous Flow in Pipes," pp. 443-531, (4th ed. 2002), John Wiley & Sons.

(56) References Cited

OTHER PUBLICATIONS

David Halliday, Robert Resnick with the assistance of W. Farrell Edwards and John Merrill; Fundamentals of Physics, p. 408-409 (2nd ed. 1970, 1974, 1981 and 1986), Revised Printing [retrieved by Third Party].

David Halliday, Robert Resnick with the assistance of W. Farrell Edwards and John Merrill; Fundamentals of Physics, Ch. 21: Kinetic Theory of Gases, pp. 407-432, (2nd ed. 1970, 1974, 1081 and 1986), John Wiley & Sons, Inc.

Engineering Department of Crante, Flow of Fluids Through Valves, Fittings, and Pipe, Technical Paper No. 419, pp. 2-8 & 2-9 [retrieved by Third Party] CRANE, Summary of Formulas, Ch. 3: Formulas and Monograms for Flow Through Valves, Fittings, and Pipe, p. 1-2 [retrieved by Third Party].

Engineering Department of Crane, Ch. 1-1: Theory of Flow in Pipe, pp. 1-1 to 1-10, Ch. 2-1: "Flow of Fluids Through Valves and Fittings," pp. 2-1 to 2-16, (1957), Crane Co., Chicago 5, Illinois.

David J. Leblanc, Dry Pipe Sprinkler Systems—Effect of Geometric Parameters on Expected Number of Sprinkler Operations, 69 pages, (Sep. 2001, Tyco Fire Products) [provided by Third Party].

Kenneth E. Isman, P.E., "Beyond NFPA 30—1996 Edition," 1 page, Sprinkler Quarterly (Fall 1997) [provided by Third Party].

1998 MUFC Guidebook—Sprinklers, "Automatic Sprinkler Systems," pp. 270-307 [provided by Third Party].

Russel P. Fleming P.E., NFPA Journal, "Predicting Water Delivery in Dry Pipe Systems" at 24, 108 (Jul./Aug. 2002).

Flowmaster USA, Inc. "Modeling a Dry Fire Sprinkler System Using Flowmaster's Priming Module," 7 pages, (Feb. 2002) [provided by Third Party].

The MathWorks, Inc. Flowmaster: Fluid system modeling, simulation and control. [online] (1994-2006) [retrieved on Aug. 15, 2006] Retrieved from the Internet:<URL: http://www.mathworks.com/products/connections/product_main.html?prod_id=283>.

SPG Media Limited. Flowmaster—Fluid Flow Analysis Software for Power Generation Water Piping Networks [online] (2006) [retrieved on Aug. 15, 2006] Available at Internet:<URL: http://web.archive.org/web/20060907103856/www.power-technology.com/contractors/front/flowmaster/>.

Flowmaster International Ltd. Flowmaster—Applications & Links Thereon [online] 66 pgs. (2003) [retrieved on Aug. 15, 2006] Available at Internet: <URL: http://web.archive.org/web/20060314043159/www.flowmaster.com/applications.html>.

Atkinsopht Streamlines: Fluid Flow in Networks [online] 5 pgs. (Feb. 13, 2005) retrieved by Third Party on Mar. 16, 2005] Retrieved from the Internet<URL: http://www.atkinsopht.com/eng/strmlins.htm>.

Faast Software. Fast Software: Brochure for Prospective Users [online] 10 pgs. (1998) [retrieved by Third Party on Mar. 16, 2005] Retrieved From the Internet: <URL:http://www.faast.com/fst3info.htm>.

C & R Technologies. Introduction to FLUINT. Tutorial [online] 41 pgs. (v4.7 Rev. 0 Oct. 20, 2004) [retrieved by Third Party Jun. 28, 2006] Retrieved from the Internet:<URL: http://www.crtech.com/docs/tutorials/fluint_intro.pdf>.

Advanced FLUINT Topics (Version 4.5) Power Point Presentation [online] C & R Technologies (unknown), 35 pgs. [retrieved by Third Party Jun. 28, 2006] Retrieved from the Internet<URL: http://www.crtech.com/docs/training/fluint/AdvF-Class.pdf.

Anonymous. Flat Front Propagation in SINDA/FLUINT: Line Filling Methods in Complex Networks (unknown) 8 pgs. [retrieved by Third Party Jun. 28, 2006].

SINDA/FLUINT: Version (unknown) User's Manual, Sections 3.15 to 3.15.2. C & R Technologies, (unknown ), pp. 3-192 to 3-195 [provided by Third Party Jun. 28, 2006].

C & R Technologies. SINDA/FLUINT: Version 5.0. User's Manual (2006) (Patch 3 Updated Feb. 2007) [retrieved Oct. 21, 200] pp. i-lviii; 1-1 to 1-22; 3-1 to 3-434; 5-1 to 5-114; Appen. E & Index. Retrieved from the Internet.<URL: http://www.crtech.com/docs/manuals/sf50main.pdf>.

Jane Bauman & Brent A. Cullimore. Nonlinear Programming Applied to Calibrating Thermal and Fluid Models to Test Data. Semiconductor Thermal Measurement & Management (Semi-Therm) 18$^{th}$ Symposium; IEEE Press 2002. 6 pgs. [retrieved on Jan. 22, 2008] Retrieved from the Internet:<URL: http://www.crtech.com/docs/papers/2002/calibrating.pdf.

Brent A. Cullimore & David A. Johnson. Control Volume Interfaces: A Unique Tool for a Generalized Fluid Network Modeler. American Institute of Aeronautics and Astronautics (AIAA) Thermophysics Conference 2000. 9 pgs. [retrieved on Jan. 22, 2008] Retrieved from the Internet:<URL: http://www.crtech.com/docs/papers/ifaces.pdf>.

Brent A. Cullimore. Optimization, Data Correlation, and Parametric Analysis Features in SINDAD/FLUINT 4.0. 28$^{th}$. Intn'l; Conference on Environmental Systems Jul. 13-16, 1998. SAE Technical Paper Series, SAE International. 10 pgs. [retrieved on Jan. 22, 2008] Retrieved from the Internet<URL: http://www.crtech.com/docs/papers/sf981574.pdf>.

Brent A. Cullimore & Jane Baumann Steady State and Transient Loop Heat Pipe Modeling. Society of Automotive Engineers 2000. 9 pgs. [retrieved on Jan. 22, 2008] Retrieved from the Internet<URL: http://www.crtech.com/docs/papers/lhp.pdf>.

C&R Technologies. Re: Flat front two-phase (fill-purge simulations). (C&R User Community) [online]. Nov. 28, 2007 [retrieved on Jan. 22, 2008] Retrieved from the Internet<URL: http://www.crtech.com/forum/viewtopic.php?p=965&sid=c1c96a0ebcddff7fc6ebbfc5eb332a8b>.

C&R Technologies. Products—SINDA/FLUINT—Two Phase Flow [online] (1999-2007) [retrieved Jan. 22, 2008] Retrieved from the Internet<URL: http://www.crtech.com/twoPhase.html>.

C&R Technologies. SINDA/FLUINT Version 4.8 Training Notes. [online] 99 pgs. [retrieved Jan. 22, 2008] Retrieved from the Internet<URL: http://www.crtech.com/docs/training/sinda/sclass.pdf >.

Iklim. Fires & Hotels—Fire Sprinkler Design Software [online] [retrieved by Third Party on Mar. 16, 2005] Retrieved from the Internet: <URL:http://www.iklimnet.com/hotelfires/firesoftware.htm>; now available at Internet:<URL: http://web.archive.org/web/20040904084050/www.iklimnet.com/hotelfires/firesoftware.html >.

OmniCADD, Inc. Custom Software Designers, OmniCADD SDS [online] [retrieved Aug. 15, 2006] Retrieved from the Internet:<URL: http://www.iklimnet.com/hotelfires/firesoftware.htm> and link thereon>; now available at Internet<URL:http://web.archive.org/web/20040806135715/www.omicadd.com/products.htm>.

Hydratec Inc., HydraCALC™ Hydraulic Estimating Software [online] (2006) [retrieved Aug. 15, 2006] Retrieved from the Internet<URL: http://www.iklimnet.com/hotelfires/firesoftware.htm> and link thereon>; now available at Internet:<URL: http://web.archive.org/web/20060619114914/www.hydratecinc.com/HydraCALC_V50.htm >.

Hydratec Inc., HydraLIST™ Stocklisting Software [online] (2006) [retrieved Aug. 15, 2006] Retrieved from the Internet:<URL: http://www.iklimnet.com/hotelfires/firesoftware.htm> and link thereon>; now available at Internet:<URL: http://web.archive.org/web/20060619114830/www.hydratecinc.com/HydraLIST.htm>.

Hydratec Inc., HydraBID™ Estimating Software [online] (2006) [retrieved Aug. 15, 2006] Retrieved from the Internet:<URL: http://www.iklimnet.com/hotelfires/firesoftware.htm> and link thereon>; now available at Internet:<URL: http://web.archive.org/web/20060619114641/www.hydratecinc.com/HydraBID.htm>.

Hydratec Inc., HydraCAD™ Design Software [online] (2006) [retrieved Aug. 15, 2006] Retrieved from the Internet:<URL: http://www.iklimnet.com/hotelfires/firesoftware.htm> and link thereon>; now available at Internet<URL: http://web.archive.org/web/20060619114519/www.hydratecinc.com/HydraCAD.htm>.

Hydratec Inc., HydraCALC-Sizer™ Hydraulic Estimating Software [online] (2006).[retrieved Feb. 1, 2008] Retrieved from the Internet:<URL: http://web.archive.org/web/20060619114519/www.hydratecinc.com/HydraCAD.htm>.

Elite Software Development, Inc. Fire—Fire Sprinkler System Design [online] (2006) [retrieved Aug. 15, 2006] Retrieved from the Internet: <URL:http://www.iklimnet.com/hotelfires/firesoftware.htm> and link thereon>; now available at Internet<URL: http://web.archive.org/web/20060820154933/www.elitesoft.com/web/fire/elite_fire_info.html >.

(56) References Cited

OTHER PUBLICATIONS

FireAcad, Various Products: CalcPlus, FireAcal and FireAcad [online] (1999) (updated Apr. 29, 2005) [retrieved Aug. 15, 2006] Retrieved from the Internet: <URL: http://www.iklimnet.com/hotelfires/firesoftware.htm> and link thereon>; now available at Internet<URL: http://web.archive.org/web/20060926103917/www.fireacad.com/products.htm and links thereon>.

Proto-Power Corp., Software-Proto-Sprinkler™ [online] (2006) [retrieved Aug. 15, 2006 and on Feb. 1, 2008] Retrieved from the Internet: <URL: http://www.iklimnet.com/hotelfires/firesoftware.htm> and link thereon>; now available at Internet:<URL: http://www.protopower.com/index.php?page=>.

Sunrise Systems Limited. Pipenet, Spray/Sprinkler Module, [online] (2006) [retrieved Aug. 15, 2006] Retrieved from the Internet<URL: http://www.sunrises-sys.com/spray_sprinkler.asp>.

Sunrise Systems Limited. Pipenet—Transient Module [online] (1999) 3 pgs. [retrieved on Feb. 1, 2008] Retrieved from the Internet: <URL: http://www.microtechno.net/Mt-bropc/Pipenet_trans.pdf>.

Sunrise Systems Limited. Pipenet: Leading the Way in Fluid Flow Analysis (Brochure) [online] (unknown) 6 pgs. [retrieved on Feb. 1, 2008] Retrieved from the Internet:<URL:http://www.epcmart.co.kr/spboard/board.cgi?id=epcmart_data&action=download&gul=15>.

Nor-Par a.s. Pipenet: Fluid Flow in piping networks [online] (unknown) [retrieved on Feb. 1, 2008] Retrieved from the Internet:<URL: http://www.norpar.com/pipenet.html>.

Sunrise Systems Limited. Sunrise Systems Pipenet Vision: Detailed Demonstration and Discussion of Applications [online] (unknown) 77 pgs. [retrieved on Feb. 1, 2008] Retrieved from the Internet: <URL: http://www.norpar.com/brochures/pipenet/pipenet_detailed.ppt>.

Sunrise Systems Limited. Various Examples [online] (1997-2002) 94 pgs. [retrieved on Feb. 1, 2008] Retrieved from the Internet:<URL: http://www.norpar.com/brochures/pipenet/Pipenet_Transient_examples.pdf>.

FPE Software. Inc., "The" Sprinkler Program 2001: Features [online] (2002) [retrieved Aug. 15, 2006] Retrieved from the Internet, now available at Internet:URL<http://web.archive.org/web/20050405103937/http://www.fpesoftware.com/>.

Hrs Systems, Inc., An Introduction to Hass, [online] (2002) [retrieved on Aug. 15, 2006] Retrieved from the Internet, now available at Internet: URL<http://web.archive.org/web/20050305222606/www.hrssystems.com/introto.htm>.

Hydronics Engineering, (Various) Hydronics, PayPerCalc & Hydraulics [online] (2004) (2006) [retrieved Aug. 15, 2006] Retrieved from the Internet <URL:http://www.hydronicseng.com> and links thereon.

Sigma Ingenieurgesellschaft mbH, SPRINK: Calculation of Pressure Drop in Sprinkler Systems, [online] (2006) [retrieved Aug. 15, 2006] Retrieved from the Internet, now available at Internet:URL <http://web.archive.org/web/20060316163957/www.rohr2.com/SPRINK_Program_description.pdf>.

M.E.P. CAD, AutoSPRINK VR: Features [online] (unknown) [retrieved Aug. 15, 2006] Retrieved from the Internet, now available at Internet<URL:http://web.archive.org/web/20060810030235/http://www.autosprink.com/ and links thereon>.

Tim Frost Design Services, Inc. Calcer Hyd Prog Version 3.0, [online] (2006) [retrieved Aug. 15, 2006] Retrieved from the Internet, now available at Internet<URL: http://web.archive.org/web/20060717201554/www.tfdsi.com/calcer.htm>.

KYPipe, LLC., Pipe2000: GoFlow [online] (unknown) [retrieved Aug. 15, 2006]. Retrieved from the Internet<URL:http://www.kypipe.com/goflow-features-print.htm>.

Extended European Search Report issued in related co-pending European Application No. 06815980.5; Feb. 7, 2013, 9 pages.

Examination Report issued in related co-pending Canadian Application No. 2,624,547, Apr. 8, 2013, 4 pages.

U.S. Appl. No. 12/573,013; Patent Publication No. 2010-0174516, Non-Final Office Action, Mar. 27, 2013, 33 pages.

* cited by examiner

| Calculations | | | |
|---|---|---|---|
| System | | | |
| Fluid: | Water @ 40F (4.0C) | Gas Pressure (psi): | 40 |
| Gas: | Air | Gas Temperature (°F): | 39.9 |
| HeadSet | | | |
| Name: | Headset_1 | Monitoring Time (s): | 10 |
| Req.W. Delivery Time (s): | Air | Time Step (s): | 0.1 |

Dry Pipe Valve
Single Interlock Preaction System: ☐
Differential Trip Ratio: 5.5
DPV Trip Time (s): 0

Accelerator
⦿ No   ○ Yes
Differential Pressure (psi):
Fixed Trip (s):

System Volume
630.1 (gal)

Calculate Time
○ Trip    ○ W. Delivery    ⦿ Operating

[ Analysis... ]  [ Run ]  [ Close ]

*Fig. 6B*

SYSTEM AND METHOD FOR EVALUATION OF FLUID FLOW IN A PIPING SYSTEM

PRIORITY DATA AND INCORPORATION BY REFERENCE

This application is a 35 U.S.C. 371 application of International Application No. PCT/US2006/038360, filed Oct. 3, 2006, which claims priority to U.S. Provisional Patent Application No. 60/722,401, filed Oct. 3, 2005, and each of which is incorporated by reference in its entirety. Further incorporated herein in its entirety by reference thereto is U.S. patent application Ser. No. 10/942,817 filed Sep. 17, 2004, published as U.S. Patent Publication No. 2005/0216242, and entitled "SYSTEM AND METHOD FOR EVALUATION OF FLUID FLOW IN A PIPING SYSTEM." Further incorporated herein in its entirety by reference thereto is software user manual "SPRINKFDT™ SPRINKCALC™: SprinkCAD Studio User Manual" (September 2006).

TECHNICAL FIELD

This invention relates generally to pipe system modeling. More specifically, the present invention provides a preferred computerized system and methodology for modeling a dry sprinkler fire protection system to determine time based parameters of performance including, for example, trip time, transit time, and operating time.

BACKGROUND OF THE INVENTION

The modeling of real-world systems through mathematics has been utilized to determine how systems response to real-world inputs. Due to the nature of such modeling, computers are often used to assist in such modeling. The modeling of liquid and gas flow in piping network presents a situation in which the more detailed the piping network, the more difficult it is to model such piping network. One area of modeling in piping network is the determination of the location of the liquid front as the liquid moves through the piping that was previously occupied by another liquid or gas. Where the liquid is moving through a single uniform straight pipe, it is believed that an accurate model, i.e., an analytical model, of the characteristics of the liquid can be obtained. Where a movement of the liquid is initiated at some point in a large network of branching pipes so that the liquid flows through the network thereafter.

These complex piping networks are utilized in the fire protection industry, and, in particular for providing a sprinkler system. In certain sprinkler systems, the pipe is filed with a gas and liquid enters the piping network once the gas is expelled from the piping network by actuation of a sprinkler. These pipe networks are known as "dry pipe" sprinkler systems. Dry pipe sprinkler systems are typically utilized in areas that are unheated and that are subjected to freezing temperatures. In contrast to a 'standard' wet sprinkler system in which the pipes supplying sprinklers are refilled with water under constant pressure, the sprinkler piping for a dry system is, preferably, filled with air under pressure. In at least one form of dry system, the air pressure in the system can be used to hold a dry pipe valve closed, and the valve can be opened upon with a loss of air pressure in the system. The actuation of one or more sprinklers will allow air to escape the piping network and result in the tripping of the dry pipe valve and the filling of the piping network with water (to the sprinklers). By nature, a dry sprinkler system is slower in to respond with a fluid discharge in response to fire conditions as compared to a wet system because the air must first be exhausted from the system.

The use of dry pipe sprinkler systems can require compliance with one or more standards or codes. For example, owners or operators of dry pipe sprinkler systems are required to demonstrate certain physical characteristics of the dry pipe system as a function of time by a physical test of an actual system, where the actual system has a volume capacity greater than 750 gallons and in certain cases where the system volume is greater than 500 gallons as set forth in National Fire Protection Association ("NFPA") in NFPA 13 "The Standard for the Installation of Sprinkler Systems," 2002 Edition, which is hereby in its entirety incorporated by reference. Assuming NFPA 13 remains the governing standard for the sprinkler system, if an election is made to install a system requiring actual physical testing, and such a system fails, the system would have to be modified or re-designed and re-installed to conform within the requirements of NFPA 13. Accordingly, it is believed to be advantageous to be able to model a dry pipe sprinkler system in order to provide or determine performance characteristics such as, for example, the evacuation of the air from a dry system upon actuation or the tripping of a dry pipe valve, the location of the flow front of the liquid through the system, and the respective time required to do so prior to actual system construction and/or in lieu of actual physical system testing.

Performance of a physical system test introduces water into the piping system. Following the test, the water is drained from the system prior to re-introducing air pressure. Often, water is trapped within the pipes and causes freezing problems after the system is put into service. Another effect of introducing water into the piping network, draining it, and filling the system with air is that any residual moisture can settle and cause premature corrosion within the steel pipe. Hence, it is desirable to avoid actual testing.

Historically, one manner of avoiding actual testing included restricting the system size on the basis of the volume of air that is trapped in the system to avoid any type of actual testing. For example, NFPA 13 provides for certain dry pipe sprinkler systems to be installed without testing. As a result of the possibility of failing the required performance test, individuals may choose to develop systems smaller than the maximum system that could be utilized. These smaller systems would be selected so that they fall within the category of NFPA 13 of system that can be installed without performance testing. The result is that many systems in unheated warehouses, for example, that could cover a maximum of 40,000 square feet are restricted to 25,000 to 30,000 square feet on the basis of the volume limitation. This results in multiple systems being installed when fewer systems could conceivably be used. In addition, the NFPA restrictions do not recognize variations in supply pressure—a higher supply pressure will permit a higher liquid flow rate and velocity and hence assist in exhausting (or pushing) the air out of a system more quickly than would a lower pressure. Consequently, it is believed that such systems are penalized for the avoidance of the actual testing requirement and out of the concern of failing the test after the systems are installed.

Individuals have developed models to predict time-based characteristics of the dry pipe systems. It is believed that at least one known model required individuals to convert a dry pipe system under evaluation into a fixed framework or topology dictated by the model. That is, regardless of the actual design, in order to model the design, the actual design must be "translated" into the fixed topology in order for modeling to be performed. This fixed topology model, however, fails to take into account the behavior and characteristics of liquid, gas with liquid and gas flow at every point through every pipe in a dry pipe design.

In particular, as set forth in Factory Mutual Research Corporation ("FMRC") Document Index No. OTOR8.RA, October, 1993, FMRC provides for the known fixed topology model that fixes a test sprinkler head on the same branch regardless of where in the actual design the test sprinkler, as the one hydraulically farthest from the dry pipe valve, would be located. In addition, in the fixed topology model, the riser is fixed to the middle of a cross main piping regardless of where such riser is to be placed in an actual design. The known model is believed to be unreliable because of the forced translation from the arbitrary design into the fixed topology of known model. In addition to requiring a forced translation, the known model summarizes (i.e., "lumps") all branch lines before and after a main feed line (i.e., "Feed Main") as respective volumes instead of accounting for liquid flow, gas flow and liquid-gas flow behavior in each pipe.

The known model, in utilizing a forced translation and lumped volumes, provided predictive values for liquid flow that are believed to be higher than a suitable threshold for individuals (e.g., engineer, architects, planners, contractors and jurisdictional authorities) to rely upon. As such, the known model may provide a generalized technique to analyze dry pipe systems but does not account for flow through each pipe so that individuals can use the predictive results with a suitable degree of accuracy.

To address the need for modeling piping systems with a desired level of accuracy, the inventors of the present invention and preferred embodiments thereof have also discovered another system and method for evaluating fluid flow in a piping system. The embodiments of the system and method are disclosed in U.S. patent application Ser. No. 10/942,817 filed Sep. 17, 2004, now published as U.S. Patent Publication No. 2005/0216242. However the methods and systems described therein are directed towards the dry portion of a dry pipe system without fully addressing the interaction of the wet portion with the dry portion.

DISCLOSURE OF INVENTION

The present invention provides for a system and method to model a complex system of pipes accurately. This model takes into account the physical processes in every part of a tree-type piping system and provides for an accurate modeling of a real world tree-type piping system. In addition, the model can take into account a piping system having at least one loop. The preferred embodiments of this model have been verified by comparisons against known tree-type piping systems. Thus, the present invention provides a schema to determine liquid flow, gas flow and their interactions in piping systems that was heretofore believed to be unavailable.

One preferred embodiment of the present invention provides a method of analyzing a dry pipe system. The method preferably includes configuring a model of at least a referential dry pipe system having a wet portion including a liquid source and a dry portion defining a volume of gas. The method further includes computing fluid flow from the wet portion to the dry portion including computing the flow time from the wet portion to a portion of the dry portion. The computing preferably provides verification of the fluid flow time in the model within 20% of an actual liquid in the at least one referential dry pipe system.

In another preferred embodiment of the method, configuring the model includes interconnecting a plurality of nodes to define the wet portion and the dry portion. The nodes correspond to a pipe connector and the interconnection between the nodes corresponding to a pipe device. Configuring the model further preferably includes configuring at least a portion of the nodes in the dry portion to define at as least one sprinkler device. The method further preferably provides configuring the model including simulating a sequence of events in which the sequence of events preferably includes sequencing opening a plurality of nodes so as to simulate at least one of sequential opening of the sprinklers in the dry portion.

In yet another preferred embodiment of the method, computing fluid flow includes generating a system of equations describing a motion of the liquid flow over time in the wet and dry portions and altering the system of equations depending on whether the system is provided with gas interacting with the liquid fronts in any of the pipes in the system. The computing the fluid flow further preferably includes estimating the time duration of a pressure of the gas to be below a threshold pressure when the gas is permitted to escape from the at least one sprinkler device open to ambient.

The preferred embodiments of the present invention have reliably predicted a transit time of liquid flow through referential tree-type piping systems by evaluating the flow of liquid, gas or mixture thereof through each pipe of the tree-type piping system. The preferred embodiments employ at least one computational engine that is capable of predicting time based response characteristics of known referential tree-type piping systems within a variance or error of 12%, 7%, 3%, 4%, 1% and even 0% depending on the referential system employed.

In the preferred embodiments, the behavior and characteristics of at least one of the liquid and gas flow at every point in the piping system are accounted for in the piping system. By accounting for the behavior and characteristics of the liquid, gas or mixture thereof, the preferred embodiments are capable of predicting behavior and characteristics of various liquids and fluids such as, for example, propyl alcohol, ethylene glycol, or water at every point of the piping system. In particular, the preferred embodiments estimate a time duration for gas pressure in the piping network to drop below a threshold pressure when the gas is permitted to escape from the network through an open node by: (a) determining whether a ratio of atmospheric pressure to internal pressure in the network is less than a first ratio or at least equal to a second ratio; (b) calculating that the mass flow rate of the gas as being a function of a discharge area, pressure and temperature of the discharge area from the system is less than the first ratio and the mass flow rate of the gas as being a function of a discharge area, pressure, temperature of the discharge area and a ratio of ambient pressure to pressure at the discharge area when the ratio is at least equal to the second ratio; (c) relating the mass flow rate to a change in pressure of the gas, its velocity and temperature at the discharge area; and (d) solving for a change in gas pressure in the system over time as a function of mass flow rate, temperature, velocity, and pressure at the discharge area.

The preferred embodiments also approximate a duration of time for any liquid front traveling from an initial location in the piping network to a discharge opening in the network (i.e., a transit time) by: (a) accounting for a velocity of the liquid as the liquid moves from the initial position to at least one of a segment of the network without a branch, a segment to a node with two branches, and a segment to a node with three branches in the network; (b) accounting for a representative velocity of bubbles as liquid and gas travels through the network; (c) determining the losses as the liquid moves through at least one of a segment of the network without a branch, a segment to a node with two branches, and a segment to a node with three branches in the network; and (d) determining whether gas flow in the system is one of an isentropic or isothermal process. Furthermore, the preferred embodiments determine an approximation of a change in pressure of the liquid compared to time as the liquid front travels from the initial location to the discharge opening based on the estimation of the trip time and the approximation of the transit time.

The preferred embodiments further provide for generalization with a polytropic model to describe gas behavior trapped in system pipes. Moreover the preferred embodiments can handle any configuration tree type sprinkler system and a system with at least one loop. In addition, the preferred embodiment can account for a "wet" part or portion of the dry pipe modeling system and other components of the system including valves, pumps, backflow preventers, and exhausters. The preferred embodiments can also provide for averaging calculated pressure and flow values over time steps to flatten narrow spikes on pressure and flow curves. The calculations performed in the preferred embodiments can further enhance the model of reverse movements of a waterfront while back passing a branching point during pressure/flow oscillations in addition to addressing the case where at the trip event the supply flow rate has a spike. The preferred embodiment can further provide for more accurate pressure/flow values at (near) steady state hydraulic conditions. The preferred embodiments can also model preaction systems for the case where the Dry Pipe Valve opens prior to sprinkler(s), including single-interlock, double-interlock and non-interlock preaction systems.

The preferred embodiments can also provide for graphic modeling of the system of a dry piping system including 3-D real-time simulated animation of gas and liquid flow. The preferred embodiments can further provide for rotating, copying, moving, etc to define basic and destination points, and new system orientation, when performing this operation.

The present invention also provides for, in a preferred embodiment, a computer program for analyzing models of dry pipe systems. The computer program includes a user interface and one or more computational engines. The user interface allows a model of a dry pipe system to be defined and the computational engine determines a liquid flow time through the model of the dry pipe system. The computational engine that employs the methods of the preferred embodiments, and provides a verification of the liquid flow time in a model of a referential dry pipe system within 20% of an actual liquid flow time in the referential dry pipe system.

The present invention further provides for, in another preferred embodiment, a method for use in a development of a piping system. The method can be achieved by generating at least a time-based characteristic of liquid flow through the piping system. The at least a time based characteristic has a value based on a calculation process that evaluates the physical processes of liquid and gas flow in each pipe of the piping system.

The present invention additionally provides for, in yet another preferred embodiment, a process of installing a dry pipe sprinkler system. The process can be achieved by: determining a liquid delivery time of a liquid at a sprinkler head or a nozzle when the sprinkler or nozzle is actuated in a model of a dry pipe sprinkler system; and constructing a dry pipe fire sprinkler system based on the model of the dry pipe sprinkler without physical verification of the predicted transit time. The liquid delivery time is determined to be less than a desired value. The process provides for the ability to prototype, plan and evaluate a new dry pipe system. The process also provides for the ability to retrofit an existing dry pipe system to meet desired criteria to ensure an adequate response for the existing system.

Another preferred embodiment provides for a computer program for analyzing models of dry pipe systems comprising a user interface and a model generator in communication with the user interface. The model generator can be configured to define a model of at least a referential dry pipe system. The model can include a plurality of interconnected nodes, the nodes corresponding to a pipe connector, the interconnection between the nodes corresponding to a pipe device. The plurality of nodes can define a dry portion and a wet portion with the wet portion including a liquid source and the dry portion including a plurality of interconnected pipes to define a volume of gas. At least a portion of the nodes in the dry portion can define a set of nodal devices open to ambient to further preferably define a headset. The computer program can further comprise a computational engine being configured to simulate the liquid flowing from the wet portion to the dry portion to determine gas and liquid flow characteristics of the gas and the liquid through the branches, so as to determine at least flow time of the liquid from the wet portion to the headset, the computational engine providing a verification of the liquid flow time in the model within 20% of an actual liquid flow time in the referential dry pipe system.

Another preferred embodiment provides for a method to design of a tree or loop piping system having a wet portion and a dry portion. The method comprises generating at least a time based characteristic of at least one of liquid and gas flow through the piping system in which the liquid flows from the wet portion to the dry portion. The time based characteristic can include transit time having a value based on a calculation process that evaluates the physical processes of liquid and gas flow in each pipe of the tree-type piping system.

A preferred embodiment can further provide a process of modeling a dry pipe sprinkler system. The process can comprise generating a model of the dry pipe sprinkler system as a plurality of interconnected nodes in which the nodes corresponding to a pipe connector, the interconnection between the nodes corresponding to a pipe, the plurality of nodes defining a dry portion and a wet portion. The wet portion includes a liquid source and the dry portion can include a plurality of interconnected branches to define a volume of gas. At least a portion of the nodes in the dry portion can define a headset corresponding to at least one open sprinkler head.

Another preferred embodiment according to the present invention further provides a method for use in a design of a piping system having a wet portion and a dry portion. The method includes modeling the piping system including defining a time sequence of activation for a plurality of nodal devices located in the dry portion. The modeling further preferably includes generating at least a time based characteristic of liquid and gas flow through the piping system based upon the time sequence, the liquid flowing from the wet portion to the plurality of open nodal devices. The method further preferably includes defining the time sequence for each of a plurality of nodal devices including defining a first moment in time when a first nodal device opens and at least second moment in time delayed relative to the first moment in time to define when a second nodal device opens. Preferably, the opened nodal devices include sprinkler heads. The method of modeling further preferably includes defining a moment in time when a dry pipe valve is activated and further defining the time sequence relative to the moment in time when the dry pipe valve is activated.

BRIEF DESCRIPTIONS OF THE DRAWINGS

The accompanying drawings, which are incorporated herein and constitute part of this specification, illustrate a preferred embodiment of the invention, and, together with the general description given above and the detailed description given below, serve to explain the features of the invention.

FIG. 6B is yet another illustrative preferred graphic user interface for the computer modeling program of FIG. 2 and/or FIG. 2A.

MODE(S) FOR CARRYING OUT THE INVENTION

Figure 1:
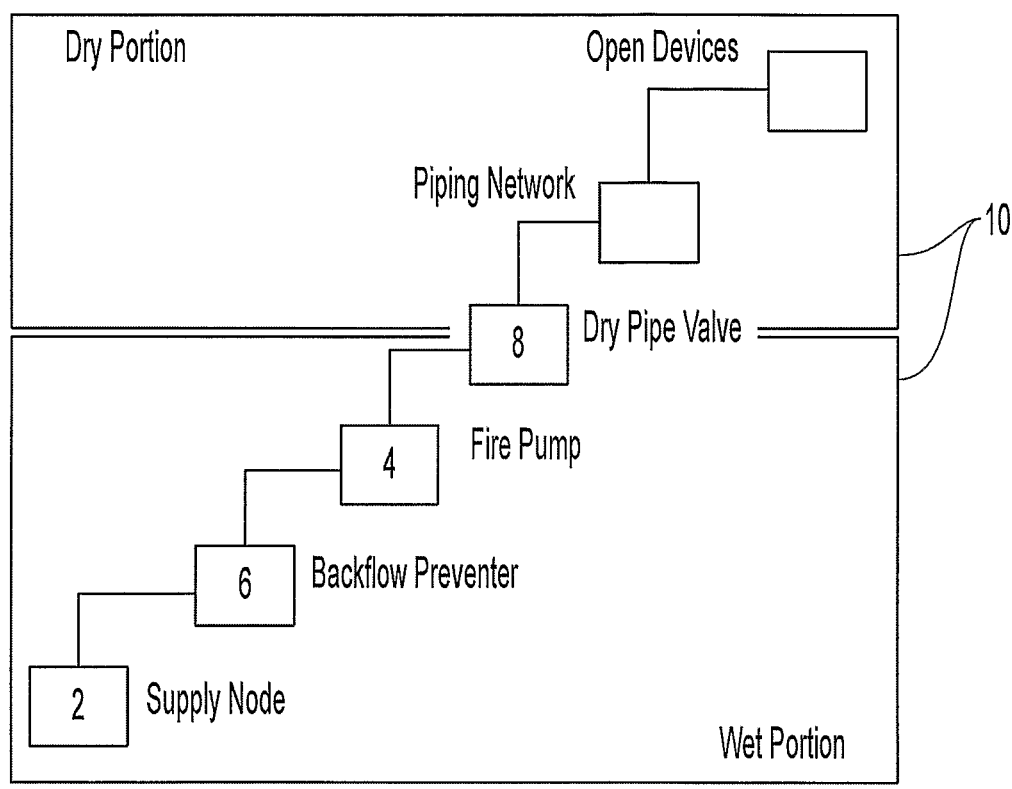
FIG. 1 is an illustrative schematic of a dry pipe system.

Shown in FIG. 1 is an illustrative schematic of a dry pipe sprinkler system 10 having a wet portion and a dry portion. The wet portion of the system 10 can include a fluid supply 2 such as, for example, water or a city water main. The wet portion can further include a fire pump 4, configured to increase the pressure of water flow from the supply 2, and a back flow preventer (BFP) 6 configured to maintain fluid flow in one direction, from the wet portion to the dry portion of the system. The dry portion of the system is preferably separated from the wet portion of the system by a dry pipe valve 8 (DPV). The dry pipe valve 8 can be configured to activate or trip to supply the liquid from the wet portion to a network of pipes, pipe fittings, sprinkler heads and/or valves (not shown) downstream of the dry valve. The network of piping downstream of the DPV 8 is filled with a gas such as, for example, air. The DPV 8 can be activated by a drop in pressure downstream of the valve thereby releasing the liquid from the wet portion into the dry portion.

Figure 2:
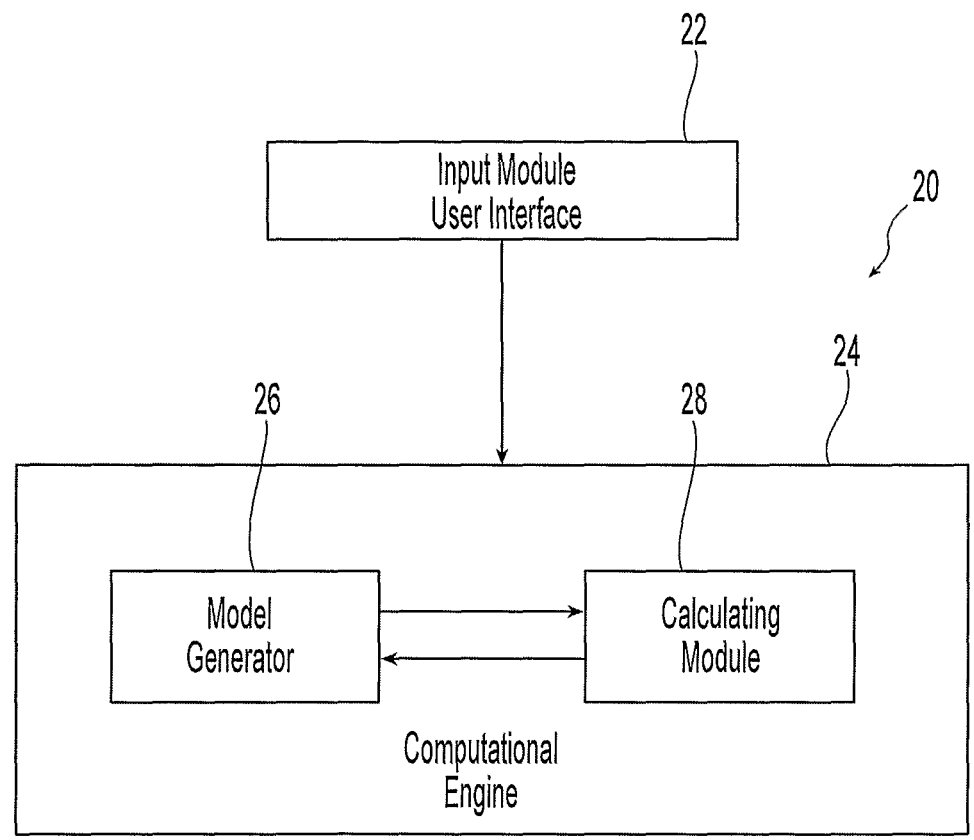
FIG. 2 is a preferred illustrative functional diagram of a computer program to model the dry pipe system of FIG. 1.

FIG. 2 shows an illustrative functional diagram of a computer program 20 configured to model a piping system such as, for example, the system 10. The computer program 20 can include a user interface or input module 22 in communication with one more computational engines 24. The input module 22 can be configured to provide an interface for a sprinkler system designer to enter parameters, requirements and elements of the system 10 to be modeled. The computational engine 24 can include a model generator 26 for building the model from the input module 22. In addition, the computational engine 24 can include a database of piping elements and characteristics to build the model of the system 10. The computational engine 24 can further include a calculating module 28 in communication with the model generator 26 to be able to simulate gas and liquid flow through the system 10 as the fluid moves from the wet portion to the dry portion such that the liquid of the wet portion displaces the gas in the dry portion. Moreover the calculating module 28 can be configured to determine gas and liquid flow characteristics throughout the piping system 10 over a time period of fluid flow.

Figure 2A:
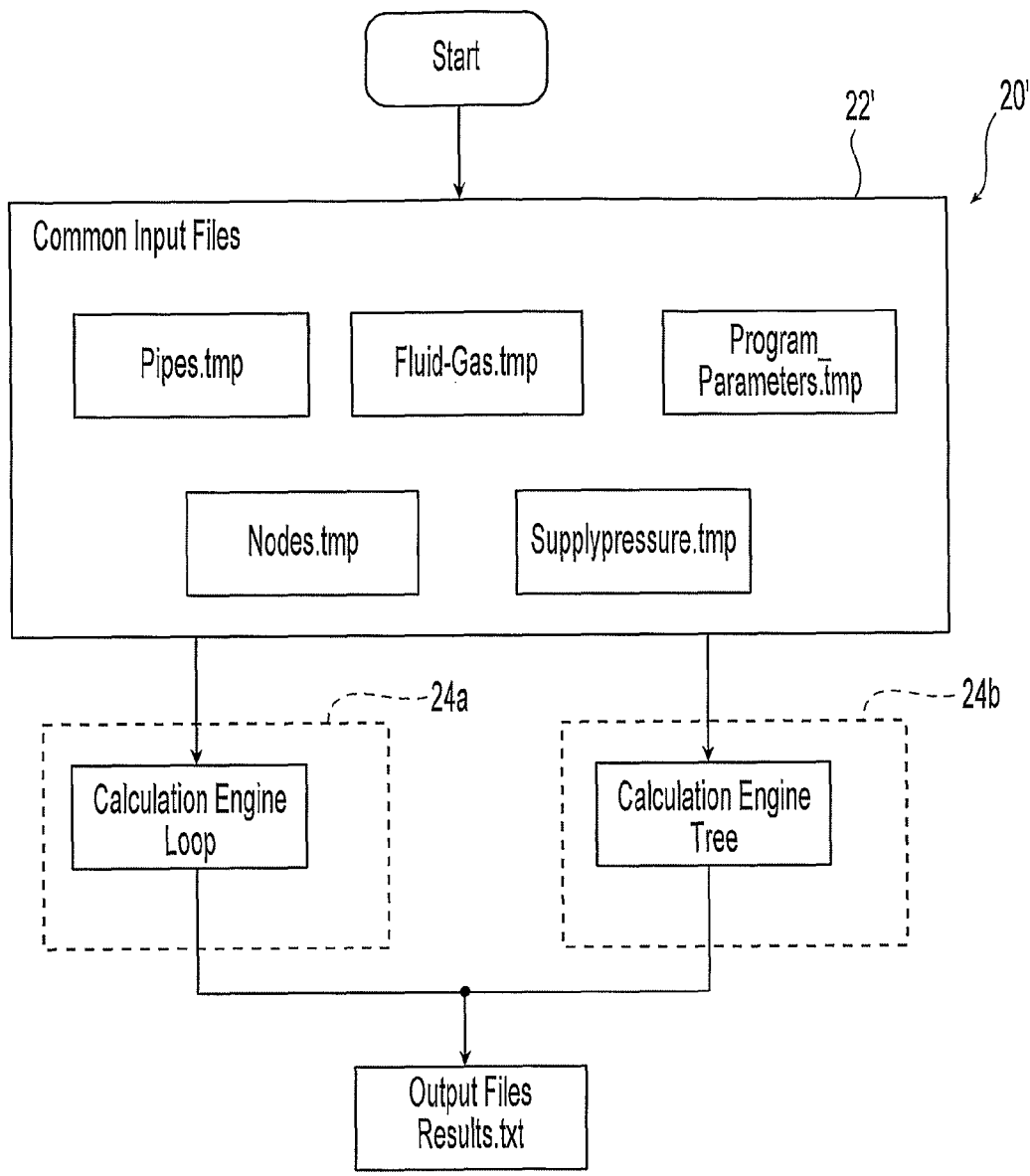
FIG. 2A is another preferred illustrative functional diagram of a computer program to model the dry pipe system of FIG. 1.

A preferred and more detailed functional diagram of a computer program 20' is provided in FIG. 2A. Specifically shown is the input module 22' including one or more input files to capture characteristics of the piping system to be modeled. The input files can include one or more of a pipes, nodes, fluid, fluid supply and program parameter files. The computer program 20' can further divide the computational engine 24 into one or more engines such as, for example, computer engine 24a and 24b to respectively perform fluid calculations for a piping system having at least one loop and a piping system having a tree-type configuration. As used herein, a tree-type configuration preferably defines an interconnection of pipes which provide only one path of flow between the fluid supply and a nodal device, and more preferably a discharging nodal device. Nodal devices can include, for example, elbows, bends, tees and laterals, an exhauster, or an exit opening such as, for example, a sprinkler head or nozzle capable of opening to ambient. As further used herein, the piping system having at least one loop preferably defines a sprinkler system in which multiple cross mains are tied together so as to provide more than one path for water to flow to an operating nodal device and branch lines are not tied together. Output files can further be generated by the computational engine for displaying results to the user and/or be used to perform additional auxiliary calculations regarding the system.

The computer program 20 can be embodied as a computer readable program on a computer readable medium such as, for example, a computer disc, CD-ROM, hard disk, centralized server or any other computer memory storage device. The computer program 20 can be accessed by a computer processing device such as a laptop or PC to design a dry pipe system 10. The computer program 20 can be accessed by the computer processing device locally, for example, off of local hard disk space, or alternatively the computer program can be accessed and/or stored remotely from a central server or other storage device over a network such as, for example, a LAN, WAN or Internet. The computer program 20 can be configured to interface or communicate with the devices of the computer so as to provide a user interface for a user to design and analyze a model of the dry pipe system 10. More specifically, the input module 22 can communicate with the input peripheral devices such as, for example, keyboards, mouse or other pointing device for entry of user defined parameters of the dry pipe system 10. The computational engine 24 can use the parameters to generate a model and analyze the characteristics of the dry pipe system 10. The computational engine 24 in communication with a display device such as, for example, a color monitor, can provide a graphic display of the model and any calculated analysis. For example, the computational engine 24 can output a real-time animated simulation of gas and liquid flow through the model. In addition or alternatively to, the computational engine 24 can output a plan or perspective view of the model rotatable about an origin of axis. Further in the alternative or in addition to, the computation engine 24 can generate a fill-up diagram showing in real-time the fluid fill of pipes in the system including the location of fluid fronts in any partially-filled pipe.

Operation of the computer software or program 20 can provide for initialization of physical and mathematical constants, reading of piping system parameters from the files such as, for example, ~Pipes.tmp & ~Nodes.tmp, creation of the initial data structure reflecting the system topology, and calculations of initial data for the system of equations simulating liquid flow. Afterwards, the problem of gas depletion out of the system can be solved and DPV 8 trip time can be defined. The trip time is preferably defined as the period from when a sprinkler opens to the moment to when the dry-pipe valve trips. The calculations of liquid movement along the pipeline can be performed within a double-nested cyclic process along time and pipes filled with liquid. For this purpose, within every time step, the liquid velocity as well as liquid front coordinate increments in all pipes filled with liquid are calculated.

For example, at the time moment $t^n$ velocities, accelerations, and liquid front coordinates through model 100 of piping system 10 are known. Their values at time moment $t^n+\Delta t^n$ are defined as follows. The loop along all pipes of the system is organized on the basis of the method of backward scanning of a tree. While dealing with a pipe partially filled with liquid the liquid front velocity and its location in the pipe are defined:

$$v^{n+1} = v^n + \left(\frac{\partial v}{\partial t}\right)^n \Delta t^n,$$

$$x^{n+1} = x^n + v^n \Delta t^n,$$

where $\Delta t^n$=time step in n-layer; with n+1 index the flow parameters at $t^{n+1}=t^n+v^n\Delta t$ time moment are denoted. While dealing with pipes of the system, the liquid velocities are defined through front velocities with the help of conditions of continuity:

$v_p S_p = v_l S_l + v_r S_r$ for a tee $v_p S_p = v_l S_l$ for a coupling or elbow.

While dealing with a pipe containing liquid front, the coordinate of liquid front all the time is compared with the pipe length. As soon as the front coordinate becomes greater than the pipe length, the pipe is transferred to the category of pipes entirely filled and its child pipes are transferred to the category of pipes containing liquid front. The initial coordinates of liquid front in the child pipes are set to zero.

Figure 3:
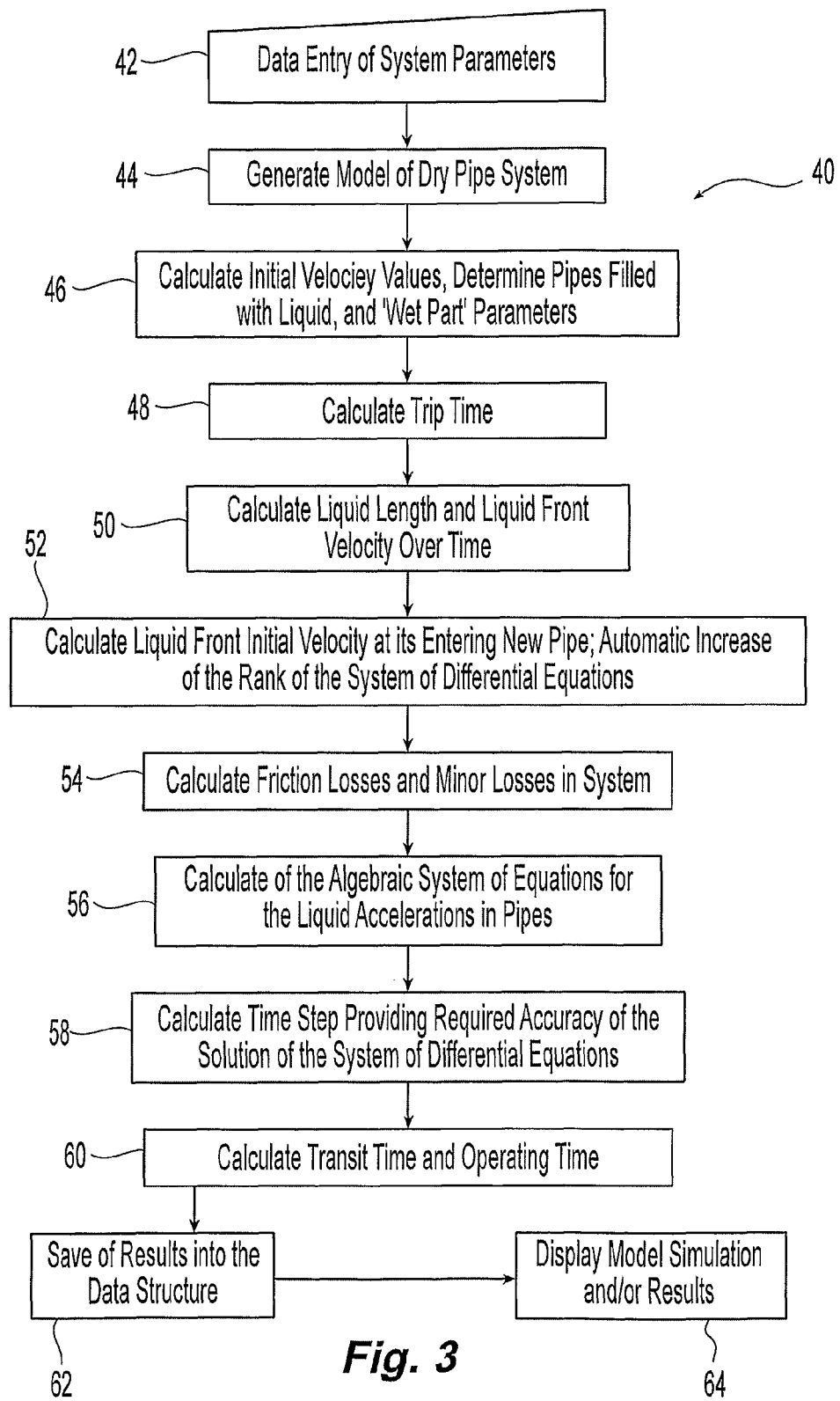
FIG. 3 is an illustrative flow chart of a preferred embodiment of the computer modeling program in FIG. 2 and/or FIG. 2A.
Figure 3A:
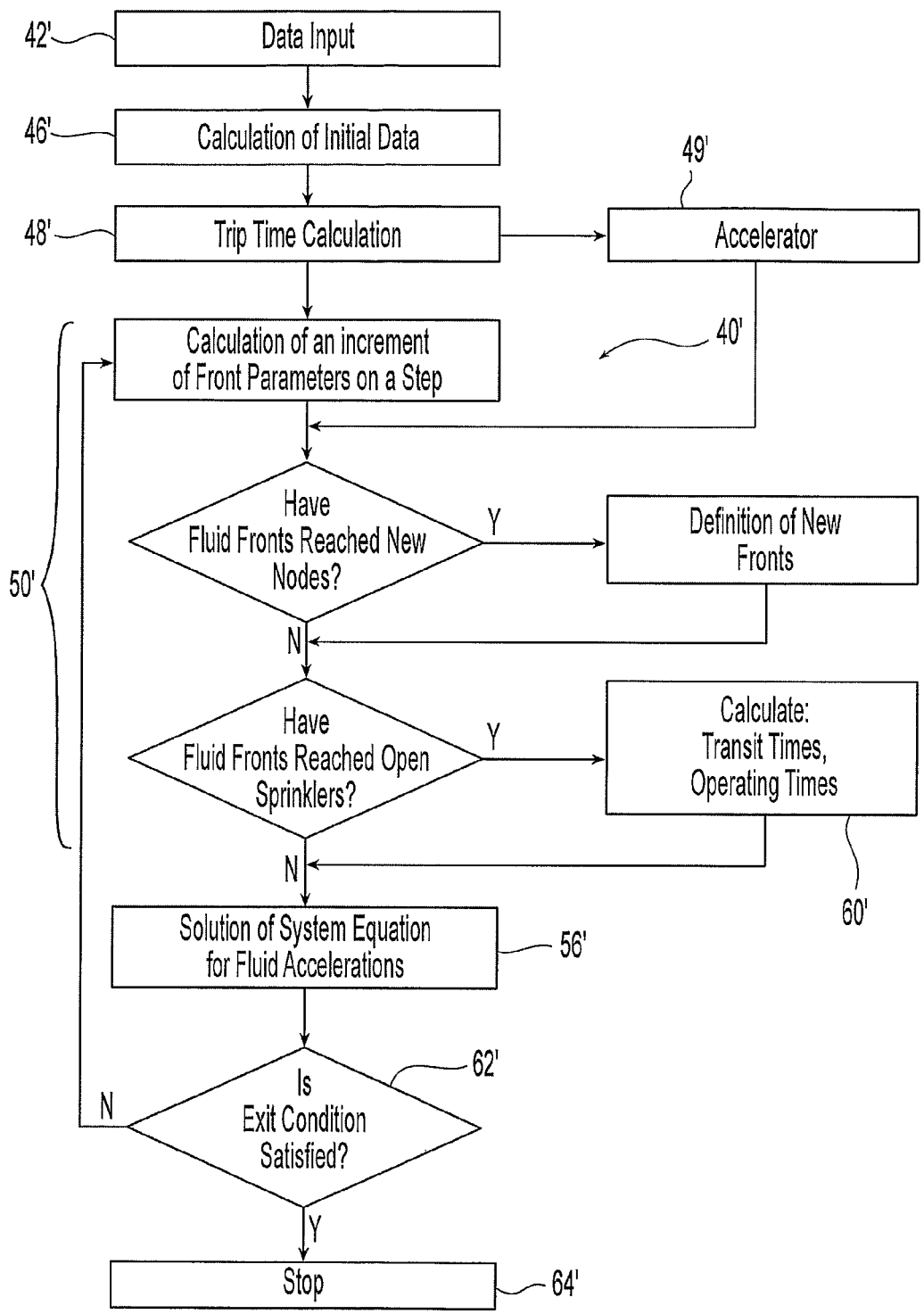
FIG. 3A is an illustrative flow chart of another preferred embodiment of the computer-modeling program in FIG. 2 and/or FIG. 2A.

To provide for the required accuracy, the next time step value is calculated. It is defined through the requirement of deviations of liquid velocity and front coordinates to be small. Calculations on the current step are finalized and calculations jump to the next time step. Loop operations stop after operation pressure value is reached at all open sprinklers. Shown in FIG. 3 and FIG. 3A are illustrative flow charts 40 and 40' for the computer program 20. The computer program 20 can provide for data entry step 42 for entering user defined or selected system parameters that can be used in generating a model of the dry pipe system 10, as provided by modeling or model generation step 44. With the model of the dry pipe system 10 constructed, the computer program 20 can simulate the gas and liquid flow through the model system. More specifically, the computer program 20 can be configured to simulate release of gas from the dry portion of the system and further simulate the flow of liquid from the wet portion to the dry portion as the liquid displaces the gas in the network of pipes.

To simulate the gas and liquid flow through the model system, the computer program and more specifically computational engine 24 can be configured to perform a calculation step 46 to calculate the initial velocity values of the liquid flowing in the system. Moreover, the calculation step 46 can include determining the extent to which pipes are filled with liquid. The computational engine 24 can perform a calculation step 48 to determine trip time, which can be defined as the time period from when a sprinkler head opens in the system 10 to the moment the dry pipe valve (DPV) trips. Accordingly, the trip time can be determined for dry pipe systems or in preaction system (single-, double-, or non-interlock) in a scenario where the DPV trips after at least one sprinkler head is opened. For modeling a preaction system (single-, double-, or non-interlock) scenario in which the DPV trips before any sprinkler head in the system, the time at which the DPV trips preferably defines the initial time or start of the calculation. The computational engine 24 can further be configured to perform additional calculation steps to characterize the gas and liquid flow in the modeled pipe system, and thereby simulate the gas and liquid flow in the dry pipe system 10. The computational engine can include additional calculation steps such as for example, the calculation steps 50-64 shown in FIG. 3. The calculation step can include calculation of liquid flow in any given pipe in a system. More specifically, the computational engine can account for liquid front formed in a pipe and determine the liquid front velocity over time and the liquid front position in the pipe, i.e., the liquid length. The computational engine 24 can further define a system of equations, preferably as a system of ordinary differential equations (ODEs) to characterize gas and liquid flow. The computational engine can further automatically adjust the system of equations to account for liquid flowing into a new pipe in the network at a moment in time, for example, by automatically increasing the rank of the system of differential equations. The computational engine 24 can further perform a loss subroutine to account for friction and minor losses in the system 10 being modeled. The computational engine 24 can be configured to determine the algebraic system of equations for the liquid accelerations in the pipes of the system 10 and further perform a time step calculation to improve accuracy of the solution in the system of differential equations. The computational engine can further calculate performance characteristics of the system 10 being modeled including the transit time and the operating time. The transit time can be defined as the time period between when the dry valve is tripped or activated to when the first drop of water flows out of the open sprinkler head, and the operating time can be defined as the time required for the liquid pressure at an open sprinkler to reach the specified pressure value and stay above this pressure for at least the monitoring time. The monitoring time is preferably defined as the time period for which calculations will continue through its steps after the minimum operating pressure for the system or sprinkler head has been met and maintained. The operating time preferably begins when the sprinkler opens. As indicated by steps 62 and 64 of FIG. 3, the computer program 20 can provide for saving the results in a data structure compatible with other computer design programs. In addition, the computer program 20 can provide for a display step 64 to display the graphic of the model and report the calculations. The display step 64 can include showing gas and/or liquid flow through a 3-D model of the system 10.

The preferred computer program 20, can alternatively or in addition to provide for calculation of the fluid front position in every pipe at each incremental step of time. More specifically, as indicated in the flow chart 40' of FIG. 3A, the computer program 20 can provide for data input and a calculation of initial data to model the piping system 10 as a collection of interconnected nodes and segments for which the trip time can be defined or calculated; accounting for an accelerator in a system as is applicable. The preferred algorithm in the program 20 can further determine whether a fluid front has reached a new node and/or reached an open sprinkler. From these fluid front determinations, the computer program can determine the new location of the fluid front, and calculate the transit and operating times under the appropriate conditions for the given incremental step in time.

Figure 4:
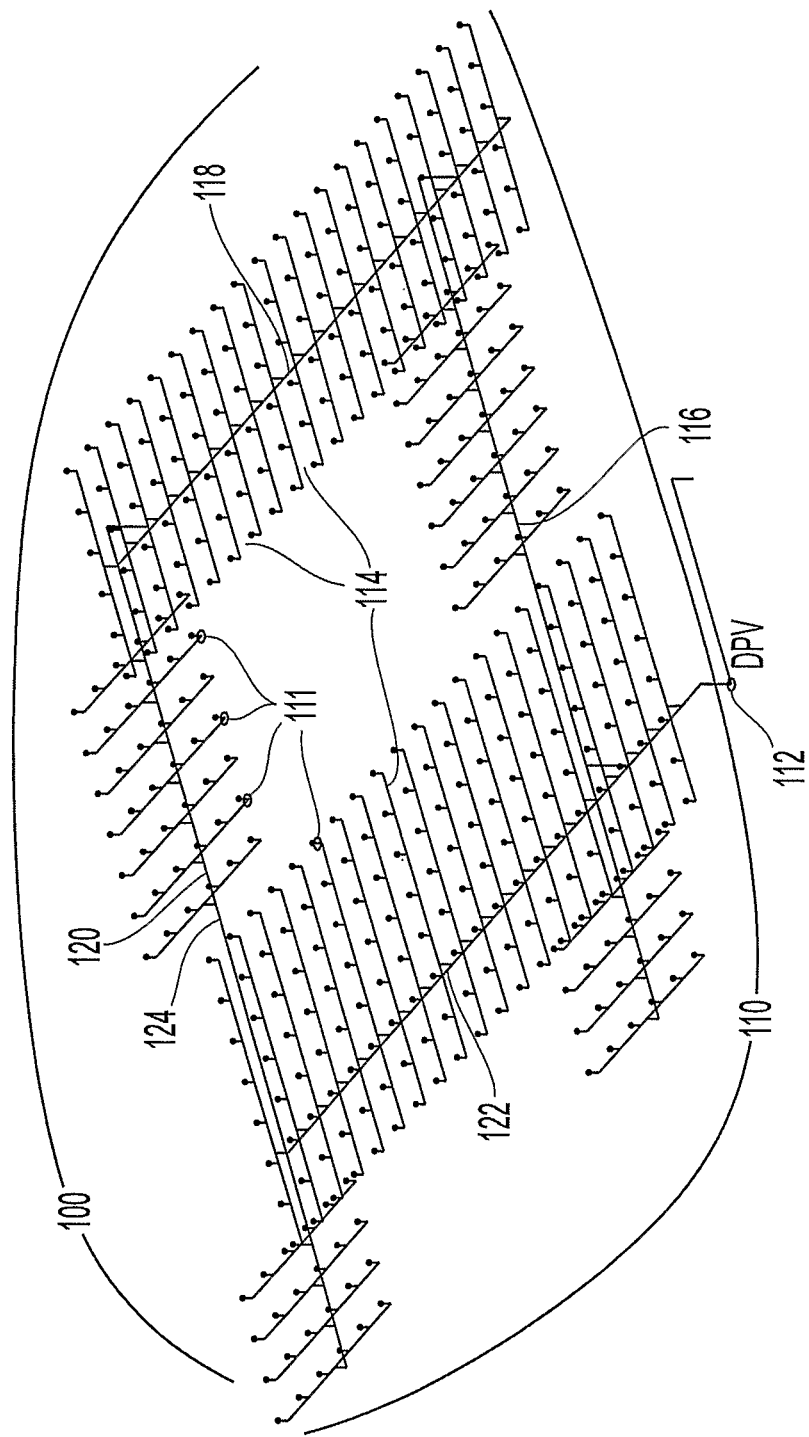
FIG. 4 is an illustrative model of an exemplary dry portion of a dry pipe system.

A model 100 of the piping system 10 can be composed of piping segments and piping connections. The piping segments can be characterized by lines and the piping connections can be characterized by nodes. Shown in FIG. 4 is a portion of an illustrative model 100 of a dry pipe sprinkler system. More specifically shown is the dry portion 110 of the model 100 having a plurality of interconnected nodes 111. The nodes 111 can represent a point of transition from one pipe size to another including such nodal devices such as, for example, elbows, bends, tees and laterals, an exhauster, or an exit opening such as, for example, a sprinkler head or nozzle capable of opening to ambient. The interconnections or sections between the nodes 111 can correspond to pipes, valves, pumps or other pipe devices and conduits that can carry fluid. The dry portion 110 can include at least one feed node 112 to which the wet portion of the model 100 can connect. The interconnections between the nodes 111 can be disposed and spaced along a plurality of branches 114. The plurality of branches 114 can be spaced apart and spanned by one or more cross mains 116, 118, 120, 122. The plurality of branches 114 and/or cross mains 116, 118, 120 and 120 can be interconnected with another so as to define a loop 124.

Figure 5:
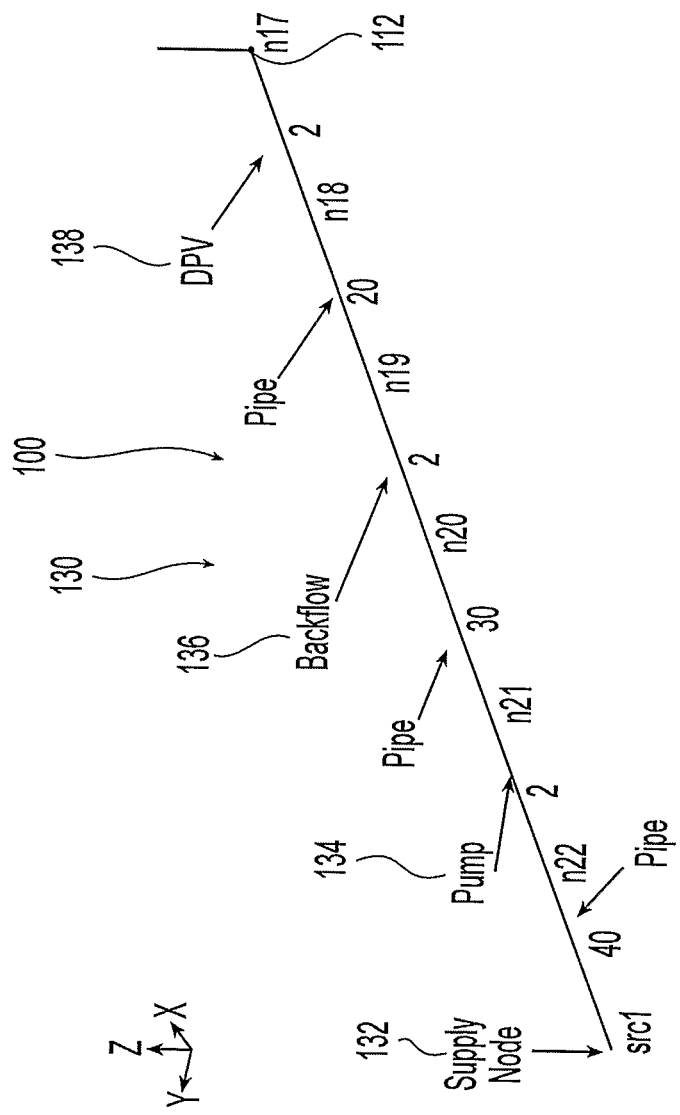
FIG. 5 is an illustrative model of an exemplary wet portion of a dry pipe system.

Shown in FIG. 5 is an illustrative wet portion 130 of model 100 connected to a modeled DPV 138. The wet portion 130 can account for hydraulic losses as well as other parameters of the so-called "wet" part of the system. The "wet" part or portion 130 of the system is constantly filled with liquid and is preferably defined as being located between the supply node and the DPV. The wet portion 130 of the system preferably includes the following non exhaustive list of entities: supply node 132, backflow preventer (BFP) 136, fire pump 134, valves, and pipes. In a closed or shut-off status, the DPV 138 provides a controlled separation between the wet portion 130 and the dry portion 110 parts of a system 100. After a DPV trip event, the wet portion 130 initiates the fill process of the dry portion 110. The fluid supply can be modeled as either a static fluid supply or variable fluid supply. The model preferably accepts one fluid source. The DPV is shown as connecting the wet portion 130 to the node 112 of the dry portion.

Alternatively or in addition to, the model 100 of the piping system 10 can include an in-rack portion 115 for modeling a piping system for fire protection system of a storage configuration. The in-rack portion of the model can include: one or more in-rack piping lines, armovers, feed mains for the rack lines, and the associated in-rack sprinklers. The modeled in-rack portion 115 can be connected to the dry portion 110 of the system 100 and/or the outlet of the of the DPV.

To build a model 100 using the preferred computer program 20, the user can create a dry pipe sprinkler system by specifying a total number of sprinklers based on the number of branch pipes multiplied with the number of sprinklers per branch, the total coverage area based on the distance between branch pipes multiplied with the distance between sprinklers. The user preferably provides information such as the number of branch lines, the number of sprinkler heads from the left side of the system relative to the main and preferably to the cross-main. The user can further provide information such as, for example, location and length of the feed main; elevations of the sprinklers and pipes; and a fluid supply. Other parameters can be provided, such as for example, the number of sprinkler heads to the right of the main. Using this data, the computer program, in connection with a computer, generates a line-node-model of the dry pipe system on a graphical display screen. The line-node model can be displayed as a plan view, front view, side view, top view, or perspective view which can be rotated around predefined origin. The line-node model provides information as to the number of pipes and nodes in the system. By viewing the line-node model plan, the user can modify the system as required for any desired configuration of the dry pipe system. The computer program 20 can include a user interface or module 22 in communication with the computational engine 24, and more specifically the model or tree generator 26, to build a model dry pipe system such as, for example, model 100.

Figure 6:
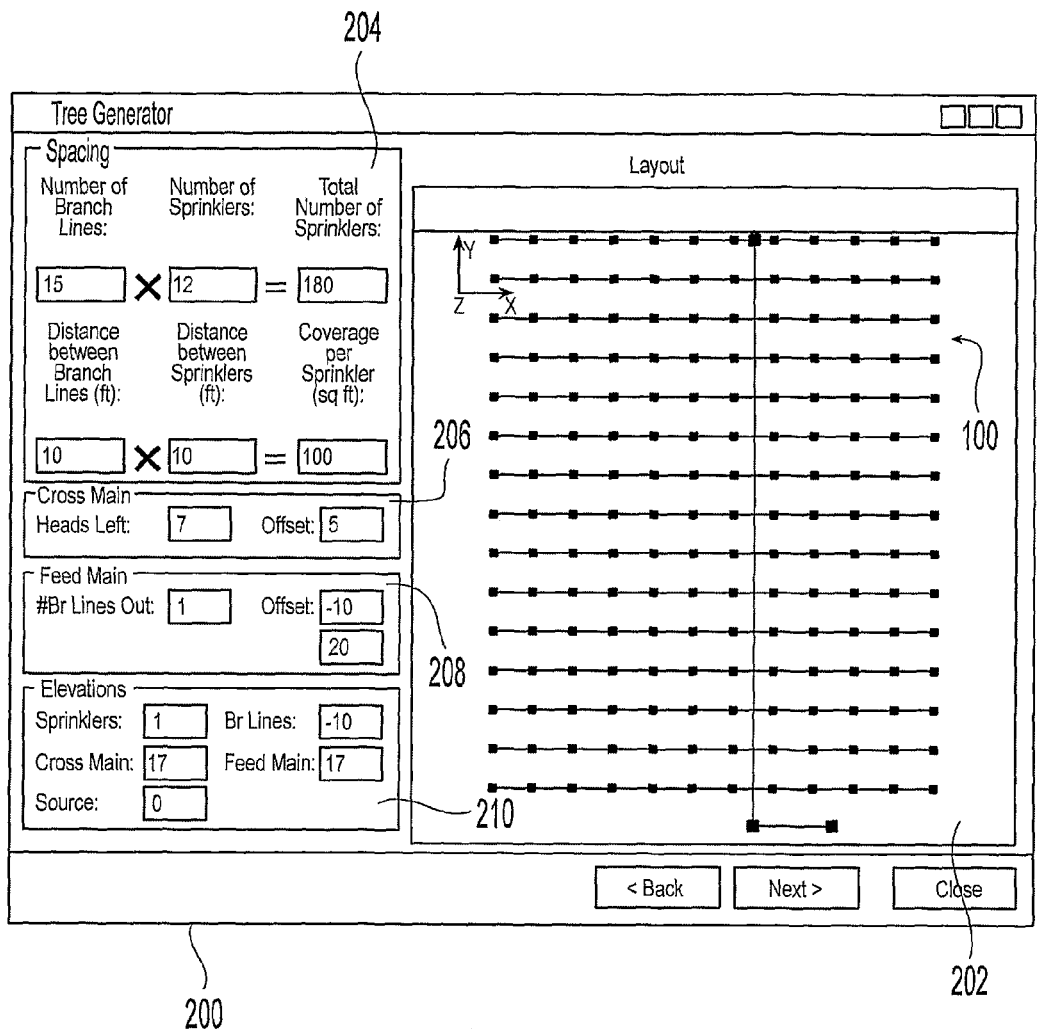
FIG. 6 is an illustrative preferred graphic user interface of the computer program in FIG. 2 and/or FIG. 2A.

Shown in FIG. 6 is a snapshot of an illustrative graphic user interface 200 that can provide a plurality of data entry and reporting fields for a user to build, define and evaluate the model 100 of the dry pipe system 10. More specifically shown in FIG. 6 is a preferred user interface 200 for generating a tree-type piping system. The data entry fields can be configured for text entry, drop down menu or any other mechanism for user input. More specifically, the interface 200 can include a graphics window 202 for viewing the model 100. The graphics window 202 can be configured to provide user selected viewing of the model 100. For example, the interface 200 and/or graphics window 202 can include controls configured to permit a user to view and rotate the model 100 about three orthogonal axes.

The interface window 200 can further include data entry fields 204 and 206 to enter and define various properties of the model 100 including, for example, the number of branches, sprigs/drops, armovers, as may be applicable, the number of sprinklers, the number of sprinklers per branch, and spacing between each. Moreover, interface 200 can include data entry fields 208 and 210 to define feed lines and elevations of the branches, cross mains and sprinklers. The interface 200 can further include data entry fields for modeling two or more tree-type systems for connection by at least one loop and further for defining the special relation between each system.

With the parameters entered in the appropriate fields, a visual graphic of the model 100 can be provided in the window 202.

The computer program 20 can be configured with various additional graphic user interfaces, windows or other input mechanisms to allow a user to enter values to describe physical attributes of the respective device in the model 100. For example, a window configured with necessary data entry fields, drop down menus or look-up tables can permit a user to specify cross-, loop- and/or feed-main properties such as, for example, length, number of sprinkler head to the left or right of a given main, pipe direction and elevation of the given main. A feed connecting interface can be provided to identify and describe the piping properties connecting one or more mains of the modeled system 100 to the fluid feed including the pipe lengths and lengths of one or more vertical drops from a specified main to the fluid feed.

The computer program 20 can be configured with various additional graphic user interfaces, windows or other input mechanisms to allow a user to enter material properties of the respective device in the model 100. For example, a window configured with necessary data entry fields, drop down menus or look-up tables can permit a user to specify sprinkler head properties such as, for example, the K-factor, orifice diameter, minimum operating pressure and other data suitable to provide a representation of a sprinkler at a specified location in the system. Additional entry fields can provide for entry or specification of fittings such as, for example, elbows or tees, entry or specification of piping schedule, diameter size, C-factor and absolute roughness (wet and dry) and/or other material specifications.

The computer program 20 can be configured with various additional graphic user interfaces, windows or other input mechanisms to allow a user to enter hydraulic design area properties for the model 100. For example, a window configured with necessary data entry fields, drop down menus or look-up tables can permit a user to specify such parameters as the desired hydraulic design area, the square multiplier, the actual deign area calculation and the number of heads in the actual design area.

An additional window or user interface can be configured for defining a headset or set of nodal devices and the headset properties. The headset can include, in addition to the sprinkler properties, the specification of one or more sprinkler heads that are modeled as actuated or open to ambient for delivery of fluid. The window can further provide additional time dependent parameters to define requirements of the system being modeled. For example, the headset properties window can include a data entry field for the required delivery time which is the time required to deliver the liquid to the headset, preferably in accordance with one or more standards or codes such as, for example, the requirements of NFPA 13. In addition, the user can specify the actuation time of the individual sprinkler heads included in the headset to preferably establish a sequence of sprinkler activation. Moreover, the user can specify the monitoring time so as to define the time length for running the calculation process after achieving and maintaining an operating pressure with the headset at or above a specified minimum. The headset properties can be configured to provide for defining one or more headsets in various locations throughout the system. Preferably, the headset properties window is in communication with the computational engine 24 such that gas and liquid flow characteristics for each defined headset can be calculated and tabulated for comparison.

Another window or interface can provide for input of data to characterize and model valves used in the designed dry pipe system. For example, valves can be described through algebraic equations binding pressure and liquid mass flow $\Delta P(G)$. However, it's more convenient to describe them in a uniform way through differential "pipe-like" equations but with pressure loss set with the help of a table. The differential equation for valve composed by analogy to that of a pipe is as follows:

$$h_i \frac{\rho_{\Sigma i}}{A_i} \frac{dW_i}{dt} = \Delta P - \frac{f_i}{2A_i^2} \rho_{\Sigma i} W_i^2 \qquad \text{(Eq. 1)}$$

where $h_i$=effective hydraulic length of a valve; $A_i$=the cross section area of the latter. With extreme transition to a concentrated device with no length the differential equation degenerates into algebraic one. With a small hydraulic valve length $h_i$ the right hand side is not equal to zero only in case with very high accelerations. Therefore, the relationship $\Delta P=\Delta P(G)$ is satisfied for almost all cases.

Resistance coefficient $f_i = f_i(W_i)$ in (1) is a variable depending on flow. The dependency can be defined with the help of table specified valve characteristics $\Delta P(G)$:

$$f_i = \frac{\Delta P}{\frac{\rho v^2}{2}} = \frac{2 \Delta P \rho A^2}{G^2} \qquad \text{(Eq. 2)}$$

Substituting (2) into:

$$h_i \frac{\rho_{\Sigma i}}{A_i} \frac{dW_i}{dt} = P^{iL} - P^i - \left(\frac{\Delta P \rho}{G^2}\right)_{TABL} \rho_{\Sigma i} W_i^2,$$

where $\left(\frac{\Delta P \rho}{G^2}\right)_{TABL}$ = the dependency of hydraulic resistance coefficient vs. flow calculated on the basis of table data.

Figure 6A:
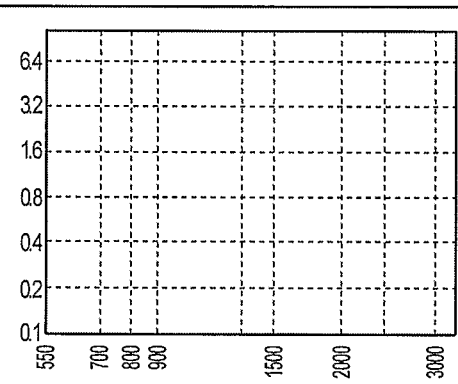
FIG. 6A is another illustrative preferred graphic user interface of the computer program in FIG. 2 and/or FIG. 2A.

Accordingly, a valve properties window, for example, as seen in FIG. 6A, can provide for specifying a valve type, valve size, and/or a non-linear pressure drop function defined by a user with the help of a special table Pressure Drop vs. Flow Rate function. Pressure loss for a valve can be described by an array containing a set of points on Pressure Loss vs. Flow plane. The computer 20 can provide additional data fields to model the DPV 138. For example, a DPV properties window or interface can be provided to enter additional parameters such as, for example, Differential Trip Ratio, Pressure Differential for optional DPV accelerator, and Fixed Trip Time— the time delay for the DPV to trip after the accelerator has reached its pressure Differential Setting Value. An additional window can be incorporated or added to characterize and model a valve assembly for example, a check valve assembly.

Similarly, a pipe properties window can be provided for the user to specify, for example, pipe starting and ending nodes, pipe schedule, size, internal diameter, Hazen Williams C-Factor, absolute roughness, length, fittings, equivalent length, total length, and other suitable attributes in modeling the dry pipe system. A node properties window can also be configured to specify for each node data regarding physical and geometrical attributes such as, for example, the node type including supply, sprinkler head, non-flowing node, or exhauster, XYZ coordinates, K-factor, orifice diameter, operating time and other attributes suitable for the computer program to function for its intended purpose in modeling a hydraulic system, which preferably is a dry pipe system.

The node properties window or interface can provide for modeling an Exhauster. An exhauster is a special device which can be opened for accelerating gas depletion or blowoff when the gas pressure is decreasing. The exhauster parameters can include, for example, K-factor, Orifice Size, Pressure Setting to trip, and Closing Time after water has reached the exhauster. The pressure required to trip the exhauster can be set either as a differential pressure or as gauge pressure. Where Pressure Differential is specified for the exhauster, the exhauster can be opened at the moment when the system falling gas pressure reaches the specified difference relative to, the initial gas pressure. Alternatively, gauge pressure can be specified in the window so as to open the exhauster at the moment when the system gas pressure falls below the specified pressure value. After the exhauster has tripped, it behaves like a sprinkler head with the specified K-factor discharging water to ambient. Moreover, after the specified "Time to Close" period has expired after the water front reaches the exhauster, the exhauster is modeled as shut and it becomes a simple node. In addition, an Exhauster Orifices table can be provided to a user for entry of orifice diameters that match K-factors.

The program 20 can also be configured to provide suitable attributes to the wet portion 130 of the model 100. For example, an interface window with an appropriate user interface can be provided for entry of the appropriate characteristics to model one or more of the supply node 132, a hose, pump, or more specifically, a fire pump 134, and the back flow preventer 136. The user interface can further provide for entry of pipe characteristics of pipes to interconnect the wet portion element such as, for example, pipe diameters and/or pipe length. The supply node 132 can be defined by an array containing a set of points on a Pressure vs. Flow function. The space between points can be approximated with any type of functional dependence, for instance, the polynomial of the flow rate raised in 1.85 power. A node properties window or interface can include points on the supply function. For example, a city main array can contain at least two points such as, for example, the static and the residual. A pump properties window can characterize the pressure boosting function of the pump by a set of data points in a pressure vs. flow function. The pump array can be characterized by, for example, three points. Preferably, the first point is named Churn (pressure boosting figure at zero flow), the second point is named Rated Flow and Rated Pressure; and the third point having Limit Flow and Limit Pressure as coordinate components. In simulating liquid and gas flow through the model 100, the simulation can provide that after the DPV trips, the fire pump can be activated when pressure at its outlet drops below user specified pressure value and after the user specified delay period. Both values can be specified in the pump properties window or interface. Alternatively or in addition to, a pump device can be modeled as a piping element in the system. The fire pump is an optional system device.

Referring again to FIG. 2, a user interface can be configured for communication with the computation engine 24 and more specifically with the calculating module 28. Accordingly, computer program 20 can be configured so as to include a user interface or calculation window 250 as seen in FIG. 6B. The window 250 can be configured to perform an analysis of the model 100 so as to determine, for example, trip time, water delivery time and operating time. The water delivery time can be defined as the period between when a sprinkler, preferably the first sprinkler, opens and when the water first reaches an open sprinkler. More preferably, the water delivery time is the sum of the trip time and the transit time. In addition, the window can include data entry fields, selection buttons or some other user input mechanism for selecting the headset being simulated, the required delivery times in addition to specifying the liquid and/or gas in the system and their properties such as, for example, gas and liquid type, liquid viscosity (dynamic and/or kinematic), K-factor multiplier, density and gas temperature. Calculation parameters can also be specified using user interface entry fields to indicate, for example, time increments or steps performing calculations, total monitoring or calculation time, and limit on the number of calculations or solutions to be resolved.

Figure 7:
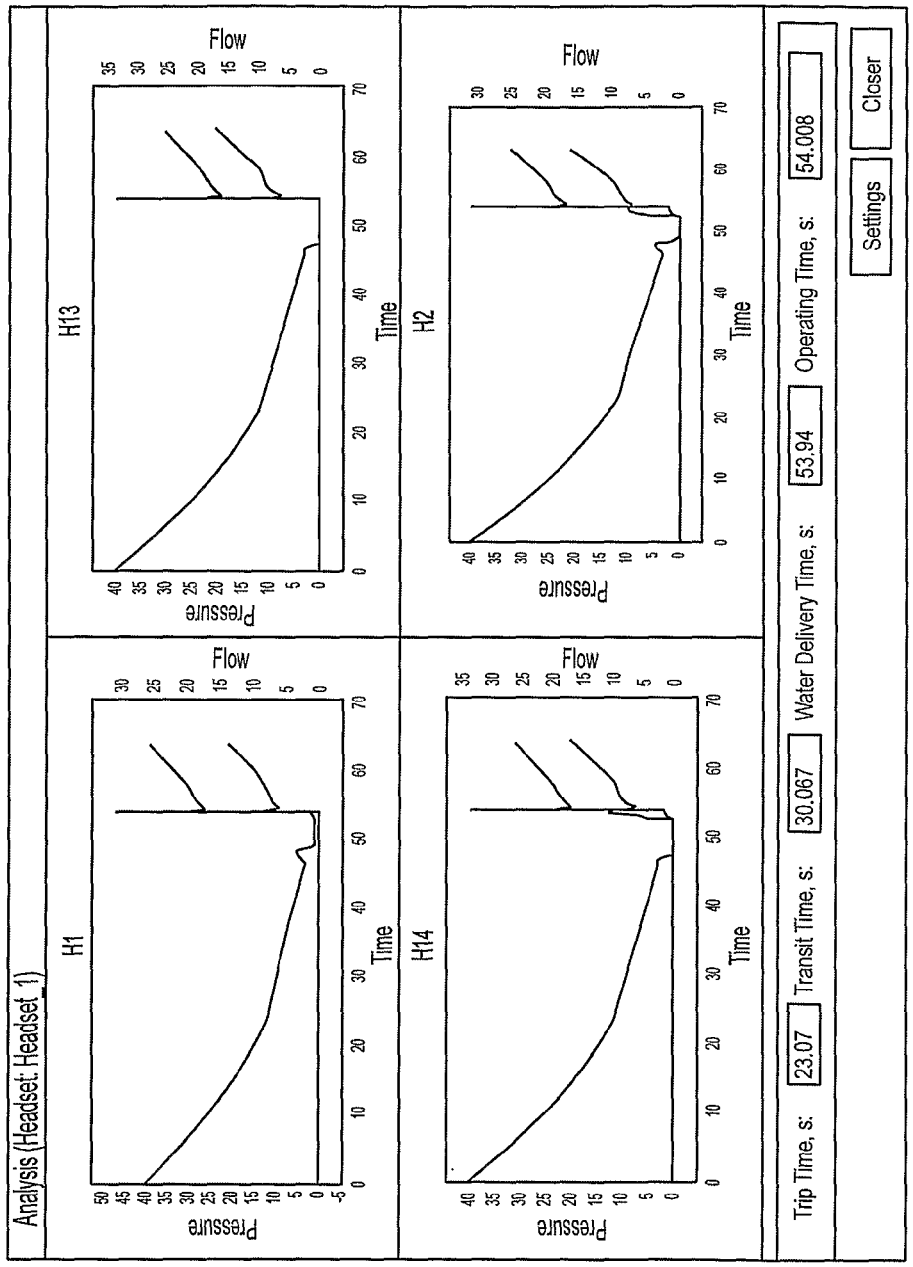
FIG. 7 is another illustrative graphical user interface for the computer modeling program of FIG. 2 and/or FIG. 2A.

The calculating engine 24 can generate a graphic depiction for analyzing the performance of the model 100. For example, as seen in FIG. 7, shown is a graphed comparative analysis of four heads with the trip time, transit time, water delivery time and operating time provided for the user's consideration in accepting, modifying or redesigning the model system 100 for actual construction and/or testing. In addition or alternatively to, the calculating engine can generate a 3-D, real-time animation of the simulated gas and liquid flow through the model 100. For example, the animation can provide for each incremental time, the exact location and dynamics of the fluid front in each pipe of the model system 100. Preferably, the 3-D animation provides a pictorial view of the system as it fills with liquid, in which the segments representing pipes change color, for example, from red to blue as the pipes fill with liquid.

As discussed above, the user input module 22 can provide for user entry of various system parameters including the activation of system devices, such as pumps, valves or sprinkler heads. In addition the user input module 22 in conjunction with the calculating engine 24 can be configured for sequencing events to define the simulated operation of the dry pipe system. More specifically, the computational engine can include calculation of the model fire prevention system 100 to account for: (i) the condition of the system with BFP is closed or more specifically where the liquid motion is by inertia with no supply power influence; (ii) Fire Pump switching on and boosting pressure; (iii) the functional definition of valves' pressure loss; (iv) consecutive events: head openings, valve, pump, accelerator, exhauster, etc. operation delays; (v) and as described above additional models for valves (valve assembly) simulation where pressure loss function is defined by user through a set of points.

Accordingly, the computer program 20 can be capable of calculating consecutive or sequenced events. More specifically the computer program 20 can calculate preaction systems where the DPV 138 opens prior to the sprinkler(s). In one scenario of a preaction system, the DPV is first to open and liquid starts to fill the system up. With some delay relative to the DPV trip event, one or more sprinklers open. Delay values for sprinklers may differ. Gas starts to deplete the system and liquid fronts are accelerated.

In a conventional dry-pipe system, one or more sprinklers are first to open. All further trip event delays are defined in relation to the first head open event. For a dry-pipe system the dry pipe valve trips after the first sprinkler has opened. The user can define the set of open sprinklers and describes the time moment each head is to open. In this case, the time starting zero moment is the event when the first head opens. Each open head has the opening time relatively to the very first open head (zero by default) as a component of the head properties set discussed above.

Figure 7A:
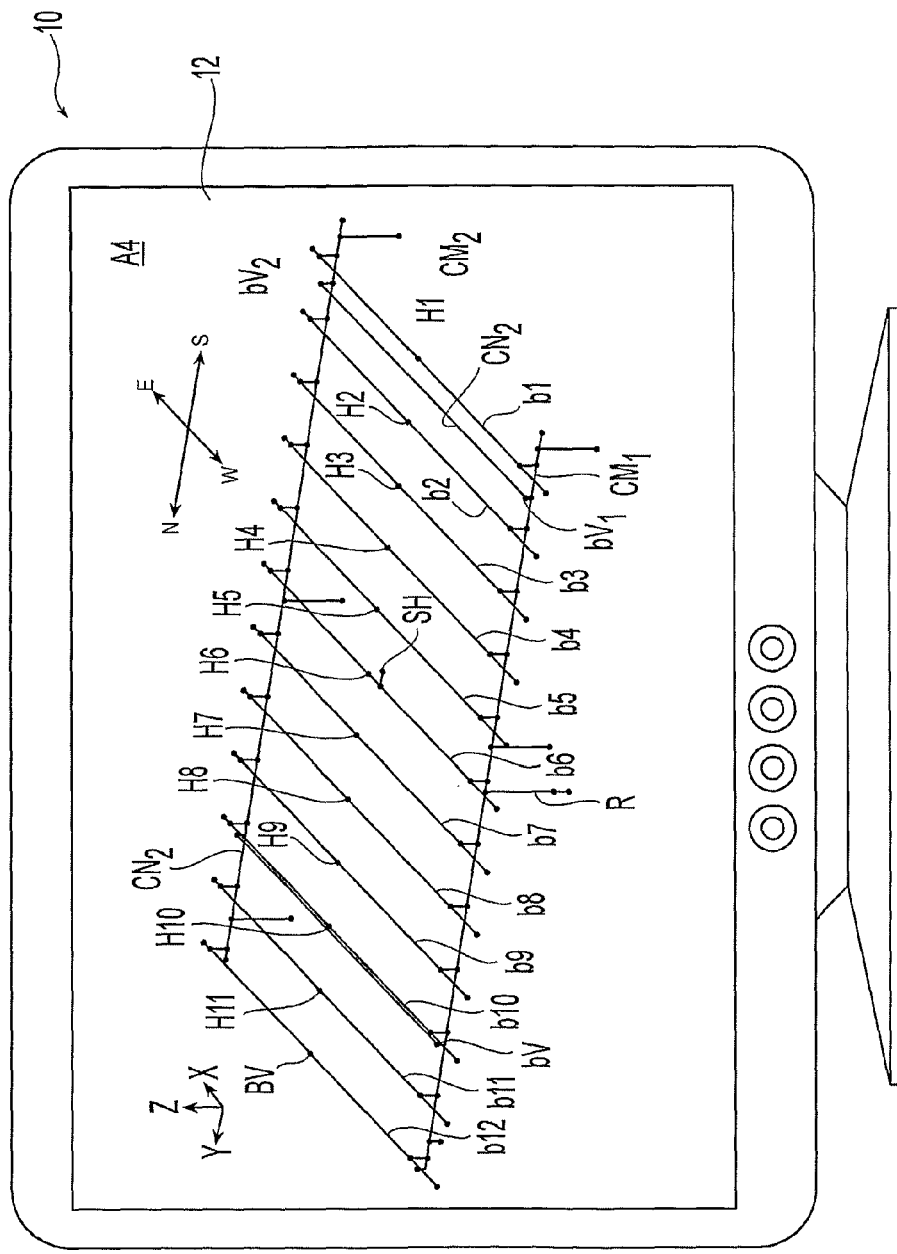
FIG. 7A depicts a preferred illustrative graphical user interface displaying a 3-D wire frame model of a first referential dry pipe fire protection system generated by a preferred computer modeling program of FIG. 2 and/or FIG. 2A.
Figure 7B:
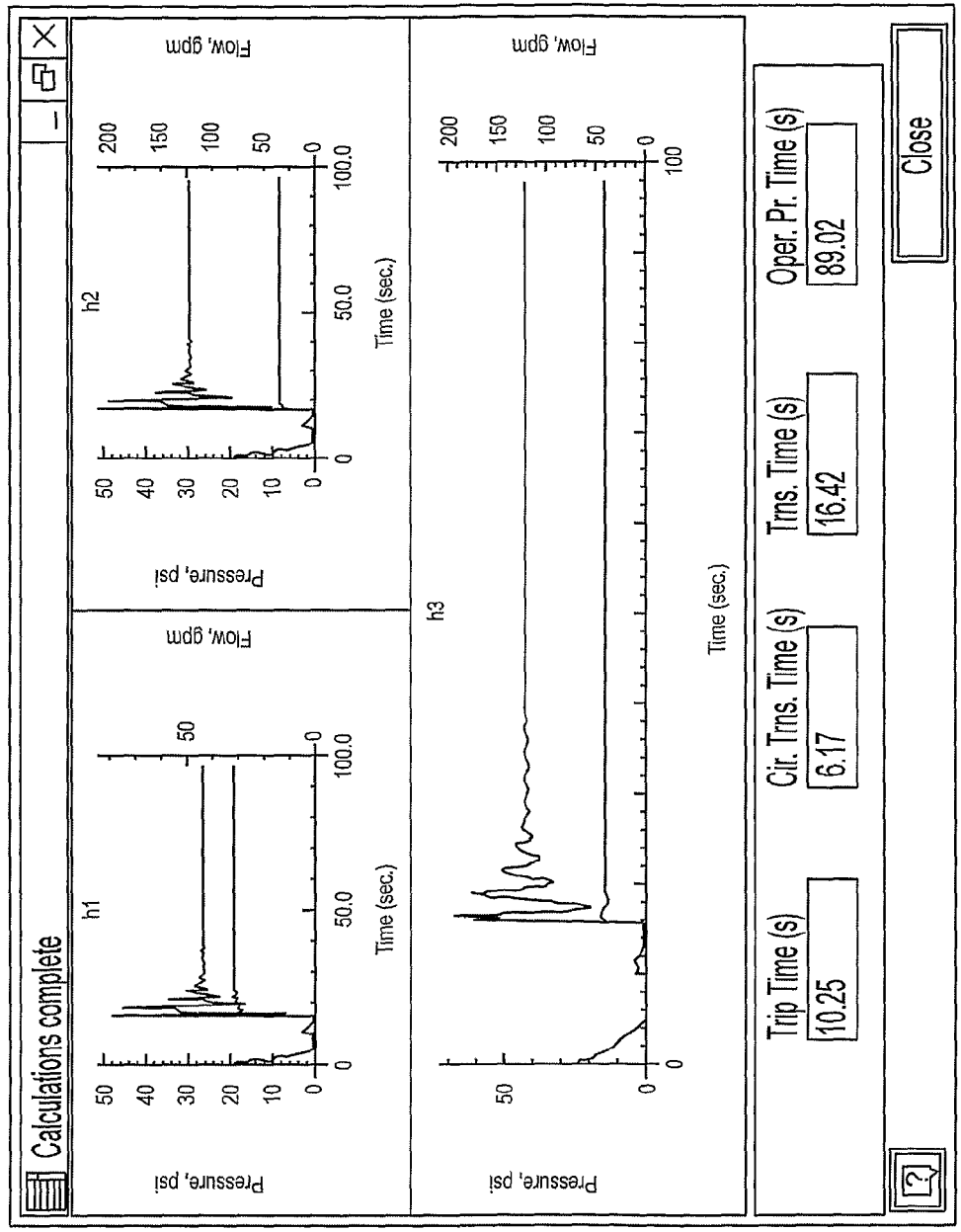
FIG. 7B depicts results of the analysis of the model in graphical form in another preferred graphical interface and generated by a preferred embodiment of the dry pipe computer-modeling program computer modeling program of FIG. 2 and/or FIG. 2A.

FIG. 7A depicts another embodiment of a graphical user interface that permits the dry piping system 10 to be modeled in order to predict certain characteristics of the system such as, for example, a valve actuation or trip time (i.e., the time it takes for a gas pressure in the system to drop below a threshold that allows a fluid to flow into the system), transit time (i.e., the time it takes for a fluid to reach one or more openings of the system) and operating time (i.e., the time required for the liquid pressure at an open sprinkler to reach the specified pressure value and stay above the specified pressure for at least the monitoring time). FIG. 7B shows another preferred output graphical window of the computer modeling program 20. The computer modeling program 20 can provide for calculation of graphical reporting of fluid system parameters such as, flow and pressure changes over time in addition to the time based parameters of trip time and transit time. The program 20 can calculate at least these characteristics with a reasonable degree of accuracy/precision based on verifiable and repeatable correlations between predicted characteristics and actual characteristics for at least known tree-type fluid transport systems.

It is noted that in the preferred embodiments, the fluid is a fire fighting fluid such as water or Inergen® extinguishing agent and the gas is nitrogen or ambient air. The program, however, can evaluate other fluids including any single-phase flow of liquid base on the fluid's corresponding density, specific gravity, or specific weight. That is, the program is capable of predicting the delivery of any single-phase fluid in a piping network where the fluid delivery is controlled from a location that is remote from the point of delivery. For example, if the piping network is unsupervised, and contains air at atmospheric pressure, this can be entered into the model using the specific gravity of air and a pressure of 14.7 psi, or one bar. Similarly, if a liquid is being delivered in that network, the flow of the liquid can be predicted in the program by entering the physical properties (density and viscosity) of the fluid being delivered.

In one preferred embodiment, the computer program can model a piping system to predict the trip time, delivery time and operating time of a flow of propyl alcohol in the system from the supply to an opening. For example, the system in this model can be configured with a main line with 20 branch lines in a tree-type array and may be provided with a system volume of about 1111 gallons and initially filled with pressurized Nitrogen gas at 100 degrees Fahrenheit. In another preferred embodiment, the computer program can predict the trip time, delivery time and operating time of a flow of ethylene glycol in the system from the supply to an opening.

In yet another preferred embodiment, the computer program can predict the trip time, transit time, operating time, and delivery time of a flow of water. For example, at least eight referential dry pipe systems provided with an array of twelve branch lines, and two cross mains were modeled and the liquid delivery time for each was predicted by the computer program.

The computer program is preferably not limited to fire protection and can be used to calculate a fluid transit time for other applications involving fluid delivery through a piping network such as, for example, a piping network in a hospital from a centralized source to a given patient room or point of application; a piping network for oil, other petroleum or non-petroleum chemical liquid product (e.g., isopropyl alcohol, ethylene glycol) or water through a distribution network in a pipeline or city grid of water mains, or a piping network to deliver paint or other fluids to a remote location or to robotic painting machine in an industry such as automobile manufacturing.

The computational engine 24 can be configured to account for as much of the system factors as is necessary to achieve the desired accuracy for a given simulation. Accordingly, it is not necessary to simplify the model 100 in which the initial topology is substituted with the approximate structure with all dead end sprigs and drops deleted prior to running the calculations for liquid and gas flow. The computer program 20 incorporates no topological simplifications which makes it more accurate, and thus, the information on the hierarchical structure of the model 100 is not used which delivers wider capabilities to the program 20. Generally, the computational engine 24 can model and calculate time based performance parameters for real world piping systems without simplification. For example, the computational engine can handle a model with more than two thousand pipes or variable number mains with variable number of branches and variable number of sprigs and drops so handle a tree pipe system of any configuration the computer processing device running the computational engine will allow.

The accuracy and performance of the computational engine 24 is achieved owing by the efficient algorithms for solution of the systems of algebraic and differential equations as referenced in FIG. 3A. To solve the system of algebraic equations of a dimensionality, such as in a tree-type piping system, an effective algorithm of a generic matrix sweep elimination, i.e. the Thomson method, is preferably used. To solve the system of algebraic equations for pressures in the case a piping system having at least one loop, the effective methods essentially includes the combination of a preferred cyclic version of the matrix sweep elimination of the Thomson method.

In the same way the computational engine solves large system of algebraic equations for accelerations. A preferred elimination algorithm is provided which enables one to represent an ODE system in a way of three-diagonal matrix regarding to the derivatives. It is solved then with the Thomson method. This can radically shorten the calculation time. It is especially effective for large systems with large pipe quantities. An application of effective methods for solution of large algebraic systems for accelerations can resolve the system of ordinary differential equations (ODEs) with respect to derivatives. Thus resolving a system of ODEs with respect to derivatives, can be effectively performed not only by the methods, such as for example, DASPG mathematical subroutine from the Microsoft® IMSL MATH/LIBRARY, but also by other effective methods, as described herein, and elaborated for the ODE system to resolved with respect to derivatives.

Figure 8:
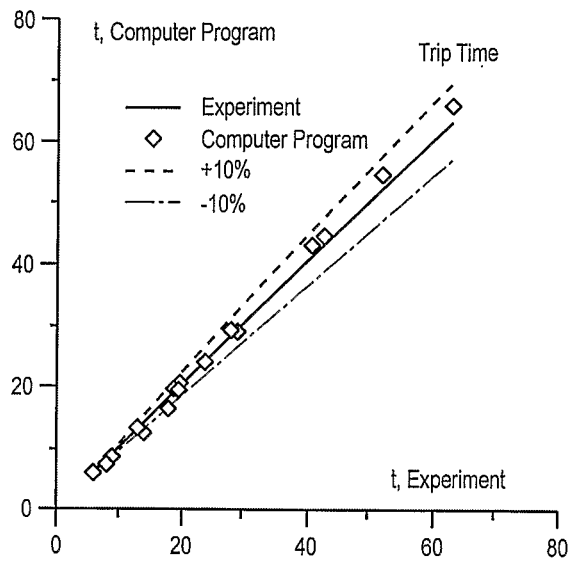
FIG. 8 illustrates a modeled vs. experimental graph of trip time of a dry pipe system.
Figure 8A:
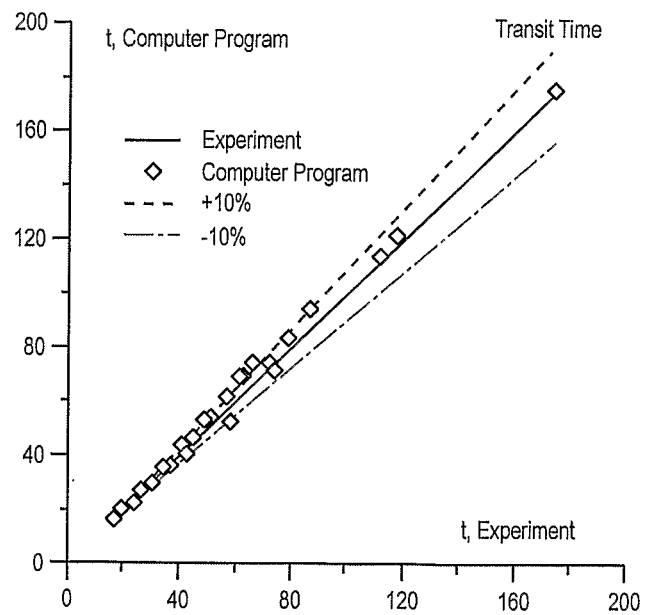
FIG. 8A illustrates a modeled vs. experimental graph of transit time of a dry pipe system.
Figure 8B:
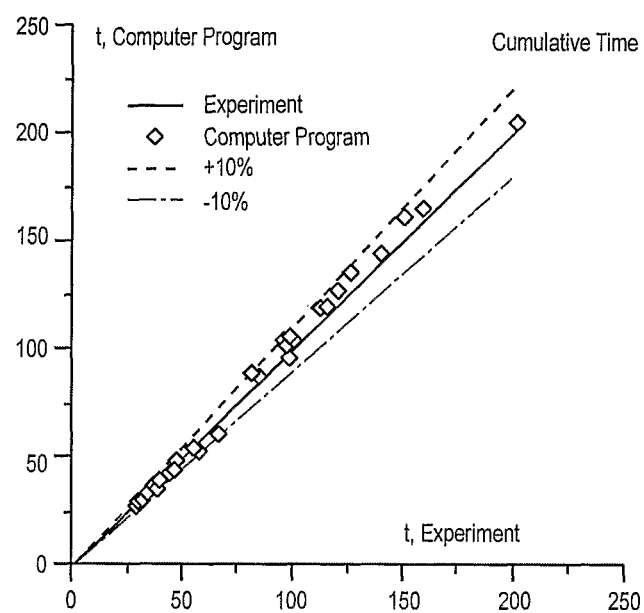
FIG. 8B illustrates a modeled vs. experimental graph of cumulative time of a dry pipe system.

FIG. 8, FIG. 8A, and FIG. 8B contain comparisons of calculated and measured values in the analysis of a tree-type piping system for the trip, transit and liquid delivery time. The calculated time is shown as a function of measured time of the test. Provided are two lines above and below the bisector outline the 10% deviations from the measured values. FIGS. 8, and 8A show comparisons of trip and transit time calculated with algorithm described herein involving polytropic model of thermodynamic process to experimental results. It is shown that for any test the result is within the 10% deviation. FIG. 8B shows cumulative time (the sum of trip and transit times)–'fluid delivery time'. The deviations are also not more than 10%.

Figure 9:
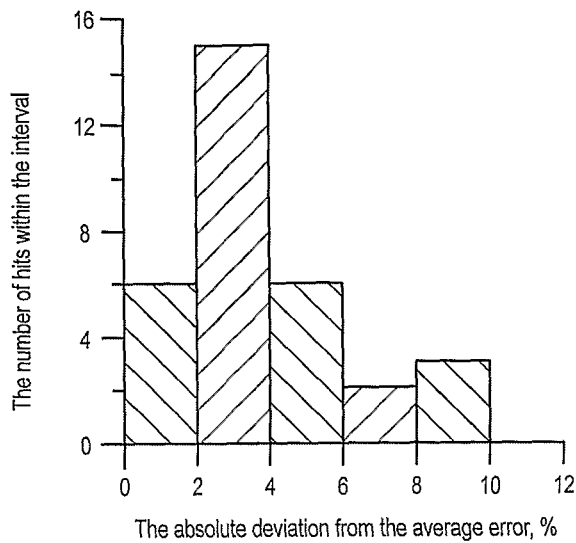
FIG. 9 illustrates accuracy histograms of a preferred embodiment of the computer program of FIG. 2 and/or FIG. 2A.
Figure 9:
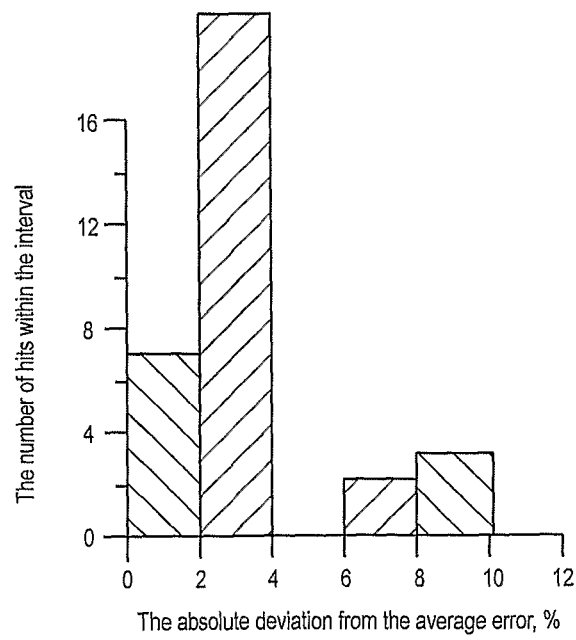

Histograms, as seen in FIG. 9, present the comparative calculation accuracy of the preferred computer program 20 and a prior program, as described in U.S. patent application Ser. No. 10/942,817 at least with respect to analysis of a tree-type piping system. The top histogram corresponds to the prior program and the bottom graph corresponds to the computer program 20. More specifically, FIG. 9 shows the distribution of absolute deviation between calculated and measured trip time values respectively according to the previous computer program and the computer program 20. The distribution is based on thirty (30) different test systems. The pictures show that program accuracy has been largely improved.

The performance of the computational engine 24 can be improved by an optimal choice of time steps linked to optimal precision control while solving the ODE system and the usage of pointers and oriented lists inside the procedures. The simplest way of calculating the liquid parameters flowing along the piping system which has tree-type structure is by using non-linear data structure named the 'tree'. The tree starts with the main element named the 'root' and contains a set of other components named the 'branches'. Out of the root, as well as out of a branch, there come 0, 1, or 2 branches named 'children' or 'left branch' and 'right branch'. A branch with no children is called a 'leaf'. The root and branches are characterized each with a specific set of data fields. The latter includes the address of the branch, the addresses of its children, and a set of parameters describing each element of the tree. This set of data is sufficient for performing of different mathematical operations on branches' parameters including data exchange between neighboring branches.

A preferred approach is to use the object-oriented approach to the problem of creating a tree-like data structure and keeping data on the piping system. One preferred data structure includes, for example, the class CPipe for capturing the pipe description parameters. Each pipe is associated with that class object. The class preferably includes pointers of the CPipe type to the left and right pipes (left and right branches of a tree) as well as pipe length, pipe radius, liquid velocity inside the pipe, and some other characteristics of the pipe and its internal flow. Arrays of pipe parameters obtained while the piping system is created within the user interface 22 described above can be the given data for objects initialization of the CPipe type. Therefore, in a tree-like data structure each branch is preferably represented with the CPipe class object.

The procedure for the creation of the binary tree is preferably incarnated in a function, i.e. TreeBuilding( ). The process of dynamic creation of objects describing tree branches and their consecutive initialization takes place in the procedure. Its basic scheme could be reduced to the following algorithm. Consecutive attachment of tree branches takes place within the loop along the pipes. The cycle is continued until the last pipe in the initial data set is attached.

Preferably, the creation starts with searching for the pipe with inlet node of the Supply type in the initial list, i.e. the pipe connected to the water supply. After this initial pipe is identified the object of the CPipe type is dynamically created. The initialization of the object is made with the corresponding parameter values of the pipe identified and with the initial values of the flow parameters (initial values of liquid velocity, nodal pressures, etc.). At the end of the first step of the cycle the name of the first pipe outlet node is defined.

On the second step of the cycle, a search is made for the pipes having an inlet node name equal to the outlet node name of the first pipe i.e., a search for children. Preferably, let the number or quantity of the identified pipes be equal to two. After they've been identified two objects are initialized. Their addresses are assigned to the left and right pointers of the previous object, i.e., transferred to the parent. In case of no children, the corresponding pointer has the 'null' value. At the end of the second step the inlet node name of the right branch is saved, preferably into the name stack. Later on the names contained in the stack are used for the build-up of the crown of the tree from the right branch. At the next step the outlet node name of the left branch is used for searching the pipes whose inlet nodes have the same names. This way the cyclic build-up of the left branch is continued. Its creation is finalized with the pipe having no children. Before switching to the next step of the cycle the last node name placed in the name stack is pushed out and tree creating is continued as described above. The cycle is complete with the pipe having no children and the name stack empty.

For the successful data processing in order to build and analyze a piping system of any tree configuration of or any piping system having at least one loop, it is preferred to have effective algorithms for analyzing the tree by passing from the root toward leaves and backward, i.e., from the source node to liquid fronts and backwards. Thereby, the separation of data abstraction from the processing data abstraction is performed which makes the program structure more comprehensive. See William Ford & William Topp, *Data Structures with C++* (Prentice-Hall International, Inc.). The algorithm of the tree scanning forward is brought about in a function, such as for example, a PreOrderIterator( ) function and backward scanning is brought about in another function such as, for example, a PostOrderIterator( ) function.

Figure 10:
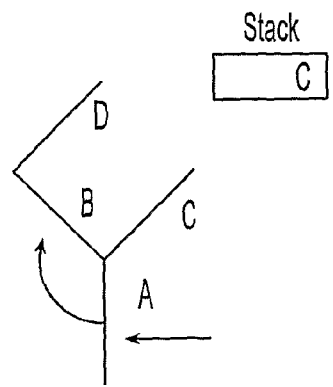
FIGS. 10-10C illustrate a preferred branch algorithm.

The iterative scanning of a tree configuration or a tree within a loop along all branches starting from the root is performed by the preferred function PreOrderIterator( ). Referring to FIG. 10, FIG. 10A, FIG. 10B, and FIG. 10C, the following illustrates the process with a four-branched tree example, although the preferred methodology can be applied to a tree having a branching level of five or more. The first step is shown in FIG. 10. Dealing with A-branch (the root of the tree), the branch address is identified and therefore access to all branch parameters is possible as well as different operations, e.g. saving the branch length into file. Dealing with the right branch is preferably delayed and the C-branch address is saved to stack. The branch address dealt with on the second step is identified. The left branch is handled first, and thus, the next branch processed is the B-branch.

Figure 10A:
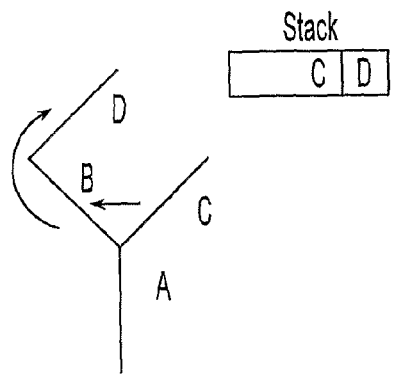

The second step of the process is shown in FIG. 10A beginning with dealing with B-branch. Next the D-branch address is saved to stack, and the B-branch has no left child, and thus, the D-branch address is pushed out of the stack to deal with it on the next step.

Figure 10B:
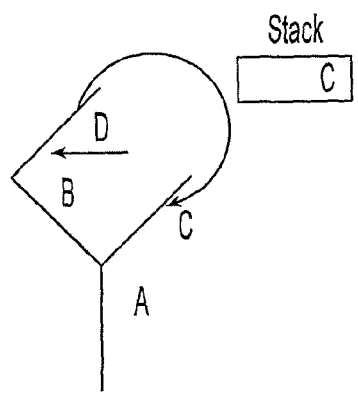

In the third step, shown in FIG. 10B, first begins with dealing with the D-branch. The D-branch has no right branch, and therefore nothing is to be saved. The left branch is absent, and the C-branch address is pushed out of the stack.

Figure 10C:
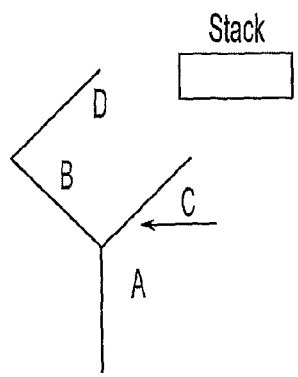

Shown in FIG. 10C is the fourth step, which begins with dealing with the C-branch. There is nothing to save to the stack as no right branch is present. No left branch and stack is empty. Accordingly, the cycle is complete. Thus, within the forward scanning process the tree is scanned from the root to leaves and from left to right. Every branch of the tree is handled only once. In the example described the tree has two leaves and, correspondingly, two paths from the root to leaves. The first path goes along branches A-B-D and the second contains only C-branch as A-branch is already contained in the first path.

The method of backward scanning brought about within function PostOderIterator(CPipe *p) is analogous to the method of forward scanning of a tree though somewhat more complicated. Some notes on that method are as follows. Within the backward scanning the tree is scanned from leaves to the root and from left to right. As with the forward method each branch is handled only once. For the described above case shown on FIGS. 10-10C with the backward passage there are two paths from leaves to the root. The first goes along branches D-B-A and the second contains only C-branch. A-branch is not contained in the second path as it is included in the first one.

The method of backward scanning contributes to simplification of calculations of some parameters of the tree, e.g. volume of the sub-tree located in front of liquid front and filled with gas, e.g., volume of the fraction of a system ahead of a fluid front still filled with gas. Both methods while applied to the piping system could be easily generalized for scanning the volume filled with fluid.

To integrate a system of differential equations the computational engine 24 of the software or computer program 20 preferably contains the specific procedure for the time step adjustment taking into account the peculiarities of fluid movement in pipes. The peculiarities occur in case of a fluid front approaching an open sprinkler or passing a branching point, with locking gas volume with the fluid in closed branches and in some more cases. Implementation of this algorithm in conjunction with Euler method for the integration of systems of differential equations contributes to improved calculation accuracy and helps to avoid exceptions with the calculation process.

The computational engine 24 can be configured so as to include an algorithm for processing the situations with high pressure peak revealing just before fluid starts discharging from the open sprinkler. This procedure was developed for smoothing down pressure peaks while the fluid front is passing a branching point, an open sprinkler and the like. The algorithm preferably accounts for the process of depleting compressed gas from the closed branches into run through pipe, i.e., the main, while the fluid front is moving reversely and passes the branching point from a closed pipe back into a run through pipe.

Once the data representing the physical attributes for the dry pipe system is entered, the computer program preferably builds a model of the dry pipe system that is finally represented by mathematical equations. The model of the dry pipe system allows for the computer program to simulate various time based response characteristics of the dry pipe system such as, for example, trip time, transit time and operating time, during an actuation of any sprinkler head in the piping network using one or more computational engines. Moreover, the preferred embodiments of the program, can provide for modeling dry pipe systems with at least one loop, pumps (e.g., fire pump), one-way valve (e.g., backflow preventer), valve opening accelerator, and sequential fluid deliveries (e.g., consecutive sprinklers actuation) in the system.

Files regarding physical attributes of the system, such as attributes of the pipes, number of nodes, supply, fluid, gases and program parameters, as discussed earlier for a model of a dry pipe system, are prepared in a suitable format for processing. Other processing such as, for example, conversion from English units to SI units is also performed here. Once the data is formatted, the data can be used by one or more computational engines to determine at least one desired physical response of the model such as, for example, a dry pipe valve trip time or fluid transit time.

Preferably, two computational engines 24*a*, 24*b* can be used to solve the transient flow problem for a piping system: for example, the first computational engine 24*a* can be FDTCALC computational engine preferably configured for treetype topology and the second computational engine can be FDTLOOPCALC computational engine preferably configured for a piping system topology containing at least one loop. Regardless of the underlying approaches to solving the fluid and gas flow problem in piping network, the preferred embodiments of the computational engine can provide a correlation of less than 20% between the calculated time parameters and their physically tested analogs.

A description of a preferred theory and program flow for both computational engines 24*a*, 24*b* is provided as follows. It should be noted that for both of the computational engines, the following underlying assumptions in modeling and analyzing an arbitrary dry pipe system are made: (1) the fluid is incompressible; (2) pipes do not suffer deformation; (3) fluid front is perpendicular to pipe centerline; (4) all open sprinklers can be opened simultaneously or alternatively sequenced at different moments in time; (5) the DPV 138 opens instantly only once, while further in addition or alternatively to, the BFP 136 can close/open a few times; (6) the wet portion of the dry piping system preferably will not have any branching points; and (7) the supply curve (i.e., pressure as a function of flow rate) is modeled at 1.85 power with the supply function being defined with an array of points.

The mathematical framework used to solve for the dry pipe valve trip time, transit and operating times as embodied in the computational engines for a user-defined piping system will now be described. The equations for flow properties of the gas and fluid are based on the unsteady Bernoulli Equation for fluid flow, and temperature relaxation equations for gas flow. These equations are used to solve for flow properties in the regions of fluid flow and gas flow in the system at any point in time, with the appropriate boundary, conservation and continuity conditions coupling the equations for fluid and gas. With preferably the same theoretical approach, the computational engines 24*a*, 24*b* simulates reverse flows. They also simulate bubble flow in a branch line containing drops and open sprinkler.

As noted above, fluid flow through pipes can be modeled using the Bernoulli Equation for unsteady flow or the one-dimensional approximation of the impulse balance equation. The general form of the equation expresses the states of the fluid in a pipe at the first and the second endpoints of the fluid. Preferably the first and second endpoints of the fluid are defined by the fluid flow front and the nearest upstream node. As the fluid flow branches, Bernoulli's equation is created for each pipe, containing a moving fluid front, and for an open sprinkler, if any, as the current pipe downstream node. To address each pipe in the system and solve the complete set of system of equations, the preferred object-oriented algorithm previously described is utilized.

Four examples are provided: (1) flow from the water source branching into a cross main and a branch line; (2) flow in a pipe with closed terminal node; (3) flow which splits into three branches; and (4) flow in a pipe with an open sprinkler. The continuity equations for fluid flow rely on mass conservation equations and equations for mass flow through open sprinkler. The equations for gas flow are coupled to the equations for liquid flow by imposing two boundary conditions: the liquid and gas flow rates at the liquid/gas interface are equal and the equations express the pressure of the liquid in terms of gas pressure for either the isentropic or the isothermal gas flow process. The equations governing friction and minor (or local) losses in pipes, and the minor loss parameters for some typical fittings are provided. Accordingly, an overview of the program flow is discussed herein along with a presentation of the equations that can be used with the respective portion of the flow chart and a summary of how the computational engine uses the equations to determine at least the trip time, transit time and pressure of fluid in a model of a dry pipe network.

The computational engines perform a check of the input data to determine whether the model of the dry pipe design is within allowable limits for processing. If the model can be processed, computational engines move on to the next level of processing where a trip time is calculated.

In order to determine whether the flow of gas through the pipes is to be modeled on the assumption of an isentropic case, perfectly insulated surfaces or an isothermal, constant temperature surfaces, the computational engine performs an analysis of the Reynolds number of the gas in the dry pipes to determine a relaxation time for the temperature of the gas and the temperature of the pipe to reach a temperature equilibrium. A length L at which the gas must travel, assuming steady flow, in order to reach the temperature equilibrium (i.e., a "relaxation length") with the pipe is calculated as follows:

$$L = \frac{Re}{R2NuPr} \quad \text{(Eq. 3)}$$

where L is the relaxation length;

R is the radius of the pipe;

Pr is the Prandtl number

Nu is the Nusset number, which has one of the following values:

Nu=3.66 if Re<2300 and Nu=0.023Re$^{0.8}$Pr$^{0.4}$ if Re>2300.

The Reynolds number Re can be calculated with the following formula:

$$Re = \frac{DV}{v} \quad \text{(Eq. 4)}$$

where DV is the product of the velocity of the fluid and the D is the internal pipe diameter and v is the kinematic viscosity of the fluid.

The relaxation length L allows the computational engine to determine the relaxation time τ, i.e., the time at which the temperature of the gas flowing in the pipe reaches equilibrium with the average pipe temperature using the following formula:

τ=L/V  (Eq. 5)

To determine whether the underlying assumption for the modeling of the flow of the gas is an isentropic case or isothermal case, the computational engine decides one or the other based on a threshold value of the relaxation time depending on the actual pipe length and current velocity of gas flow. In the case where the flow is rather slow at a particular segment of a pipe then, at some point of time, gas temperature will equalize with the pipe wall temperature thereby indicating that is an isothermal case. In the case of high velocity gas flow at a particular segment of a pipe then the temperature changes of gas are non-essential as gas quickly flows through the pipe and for numeric purposes the gas temperature changes can be neglected thereby indicating that the process is an isentropic. The computational engine then computes the outflow of gas and velocity of the fluid flowing into the pipe.

Depending on the ratio of internal to ambient pressure, the computational engine relies on the following formulas to determine the mass flow rate of gas after sprinkler is open:

$$\dot{m}_a = A_a P_a \left[ \frac{\gamma}{RT_a} \left(\frac{2}{\gamma+1}\right)^{\frac{\gamma+1}{\gamma-1}} \right]^{\frac{1}{2}} \text{ for } P_\infty/P_a < (\gamma+1/2)^{\gamma/\gamma-1} \quad \text{(Eq. 6)}$$

or $$\dot{m}_a = A_a P_a \left\{ \frac{2\gamma}{RT_a(\gamma-1)} \left[ \left(\frac{P_\infty}{P_a}\right)^{\frac{2}{\gamma}} - \left(\frac{P_\infty}{P_a}\right)^{\frac{\gamma+1}{\gamma}} \right] \right\}^{\frac{1}{2}} \text{ for } P_\infty/P_a \geq \quad \text{(Eq. 7)}$$

$$(\gamma+1/2)^{\gamma/\gamma-1}$$

where $\dot{m}_a$ is the mass flow rate, $P_a$ is the gas pressure before the nozzle, sprinkler head or other open nodal device and $P_\infty$ is the atmospheric pressure, $T_a$ is the gas temperature, $A_a$ is the discharge area, γ the ratio of specific heat at constant pressure versus the specific heat at constant pressure at constant volume, γ=1.4 for 2-atomic gases and R is the gas constant.

To relate the change in pressure, volume and temperature to the mass flow rate of the gas, the following equation is used:

$$\frac{d}{dt}\left[\frac{P_a V_a}{RT_a}\right] = -\dot{m}_a \quad \text{(Eq. 8)}$$

where $V_a$ is the total volume of gas in the system.

To relate the change in mass flow rate $\dot{m}_a$ to pressure, velocity, density, and cross-sectional area, the following equation is used:

$$\dot{m}_a = \rho vS = \frac{P_a}{RT_a} vS, \quad \text{(Eq. 9)}$$

where S is the cross sectional area of the pipe. In (Eq. 8) and (Eq. 9):

$$R = \frac{R^*}{M},$$

where R*=8134 [J/K/kmol]=the universal gas constant; M[kg/kmol]=molecular weight.

The velocity of gas in the piping can be determined by the following relation between mass flow rate $\dot{m}_a$ and the following formula (by simplification): (applied for (Eq. 6) only)

$$v = \sqrt{\gamma RT_a} \frac{S_a}{S} \sqrt{(2/(\gamma+1))^{(\gamma+1)/(\gamma-1)}} \quad \text{(Eq. 10)}$$

$$= v_s \frac{S_a}{S} \sqrt{(2/(\gamma+1))^{(\gamma+1)/(\gamma+1)}}$$

$$= 0.579 v_s \frac{S_a}{S},$$

where v=the velocity of gas flow in piping;

$v_s$=the speed of sound through the gas;

$S_a$=the area of opening to the outside ambient;

S=the cross section area of gas flow inside the pipe.

The highest gas flow velocities are in least size pipes, i.e. in sprigs or drops. The ratio between sprig/drop diameter and the open head device diameter, such as for example, a sprinkler head or nozzle, is preferably higher than 2. In this case the maximum gas velocity is 7 times less than the speed of sound through the medium. Therefore, the difference in parameters of density, pressure, and temperature between the stagnation gas and the moving gas, which is proportional to squared Mach number, is not more than 2%. Hence, equations (Eq. 6), (Eq. 7) are appropriate for the calculations of gas pressure in typical dry pipe sprinkler systems with the accuracy of not worse than 2%.

Before the dry pipe valve trips, the internal gas pressure changes are described as follows:

$$\frac{dP_a}{dt} = -\frac{\dot{m}_a R T_a^o}{V_a} \gamma_1 (P_a/P_a^o)^{\frac{\gamma_1-1}{\gamma_1}}, \quad \text{(Eq. 11)}$$

where $P_a^o$ and $T_a^o$=gas pressure and temperature respectively at the moment of sprinkler opening;
$\gamma_1=\gamma$ for isentropic gas movement in the piping system,
$\gamma_1=1$ for isothermal gas movement.
In Eq. 6 and Eq. 7:

$$T_a = T_a^o (P_a/P_a^o)^{\frac{\gamma_1-1}{\gamma_1}}, \quad \text{(Eq. 12)}$$

where $P_a^o$ and $T_a^o$—pressure and temperature of a gas at the time of sprinkler opens.

After the dry pipe valve trips, the gas pressure in the part of the piping filled with gas is described by the following equation:

$$\frac{dP_a}{dt} = -\frac{\dot{m}_a R T_a^o}{V_a} \gamma_1 (P_a/P_a^o)^{\frac{\gamma_1-1}{\gamma_1}} - \gamma_1 \frac{P_a}{V_a} \frac{\partial V_a}{\partial t}, \quad \text{(Eq. 13)}$$

The mass $\dot{m}$ in (Eq. 13) is presumed constant. A generalization of formula (Eq. 13) was developed where the fluctuation of the trapped gas mass $\dot{m}$ was taken into account. The first right hand component describes gas pressure loss due to depletion through open nozzles, sprinkler heads or other open nodal devices. The second right hand component contains the derivative of internal piping system volume over time, which is caused by the movement of front of the liquid. Equation (Eq. 13) is solved in combination with Equations (Eq. 6), (Eq. 7), and (Eq. 12).

As gas and fluid move through the dry pipe system, frictional, hydraulic and minor losses must be accounted for in the nodes and pipes at every point in time, and thus, in a preferred embodiment, the losses calculations described herein are constantly updated as gas, gas with fluid and fluid moves through the model of the dry pipe system. The computational engine can apply the following formulas considering these losses between, for example, an arbitrary section 1 and section 2 of a pipe segment as described below.

$$\frac{L_{12}}{g}\frac{\partial V}{\partial t} + H_2 = H_1 - \Delta H_{12} \quad \text{(Eq. 14)}$$

where V is the fluid velocity, $H_1$ and $H_2$ are the specific head loss at cross sections 1 and 2,
$L_{12}$ is the length of the segment between points 1 and 2,
$\Delta H_{12}$—losses between points 1 and 2 on the pipe.

The loss term in (Eq. 14) can be written as a superposition of the fitting or minor loss, "fit" and loss over the pipe's length "fr" to provide the following equations $$\Delta H_{12} = \Delta H_{12}^{fr} + \Delta H_{12}^{fit} \quad \text{(Eq. 15)}$$

$$\Delta H_{12}^{fr} = f \frac{L_{12}}{D} \frac{V^2}{2g}, \quad \text{(Eq. 16)}$$

where D is the pipe diameter, and
f—Darcy-Weisbach friction factor.

$$f = \frac{64}{Re},$$

for laminar liquid flow where Re is the Reynolds number from (Eq. 4) above The friction factor for turbulent flow can be determined by using any one of the following three empirical formulas:

Chen Formula:

$$f = \left(-2.0\log\left\{\frac{\varepsilon}{3.7065D} - \frac{5.0452}{Re}\log\left[\frac{1}{2.8257}\left(\frac{\varepsilon}{d}\right)^{1.1098} + \frac{5.8506}{Re^{0.8981}}\right]\right\}\right)^{-2}; \quad \text{(Eq. 17)}$$

Churchill Formula:

$$f = 8\left[\left(\frac{8}{Re}\right)^{12} + \frac{1}{(B+C)^{1.5}}\right]^{1/12}, \quad \text{(Eq. 18a)}$$

$$B = \left(2.457\ln\frac{1}{(7/Re)^{0.9} + (0.27\varepsilon/D)}\right)^{16}, \quad \text{(Eq. 18b)}$$

$$C = \left(\frac{37530}{Re}\right)^{16}; \quad \text{(Eq. 18c)}$$

Haaland Equation:

$$f = \left[-0.782\ln\left\{\frac{6.9}{Re} + \left(\frac{\varepsilon}{3.7D}\right)^{1.11}\right\}\right]^{-2}. \quad \text{(Eq. 19)}$$

Minor losses such as fitting losses at valves are computed using loss coefficient's K for the standard valve types. Fitting losses at valves are computed by the computational engine using loss coefficient's K for the standard valve types as given in the following Table 1 in combination with the following formula for valves.

$$\Delta p = K \frac{\rho V^2}{2}. \quad \text{(Eq. 20)}$$

TABLE 1

Loss coefficient K for various fittings

| Fitting | K |
|---|---|
| Well rounded inlet | 0.05 |
| 90° elbow, threaded | |
| Regular | 1.4 |
| Long radius | 0.75 |
| 90° elbow, flanged | |
| Regular | 0.31 |
| Long radius | 0.22 |
| 45° elbow, threaded, regular | 0.35 |
| 45° elbow, flanged, regular | 0.17 |
| Return bend, threaded, regular | 1.5 |
| Return bend, flanged | |
| Regular | 0.3 |
| Long radius | 0.2 |
| T-joint, threaded | |
| Through flow | 0.9 |
| Branch flow | 1.9 |
| T-joint, flanged | |
| Through flow | 0.14 |
| Branch flow | 0.69 |
| Sudden expansion | |
| $d_1/d_2 = 0.5$ | 0.75 |
| $d_1/d_2 = 0.7$ | 0.51 |
| $d_1/d_2 = 0.9$ | 0.19 |
| Sudden contraction | |
| $d_2/d_1 = 0.5$ | 0.3 |
| $d_2/d_1 = 0.7$ | 0.2 |
| $d_2/d_1 = 0.9$ | 0.1 |

Preferably, for fire protection applications, the following formula is used for pressure losses at fittings:

$$\Delta p = f \frac{\Delta l}{D} \frac{\rho V^2}{2}, \quad \text{(Eq. 21)}$$

where $\Delta l$ is the Equivalent Pipe Length of fitting or valve and is taken from manufacturer's listings.

Fitting losses in equation (Eq. 15) can be calculated as $$\Delta H_{12}^{fit} = \sum_{i=1}^{N} f_i \frac{\Delta l_i}{D_i} \frac{V^2}{2g}, \quad \text{(Eq. 22)}$$

where N is the number of fittings between points 1 and 2 of the pipe.

To determine the initial velocity of the liquid at a node, the computational engine considers the type of flow from a supply through a pipe having generally linear segments AB, BC towards a position x on the segment BC towards a node with two branches Ci, CD with branch CD flowing towards a three-branch node with branch $D_m$, $D_F$, and $D_n$. That is, the computational engine considers the following conditions of fluid moving through a pipe with a gas in the pipe: (1) no branching flow; (2) flow towards two branches; and (3) flow towards three branches. Furthermore, for any of these three types of equations, there are two modifications to each of the three—gas ahead of liquid front is entrapped in closed volume or is depleted through the opening somewhere downstream of the flow.

For the first case, the computation engine relies on modeling fluid flow between a pipe segment AB to a pipe segment BC based on a variation of the known Bernoulli equation as follows.

$$\frac{L_B}{g} \frac{dv_B}{dt} + H_B = H_0 - R_{B-X}, \quad \text{(Eq. 23)}$$

where $v_B$ is the velocity in the pipe AB,
$H_B$ is the head loss in the node B in pipe segment AB, and
$R_{B-x}$ is the losses between segment B and x within segment BC.

For pipe segment BC:

$$\frac{x}{g} \frac{dv_x}{dt} + H_x = H_B - R_{x-B}, \quad \text{(Eq. 24)}$$

where x is the length of pipe filled with water,
$H_x$ is the head in the node BC,
$R_{x-B}$ are the losses.

The value x can be determined by the computational engine from the equation $$\frac{dx}{dt} = v_x \quad \text{(Eq. 25)}$$

The velocities in pipes AB and BC are related by:

$$v_B S_B = v_x S_C, \quad \text{(Eq. 26)}$$

where $S_B$ is the cross sectional area of the pipe AB, and
$S_C$ is the cross-sectional area of pipe BC.

In the system of equations (Eq. 23)-(Eq. 26), the unknowns are as follows: velocities $v_B$, $v_x$, pressure $p_B$ and fluid length x. Commercially available mathematical routines have been employed to determine an approximate solution. One example of such mathematical routine is available from the Microsoft® IMSL MATH/LIBRARY and known as the DASPG routine. Preferably, by using the DASPG routine, the computational engine can find an approximation to the solution of differential and algebraic equations with given initial data, while attempting to keep error below a set value.

For the case of fluid flowing towards two branches, fluid flowing from a pipe segment BC to a node having two branches CD and Ci, can be described with equation (Eq. 23), where x is equal to length of pipe BC:

$$\frac{L_C}{g} \frac{dv_C}{dt} + H_C = H_B - R_{C-B}, \quad \text{(Eq. 27)}$$

where $H_c$ is the head in pipe BC at node C,
$v_c$ is the velocity of fluid in pipe BC.

To describe the filling of branch pipe CD with fluid, the following equations are used:

$$\frac{x}{g} \frac{dv_x}{dt} + H_x = H_C - R_{i-C} \quad \text{(Eq. 28)}$$

-continued $$\frac{dx}{dt} = v_x, \quad (Eq. 29)$$

where x is the distance from C to fluid front in pipe CD.

Similarly, for the branch Ci, the computational engine uses the following:

$$\frac{y}{g}\frac{dv_y}{dt} + H_y = H_C - R_{y-C} \quad (Eq. 30)$$

$$\frac{dy}{dt} = v_y, \quad (Eq. 31)$$

where y is the distance from C to liquid flow front in the pipe Ci.

For the system of algebraic equations (Eq. 27)-(Eq. 29), a continuity equation can be used to link the flow of fluid into and out of the nodes:

$$v_C S_C = v_x S_D + v_y S_i \quad (Eq. 32)$$

where $S_D$ is the cross sectional area of the pipe segment CD, and $S_i$ is the cross-sectional area of the pipe segment Ci.

In the system of equations (Eq. 23), and (Eq. 25)-(Eq. 32) there are eight unknown variables: liquid velocities $v_B$, $v_C$, $v_x$, $v_y$, pressures in nodes pB, pC and location of fluid fronts x, y. Gas pressure in the closed pipe can be calculated by the equation:

$$p_y = p_i(0)\left(\frac{L_i}{L_i - y}\right)^{\gamma_1}, \quad (Eq. 33)$$

where $p_c(0)$ is the gas pressure at the moment of fluid front passing the node C, $L_i$ is the length of pipe Ci, $\gamma_i$ is a variable, which, depending on the relaxation time, is equal to $\gamma$ or 1 for isentropic or isothermal case, respectively.

If the variables x=y=0 in equations (Eq. 28) and (Eq. 30), then $h_i=h_D=h_C$ and $p_i=p_D$ and the following formula can be obtained:

$$v_D^2\left(1 + f_D \frac{\Delta l_D}{D_D}\right) = v_i^2\left(1 + f_i \frac{\Delta l_i}{D_i}\right), \quad (Eq. 34)$$

Equation (Eq. 34) together with equation (Eq. 32) creates algebraic system of equations for calculating initial velocities $v_D$ and $v_i$ based on velocity $v_C$.

For the third case of fluid flowing from a pipe segment CD into a node having three branches $D_m$, $D_F$, and $D_n$, the computational engine can rely upon the following formula, using the same nomenclatures as the first two cases:

$$\frac{L_D}{g}\frac{dv_D}{dt} + H_D = H_C - R_{D-C} \quad (Eq. 35)$$

$$\frac{x}{g}\frac{dv_x}{dt} + H_x = H_D - R_{x-D} \quad (Eq. 36)$$

$$\frac{dx}{dt} = v_x \quad (Eq. 37)$$

$$\frac{y}{g}\frac{dv_y}{dt} + H_y = H_D - R_{y-D} \quad (Eq. 38)$$

$$\frac{dy}{dt} = v_y \quad (Eq. 39)$$

$$\frac{z}{g}\frac{dv_z}{dt} + H_z = H_D - R_{z-D} \quad (Eq. 40)$$

$$\frac{dz}{dt} = v_z, \quad (Eq. 41)$$

where x, y, z are the respective distances from D to fluid fronts in pipes Dm, DF, and Dn.

The computational engine can rely upon a continuity equation to link the flow of fluid towards and outwards of the nodes:

$$v_D S_D = v_y S_m + v_x S_F + v_z S_n \quad (Eq. 42)$$

Gas pressure $p_m$, $p_F$, $p_n$ in pipes $D_m$, $D_F$, and $D_n$ can be found from the solution of equation (Eq. 33). Liquid flow can be described by the system of equations (Eq. 23), (Eq. 26)-(Eq. 29), and (Eq. 32)-(Eq. 42). Initial values for velocities in pipes $D_m$, $D_F$, and $D_n$ can be calculated from equations (Eq. 36), (Eq. 38), and (Eq. 40). Using the following equation, the computational engine can generate system of algebraic equations for calculating initial values of velocities $v_m$, $v_F$ and $v_n$ with a given value of $v_D$.

$$v_m^2\left(1 + f_m \frac{\Delta l_m}{D_m}\right) = v_F^2\left(1 + f_F \frac{\Delta l_F}{D_F}\right) = v_n^2\left(1 + f_n \frac{\Delta l_n}{D_n}\right), \quad (Eq. 43)$$

where $f_D$, $f_i$, $f_m$, $f_F$, $f_n$, are Friction coefficient in the respective branches, $\Delta l_D$, $\Delta l_i$, $\Delta l_m$, $\Delta l_F$, $\Delta l_n$, each represents length of respective pipe fraction filled with liquid, and $D_D$, $D_i$, $D_m$, $D_F$, $D_n$, each represents respective internal pipe diameter.

Consequently, the one or more computation engines, such as for example, computational engine 24 formulates the system of equations to determine flow properties, the coordinate of the fluid flow, and the response of the gas and liquid at any point in time as determined earlier in prior processes by relying on suitable mathematical routines such as, for example, Microsoft® DASPG. The routine DASPG relates system variables with the variables of the mathematical routine and provides approximate solution within a user defined error tolerance. Thus, the computational engine determines the interaction between the fluid moving into the dry pipe system and the removal of gas from the pipe system towards the ambient medium.

To further account for the effects of the interaction between gas and liquid, i.e., the generation of bubbles during the transient duration after the sprinkler trip and before full fluid flow, the computational engine can compute the velocity of the bubbles in the system by first classifying the basic forms of gas-emulsion mixtures in horizontal and sloped pipes are as follows: (i) Bubble form, where separate bubbles are moving along the top of the pipe with slow velocities and low gas concentration; (ii) Laminated form, where liquid and gas layers are moving along, having flat or waving boundary with slow velocities and medium gas concentration; (iii) Slug Flow, where there is an alternation of gas and liquid plungers; (iv) Dispersed Slug Flow form, where there is and alternation of gas plungers containing tiny liquid drops and liquid plungers containing tiny gas bubbles; (v) Dispersed form, where there is rather even distribution of gas bubbles in entire liquid flow with high velocities and low gas concentration; and (vi) Film-dispersed (circular) form, where gas is moving in jet form in the vicinity of pipe centerline and liquid is moving partly in the film form along the pipe wall and partly in the drop form within the gas medium with high gas concentration and very high velocities.

For the purpose of accounting for bubble velocity, the entire variety of gas-emulsion mixtures is classified into three forms: separated, intermittent, and dispersible. The characteristic parameter for the form of a mixture is the Kutateladze number "K":

$$K = \left[\frac{Fr\rho}{We\Delta\rho}\right]^{1/4} = \frac{U\rho^{1/2}}{(g\sigma\Delta\rho)^{1/4}} \qquad \text{(Eq. 44)}$$

where $\rho$ is the density of liquid;
U is the velocity of bubbles;
$\Delta\rho$ is the difference in the gas and liquid densities; and
Fr is the Froude number.

The Froude number, which characterizes the tendency of the mixture to separation, is given by $$Fr = \frac{U^2}{gD}, \qquad \text{(Eq. 45)}$$

The computational engine also considers the Weber (We) number, which characterizes the tendency of the mixture to get dispersed.

$$We = \sigma/\rho U^2 D \qquad \text{(Eq. 46)}$$

where $\sigma$=coefficient of surface tension,
U is the bubble velocity, and
D is the diameter of the pipe.

For the Slug flow and Dispersed slug flow forms of flows the velocity of gas phase in the ascending and descending pipes is described as follows:

$$v_g{}^0 = v(1 \pm |1.62\lambda\Psi + 2.15\delta/K^2|^{0.5}), \qquad \text{(Eq. 47)}$$

where v—velocity of the mixture, $$\psi = 1 + \frac{\beta_g}{(1-\beta_g)K},$$

$\delta$=$-$1 for descending pipes;
$\delta$=0 for horizontal pipes;
$\delta$=+1 for ascending pipes;
Negative sign is for $1.6\lambda\Psi + 2.15\delta/K^2 < 0$;
$\lambda$, $\beta_g$ are empirical coefficients;
$v_g{}^0 = 1.18v/K$,
$v_g{}^0 = v_g{}^0|\sin(\theta)|^{1/4}$.
$v_g = v(1 \pm \sqrt{a})$,
$a = 1.6\lambda\Psi + 2.15b/K^2$,
$b = c + (1-c)\sqrt{|\sin\theta|}/2.15$,
$c = 1/[1+\exp((K-\sqrt{f})/0.31\sqrt{f})]$.

For turbulent flow, average bubble diameter d is described in the following formula:

$$\frac{d}{D} = \frac{1.4We^{0.6}}{(1-\varphi)(1-0.863\varphi M^{0.15})^{0.4}}, \qquad \text{(Eq. 48)}$$

where D is the pipe diameter;

$\phi$ is the relative ratio of gas phase; and $$M = \frac{\mu^5 U^3}{D\rho\sigma^4}, \qquad \text{(Eq. 49)}$$

where $\mu$ is the dynamic viscosity of the liquid phase.

Thus, bubbles velocity in vertical pipes can be determined as follows:

$$V_V = 0.351\sqrt{gD} \qquad \text{(Eq. 50)}$$

For sloped or inclined pipes $$Fr = Fr_H \cos\theta + Fr_V \sin\theta + Q, \qquad \text{(Eq. 51)}$$

where $\theta$ is the angle of elevation or tilting angle, and $Fr_H$ and $Fr_V$ are Froude Numbers, for horizontal and vertical pipes, respectively, such that $$Q=0 \text{ if } Fr_H > Fr_V, \qquad \text{(Eq. 52)}$$

$$Q=1.37(Fr_V - Fr_H)^{2/3} \sin\theta(1-\sin\theta) \text{ if } Fr_H < Fr_V. \qquad \text{(Eq. 53)}$$

From equations (Eq. 51) to (Eq. 53), the Froude number can be determined and applied to the following equation so that the bubble velocity U can be determined.

$$Fr = \sqrt{\frac{U^2}{gD}}, \qquad \text{(Eq. 54)}$$

In order to determine the dry pipe valve trip time and the transient time, the computational engine determines the appropriate equations representing the physical attributes of the dry pipe system. With the appropriate equations set up as presented earlier, the program begins solving for the equations of motion of the gas inside the pipe at the moment the dry pipe valve trip to determine the trip time by iteratively solving for the equations of motion of the gas and the changes in gas pressure as the gas escapes through the system over intervals of time. At each time interval during the calculation for trip time, the computational engine accounts for frictional and other losses as the gas escapes from the pipes through one or more opened sprinkler heads. The solutions to these equations of motion of the fluid are then utilized to determine dry pipe valve trip time, transit time and other results relating to flow velocity and pressure.

Thus, the equations were solved to provide time-based solutions to these equations, which in turn, provided for coordinates of the fluid flow front, fluid flow front velocity and changes in pressure. These results can then be provided to output files, which are implemented or translated in a graphical format, such as for example, as shown in FIG. 7 or FIG. 7B.

Referring again to FIG. 4, the system with loop topology necessarily contains nodes merging two flows into one, however the very merging node is not known a priori but rather is defined dynamically. The computer program 20, 20' can be configured with an algorithm to make calculations for modeled systems 100 containing one or more loops. Accordingly, the computational engine 24 can be configured to determine whether the piping system has a tree-type topology or contains at least one loop. Systems with at least one loop are preferably processed on the basis of that of tree-type topologies. If there is at least one loop within a system it is broken in one of the nodes along the loop and the system is turned into a tree. Breaking the loop at a node (the breaking node) means that one of the pipes connected is detached from the node and additional (terminal) node is created. For clarity it could be conceived that the detachment is performed through vanishing small shortening of the detaching pipe.

In the preferred method of looped system processing it is supposed that liquid fronts in the loop do locate at different sides relatively to the breaking node. If a liquid front approaches the breaking node the latter is relocated and a new tree is created. If both fronts enter the same pipe the latter is divided in two in a way that the fronts should be located at both sides of the breaking node. These transforms are performed up to a moment when a bubble enters open-ended piping, i.e., open to ambient.

In formulating the system of equations, the unknown variables deemed to be calculated are the velocity and the acceleration of liquid in every pipe filled with liquid entirely or partially, the coordinates of fronts, and gas pressure values ahead of fronts in open-ended piping. For pipes with fronts, i.e. filled with liquid partially, the Bernoulli equation is created which bounds liquid front parameters with the ones at the end of the parental pipe (relatively to the pipe under consideration). For pipes entirely filled with liquid the balance equation is created for the node which states that the cumulative inlet flow equals to the cumulative outlet flow. The pressure value upon the liquid front in an open-ended piping is calculated on the basis of the equation of the compressed gas depletion from a definite volume out to the atmosphere. The overall number of equations are: ne=n_finish+n_fronts+ n_open_fronts, where n_finish=the number of pipes filled with liquid either entirely or partially; n_fronts=overall number of liquid fronts in closed or open-ended piping; n_open_fronts=number of liquid fronts in open-ended piping. Up to the bubble emerging moment, i.e. while gas located between liquid fronts is capable to deplete through open-ended piping, the filling up process is performed exactly the same way as for a tree-type topology. The only difference is that pressure values upon liquid fronts along the loop are equal. As in the case of a real tree system the mentioned pressure value is calculated with the equation of gas depletion from the enclosure of variable capacity. After liquid has locked gas depletion into the open-ended piping, i.e. after a bubble has created, pressure value upon the bubble fronts (which is the bubble internal pressure) is defined through the pressure value and volume of the bubble at the moment of its enclosing and its current volume.

Preferably, the following manipulations are performed on pipes with liquid fronts. The pitch is calculated for a given pipe being considered. The elevation of the starting node (i.e. the parent node elevation) is calculated $z_0$ as well as the front elevation $z_f$. Friction losses in the pipe are calculated. Further, the pressure value upstream of the pipe starting node $P_0$, is calculated, i.e. the pressure value at the end of the parental pipe. From the array of velocities to be calculated, the parental pipe velocity $v_0$ is selected. The front is identified to be located inside open-ended or dead-end piping (sealed from ambient). If the front is located in a dead-end piping the current dry volume ahead of the front is calculated. Afterwards, using the pressure value and dry volume at the moment when liquid front has entered the pipe, the pressure values ahead of the front is calculated.

If the front locates in an open-ended piping the cumulative area of openings which are envisaged from the front under consideration is calculated. The pressure value upon the liquid front is calculated using the equation for gas depletion considering the volume to be variable. If liquid fronts are located within a loop the following is performed. The volume of dry piping between both fronts in the loop is calculated.

First, the dry piping volume is calculated for pipes where it is possible to reach liquid front along the loop. The pipes with liquid fronts are considered too. Then the pipes volume filled with liquid are subtracted. Thus, the current gas volume between the liquid fronts is obtained. If one or both liquid fronts are located in an open-ended piping then the openings area and velocity of dry volume changing ahead of each front are calculated. The pressure value ahead of each front of a bubble is calculated through the same equation for gas depletion considering the volume to be variable. Accordingly, the pressure values upon both liquid fronts are equal. Further, when the bubble is no longer in contact with open-ended piping, in order to calculate pressure value in the bubble, the dry volume between liquid fronts and the pressure value at the moment the bubble has been locked out of the open-ended piping are used. Based on the mentioned values and the current gas volume in the bubble, the internal bubble pressure can be calculated which is the pressure upon liquid fronts.

The equation describing liquid front motion in a pipe is as follows:

$$P_0/\rho g + z_0 + v_0^2/2g = \text{sign}(v)v^2/2g[f(x+l_{\textit{eff\_begin}})/d] + xa/g + P_f/\rho g + z_f + v^2/2g \quad \text{(Eq. 55)}$$

where $P_0$=pressure at the end of the parental pipe upstream of the node connecting the current pipe with the parental one;

$v_0$=liquid velocity in the parental pipe;

$\rho$=liquid density;

g=gravity acceleration;

$z_0$=elevation value of the node connecting the current pipe with the parental one;

v=liquid (and liquid front) velocity in the pipe under consideration;

f=friction coefficient;

x=the length of the pipe fraction filled with liquid;

$l_{\textit{eff\_begin}}$=the fraction of the pipe effective length describing inlet resistance for the pipe which the bubble is depleted from;

d=pipe diameter;

a=liquid (and liquid front) acceleration in the pipe under consideration;

$P_f$=pressure upon the liquid front;

$z_f$=liquid front elevation;

To describe the bubble exiting into the open-ended piping and its possible fragmentation, a model has been developed to approximate system behavior for such conditions. In the preferred embodiment, the gas is not considered to be coming into the open-ended piping. Instead, it is considered that the water volume equal to the bubble gas volume enters the open-ended piping.

A case providing the depleting of the fore front of the bubble from a loop, equation (Eq. 55) binding the fore front with the exiting node. While the fore front approaches the exiting node the length of the pipe fraction filled with liquid x diminishes and at the very exit moment x=0 and $z_f = z_0$.

At the exit moment the pressure values upon the front and at the exiting node are bound with the expression as follows:

$$P_{exit}/\rho g + v_{exit}^2/2g = \text{sign}(v_{back})v_{back}^2/2g[f(l_{\textit{eff\_begin}})/d] + P_{bubble}/\rho g + v_{back}^2/2g, \quad \text{(Eq. 56)}$$

where $P_{bubble}$=pressure upon the liquid front equal to the bubble internal pressure; $P_{exit}$=pressure value at the end of the parental pipe upstream the exiting node; $v_{exit}$=liquid velocity in the parental pipe; $v_{back}$=fore front velocity; lower index "back" means reverse motion when filled pipe fraction length x diminishes.

The main assumption of the model is that gas does not enter open-ended piping. Instead, liquid enters open-ended piping having velocity $v_{back}$. It is assumed that this velocity is regulated by equation (Eq. 56) not only at the moment when the fore front reaches the exiting node but also after the mentioned moment. Although this assumption does not have a rigorous proof, it becomes correct while approaching the steady state mode and could be considered as some interpolation of system behavior at the beginning stages of bubble exiting. At the same time it is assumed that the bubble fore boundary continues its movement in the same pipe with velocity $v_{back}$ toward negative x values.

Regarding the depletion process of the rear front of the bubble from a loop. It is assumed that the front is located in the same pipe connected to the exit node which the fore front has already left. As the methods of processing systems with a loop based on ideas for the tree-type structure processing are used here this leads to the opposite orientation of the pipe within the rear front description as compared to the fore front description. In other words, the exiting node for the given case is not the starting but the ending node and the pipe opposite end node is the parental one which differs from the exiting node.

While the rear front has not reached the exiting node the equation for the rear front movement is as follows:

$$P_*/\rho g + z_* + v_*^2/2g = \text{sign}(v_{forw})v_{forw}^2/2g[f(x+l_{\textit{eff\_end}})/d] + xa_{forw}/g + P_{bubble}/\rho g + z_j + \mu_{forw}^2/2g \quad \text{(Eq. 57)}$$

where $P_*$=pressure at the end of parental pipe upstream the node connecting the parental and the pipe at consideration; $v_*$=liquid velocity in the parental pipe; $z_*$=elevation for the node connecting the parental and the given pipe; $v_{forw}$=liquid (and front) velocity in the given pipe; lower index "forw" means forward motion where pipe fraction length filled with liquid x is increased; $a_{forw}$=liquid and front acceleration in the given pipe;

$$l_{\textit{eff\_end}} = l_{\textit{eff}} - l_{\textit{eff\_begin}};$$

$l_{\textit{eff}}$=pipe effective length the bubble emits from.

Starting from the moment when the rear front reaches the exiting node, i.e. the moment when x=L, the equation (Eq. 57) is reformulated as follows:

$$P_*/\rho g + z_* + v_*^2/2g = \text{sign}(v_{forw})v_{forw}^2/2g[f(L+l_{\textit{eff\_end}})/d] + La_{forw}/g + P_{bubble}/\rho g + z_{exit} + v_{forw}^2/2g \quad \text{(Eq. 58)}$$

where L=geometric length of the pipe emitting the bubble. This is the equation for liquid velocity in the pipe emitting a bubble. As before, it's assumed that liquid enters the open-end piping with the $v_{back}$ velocity. The bubble rear front is assumed to be moving in the same pipe with the $v_{forw}$ velocity towards the values x>L. The location of bubble fronts is necessary to distinguish for its volume as well as its fronts pressure value.

While approaching steady state mode the acceleration $a_{forw}$ tends to zero value and velocities $v_{forw}$ and $v_{back}$ tend to constant values. Internal bubble pressure $P_{bubble}$ also tends to a constant value. The latter means that distance between liquid fronts does not vary, therefore the constant velocities $v_{forw}$ and $v_{back}$ have to be equal in absolute value and opposite in direction or sign. Considering this and using (Eq. 56) the following is derived:

$$P_{bubble}/\rho g + v_{forw}^2/2g = P_{exit}/\rho g + v_{exit}^2/2g - \text{sign}(v_{back})v_{back}^2/2g[f(l_{\textit{eff\_begin}})/d] \quad \text{(Eq. 59)}$$

And substituting (Eq. 59) into (Eq. 58) we arrive at:

$$\begin{aligned}P_*/\rho g + z_* + v_*^2/2g = \\ \text{sign}(v_{forw})v_{forw}^2/2g[f(L+l_{\textit{eff\_end}})/d] + z_{exit} + P_{exit}/\rho g + \\ v_{exit}^2/2g + \text{sign}(v_{forw})v_{forwk}^2/2g[f(l_{\textit{eff\_begin}})/d],\end{aligned} \quad \text{(Eq. 60)}$$

or $$P_* + \rho g + z_* + v_*^2/2g = \text{sign}(v_{forw})v_{forw}^2/2g[f(L+l_{\textit{eff}})/d] + z_{exit} + P_{exit}/\rho g + v_{exit}^2/2g. \quad \text{(Eq. 61)}$$

Equation (Eq. 61) is the Bernoulli equation for the steady state flow in a pipe entirely filled with liquid. Therefore, the model describes correctly the bubble motion in a pipe up to the beginning of its exiting into open-ended piping as well as it describes correctly the final stage of motion which is the transforming into the steady state mode. Within the intermediate stage the model provides the smooth lacing between these two accurately described ultimate processes. The loop handling algorithm can include the following steps.

(i) Loop detection. The module is based on the generalized queue algorithm. After modification, on each step of the queue replenishment the code analyzes whether the pipe was included to the list repeatedly. On the repetition detection the code marks the number of the corresponding pipe and uses this mark within next processing stages. After second repetition detection (that means the presence of at least two loops in the system) the code outputs corresponding message and stops its execution.

(ii) "Children-parents" hierarchy building. Due to presence of a loop, fluid can enter some of the pipes from arbitrary edge. This means that in presence of the loop one could not a priori build "children-parents" hierarchy for the whole piping system, which was used as a basis of general tree calculation algorithm. Instead of the a priori "children-parents" hierarchy the calculating engine 24 can use "current" hierarchy that is built as the piping system is filled by fluid. For these purposes on the stage of topology analysis the code marks for each pipe k its adjoining pipes designated as RELATIVES(k). When fluid enters the pipe k corresponding pipe-parents (DAD(k)), and the pipe, which has the common parent with k (BROTHER(k)). Then the pipes-children (KIDS(k)) are determined by exclusion pipes DAD(k) and BROTHER(k) from the subset RELATIVES(k). Then the standard queue is built and the algorithm for general tree topology is used.

(iii) Determination of gas volume ahead of the front, the status of this volume (Open/Closed) and total area of discharge orifice. For the system of tree-topology, the total gas volume ahead of the front, corresponding to the moment of fluid entering into the pipe, can be calculated a priori. In a system with a loop, this volume depends on the order of pipes being filled with fluid and it has to be determined in the process of system computation. For this purpose, the additional queue is created. It contains the numbers of empty and partially filled pipes that determine the volumes ahead of the fronts for partially filled pipes. If any of these pipes includes open sprinkler, the gas pressure ahead of the front is calculated on the basis of the algorithm, i.e., the Open Line algorithm previously described with regard to open-ended pipe.

(iv) Modernization of the algorithm for calculation of gas pressure ahead of the liquid front. For tree-type topology, the gas pressure variations ahead of the fronts can depend upon the coordinates and velocity of single fluid front. For the piping system with a loop this variation can depend upon the coordinates and velocities of two adjoined fronts. Another preferred algorithm accounting for given peculiarities can be provided. In addition, in the piping system with a loop there could be a situation when liquid in the connected pipe shuts the pass (access) to an open sprinkler. So the open/close status of gas volume ahead of the front can be changed at any time moment, causing the corresponding change of calculation algorithm. The algorithm can provide automatic realignment for such situations.

Figure 11:
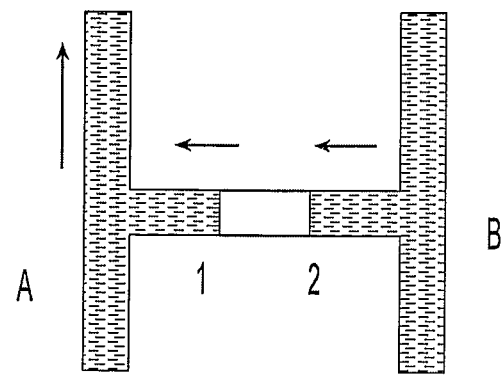
FIGS. 11 and 11A illustrate a preferred loop modeling algorithm.
Figure 11A:
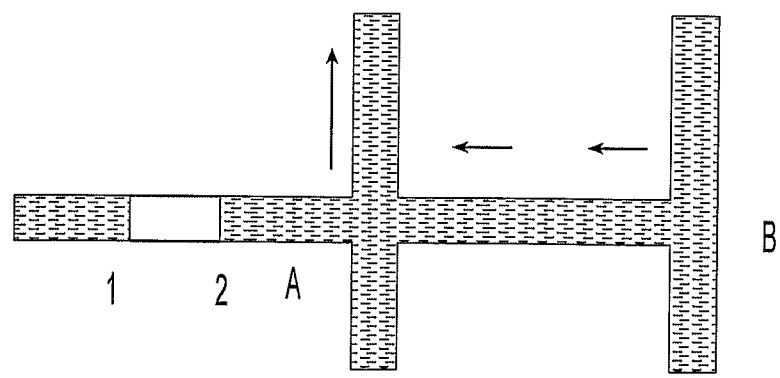

The above-described algorithm is preferably used to deal with the case where gas trapped between two adjacent liquid fronts is depleted into a run-through path. Essentially, it includes the following scenario. Shown in FIG. 11 is gas trapped between adjacent liquid fronts (1 and 2). Then it reaches the run-through path and these fronts are transferred to a fictitious pipe, shown for example, in FIG. 11A, which is an extension of the real pipe between nodes A and B. Equations for the fictitious pipe are modified in a way which excludes friction losses and inertia caused by liquid motion and acceleration.

Figure 12:
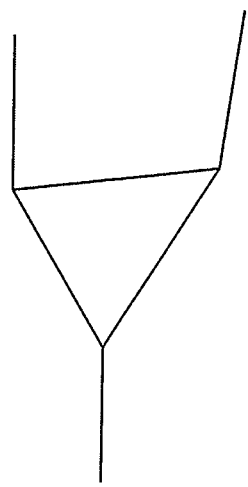
FIGS. 12 and 12A illustrates another preferred loop modeling algorithm.

Successful numeric testing was made for the simple modeling topology in FIG. 12. Within the tests, the pipe lengths and open sprinkler locations varied to simulate different scenarios of gas bubble creation and depletion. A piping system with at least one loop introduces two essential complications into the solution algorithm: the problem of reaching the solution of the system of equations and the problem of gas trapped with liquid on both sides. The latter problem is described above. The solution for the problem of calculation of pressure values for a system containing loop is described below.

A non-iterative algorithm which is preferably the generalization of the matrix sweep elimination as is known in the art, i.e., the Thomson method, can provide the solution of the system of algebraic equations with three-diagonal matrix equations either for accelerations or for pressures. The system of equations defining the three diagonal matrix can further include matrix coefficients α and β. For the case with a loop, the system of algebraic equations is not a three-diagonal structure (the structure of matrix is shown below). However, with the help of a preferred algorithm, the matrix could be reduced and thus solved by the matrix sweep elimination algorithm. The main features of the algorithm are described as follows with reference to FIG. 12A.

Figure 12A:
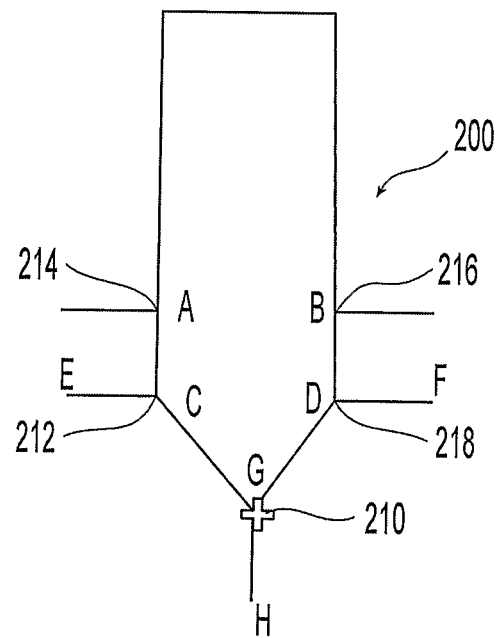

There exists only one loop initial point—it is the node 210 which belongs to the loop 200 and is preferably located closest to the supply node, as seen for example and denoted with the '+' symbol in FIG. 12A. The loop 200 locates downstream of the node 210. The piping subsystems initiated from the loop node 210 have the tree-type topology. On stage 'a,' every branching is processed with the generic algorithm of forward matrix sweep elimination i.e., coefficients α and β can be calculated in the solution of a three diagonal matrix. The pipes being the components of the loop are to be processed in a cyclic way which requires switching to the cyclic version of the matrix sweep elimination algorithm performed on the 'b' stage. The process descends along the cycle down to the loop initial point (stage 'c'). Here it switches back from the cyclic matrix sweep elimination to the generic one (stage 'd'). To the left of the loop initial point the tree-like structure is present, and thus one more time the generic matrix sweep elimination algorithm is activated (stage 'e'). The core and idea of the algorithm constituting the cyclic matrix sweep elimination method developed earlier for the problems with periodic boundary conditions.

With the processing of the loop component pipes, e.g. clockwise, the algorithm arrives at the node denoted with the '+' sign on FIG. 12A. At this point the pressure value should be equal, which is in analogy with the periodic boundary conditions. The algorithm of cyclic matrix sweep elimination for the loop pipes is described below followed by the entire algorithm of calculating pressure values, which contains five stages:

Stage a. Calculation of the matrix sweep elimination coefficients for pipes upstream the loop;

Stage b. Calculation of the coefficients for the cyclic matrix sweep elimination for the loop pipes;

Stage c. Calculation of the matrix sweep elimination coefficients for pipes downstream the loop;

Stage d. Calculation of pressure values within the reverse matrix sweep elimination path.

Stage e. Calculation of the generic matrix sweep elimination coefficients.

The three-point system of equations is:

$$-c_1 y_1 + b_1 y_1 = -f_1;$$

$$a_i y_{i-1} - c_i y_i + b_i y_{i+1} = -f_i, \, i=2, 3, \ldots, N-1;$$

$$a_N y_{N-1} - c_N y_N = -f_N, \quad \text{(Eq. 62)}$$

where coefficients $a_1$, $b_1$, $c_i$ are positive and moreover the condition of diagonal predominance is satisfied $$a_i > 0, b_i > 0, c_i > 0, c_i > a_i + b_i \quad \text{(Eq. 63)}$$

In the system (Eq. 62) the vector of unknowns represents the nodal pressures in the loop.

In matrix form the system (Eq. 62) could be represented as follows:

$$A_N \vec{y}_N = -\vec{f}_N, \quad \text{(Eq. 64)}$$

where $\vec{y}_N$ и $\vec{f}_N$=vectors of length N, and N×N matrix $A_N$ has the following structure $$A_N = \begin{bmatrix} -c_1 & b_1 & 0 & 0 & \cdots & 0 & 0 & a_1 \\ a_2 & -c_2 & b_2 & 0 & \cdots & 0 & 0 & 0 \\ 0 & a_2 & -c_3 & b_3 & \cdots & 0 & 0 & 0 \\ \cdots & \cdots & \cdots & \cdots & \cdots & \cdots & \cdots & \cdots \\ \cdots & \cdots & \cdots & \cdots & \cdots & \cdots & \cdots & \cdots \\ 0 & 0 & 0 & 0 & \cdots & -c_{N-2} & b_{N-2} & 0 \\ 0 & 0 & 0 & 0 & \cdots & a_{N-1} & -c_{N-1} & b_{N-1} \\ b_N & 0 & 0 & 0 & & 0 & a_N & -c_N \end{bmatrix} \quad \text{(Eq. 65)}$$

If not for the non-zero coefficient $b_N$ in the lower left corner of matrix $A_N$ and coefficient $a_1$ in the upper right corner, matrix $A_N$ would have been of the three-diagonal structure and equation (Eq. 64) could be solved through the generic matrix sweep elimination method. For solving of more complex system (Eq. 64), the bordering method is used.

Equation (Eq. 64) could be reformulated as follows:

$$A_{N-1} \vec{y}_{N-1} + \vec{u}_{N-1} y_N = -\vec{f}_{N-1}, \quad \text{(Eq. 66)}$$

$$\vec{v}_{N-1} * \vec{y}_{N-1} - c_N y_N = -f_n, \quad \text{(Eq. 67)}$$

where asterisk denotes transposition, matrix $A_{N-1}$ has ((N−1)×(N−1)) size.

$$A_{N-1} = \begin{bmatrix} -c_1 & b_1 & 0 & \cdots & 0 & 0 & 0 \\ a_2 & -c_2 & b_2 & \cdots & 0 & 0 & 0 \\ 0 & a_3 & -c_3 & \cdots & 0 & 0 & 0 \\ \cdots & \cdots & \cdots & \cdots & \cdots & \cdots & \cdots \\ 0 & 0 & 0 & \cdots & a_{N-2} & -c_{N-2} & b_{N-2} \\ 0 & 0 & 0 & \cdots & 0 & a_{N-1} & -c_{N-1} \end{bmatrix} \quad \text{(Eq. 68)}$$

Vectors $\vec{u}_{N-1}, \vec{v}_{N-1}, \vec{y}_{N-1}, \vec{f}_{N-1}$ are expressed with formulas $$\vec{u}_{N-1} = \begin{bmatrix} a_1 \\ 0 \\ \cdots \\ \cdots \\ \cdots \\ 0 \\ b_{N-1} \end{bmatrix}, \vec{v}_{N-1} = \begin{bmatrix} b_N \\ 0 \\ \cdots \\ \cdots \\ \cdots \\ 0 \\ a_N \end{bmatrix}, \vec{y}_{N-1} = \begin{bmatrix} y_1 \\ y_2 \\ \cdots \\ \cdots \\ \cdots \\ y_{N-2} \\ y_{N-1} \end{bmatrix}, \quad \text{(Eq. 69)}$$

$$\vec{f}_{N-1} = \begin{bmatrix} f_1 \\ f_2 \\ \cdots \\ \cdots \\ \cdots \\ f_{N-2} \\ f_{N-1} \end{bmatrix},$$

The solution to (Eq. 66) can be found in the form of the following sum $$\vec{y}_{N-1} = \vec{p}_{N-1} + Y_N \vec{q}_{N-1}, \quad \text{(Eq. 70)}$$

where $\vec{p}_{N-1}$ and $\vec{q}_{N-1}$ are the solutions to the problems $$A_{N-1}\vec{p}_{N-1} = -\vec{f}_{N-1},$$

$$A_{N-1}\vec{q}_{N-1} = -\vec{u}_{N-1}, \quad \text{(Eq. 71)}$$

Matrix $A_{N-1}$ has three-diagonal structure that is why the solution to the problems (Eq. 71) could be found through the generic matrix sweep elimination method. After this the variable $y_N$ value could be found by excluding $\vec{y}_{N-1}$ from (Eq. 67) and (Eq. 70).

$$y_N = \frac{f_N + \vec{v}^*_{N-1}\vec{p}_{N-1}}{c_N - \vec{v}^*_{N-1}\vec{q}_{N-1}} \quad \text{(Eq. 72)}$$

Values for all other components of the vector of unknowns $\vec{y}_N$, i.e. vector $\vec{y}_{N-1}$, are calculated further through (Eq. 70).

Formulas for the cyclic matrix sweep elimination method put together are:

$$\left.\begin{array}{l} \alpha_{i+1} = \dfrac{b_i}{c_i - a_i\alpha_i}, \beta_{i+1} = \dfrac{f_i + \alpha_i\beta_i}{c_i - a_i\alpha_i}, \gamma_{i+1} = \dfrac{a_i\gamma_1}{c_i - a_i\alpha_i}, \\ i = 2, 3, \ldots, N, \alpha_2 = b_2/c_1, \beta_2 = f_1/c_1, \gamma_2 = a_1/c_1, \end{array}\right\} \quad \text{(Eq. 73)}$$

$$\left.\begin{array}{l} p_i = \alpha_{i+1}p_{i+1} + \beta_{i+1}, q_i = \alpha_{i+1}q_{i+1} + \gamma_{i+1}, \\ i = N-2, \ldots, 1 \; p_{N-1} = \beta_N, q_{N-1} = \alpha_N + \gamma_N, \end{array}\right\} \quad \text{(Eq. 74)}$$

$$\left.\begin{array}{l} y_N = \dfrac{\beta_{N+1} + \alpha_{N+1}p_1}{1 - \alpha_{N+1}q_1 - \gamma_{N+1}}, y_i = p_i + y_N q_i, \\ i = 1, 2, \ldots, N-1 \end{array}\right\} \quad \text{(Eq. 75)}$$

Cyclic matrix sweep elimination method is stable as the generic matrix sweep elimination method, which solution of specific tasks is reduced to, is stable by itself and due to the property that the denominator in the expression for $y_N$ in (Eq. 75) never equals zero.

The following explains how the described above cyclic matrix sweep elimination algorithm is built into the overall calculating scheme of calculating pressure in a piping system within the b) stage. First, on the a) stage and preferably with the generic matrix sweep elimination method, the coefficients are calculated for pipes upstream the loop node 210 being part of graphs branching from the loop nodes 212, 214, 216, 218. Coefficients of the (Eq. 64) system contain the sweep elimination coefficients for the pipes upstream the loop. Formula (Eq. 75) does not allow direct determination of the pressure at the loop initial node 210 denoted with the 'plus' symbol in FIG. 12A (variable $y_N$ equals pressure $P_N$ at the loop initial node). Instead, formula (Eq. 75) provides the capability to define the generic sweep elimination coefficients for the first pipe downstream the loop node 210. Therefore, it facilitates to step for stage c). Stage c) is performed down to the root of the tree, after that the stage d) of the sweep elimination backward path starts. As a result the pressures are defined through the sweep elimination coefficients.

The described above algorithm appears to be not only non-iterative but highly efficient. For pipes not belonging to a loop the number of operations within the process of pressure calculations is the same and for pipes contained in a loop the number is doubled. As a whole, the calculation time increases by 1.5 times as compared to a tree-type system. See A. A. Samarski & E. S. Nikolaev, *Methods For the Solution of the Grid Equations*. pgs. 86-90, (1978). (in Russian); A. A. Samarski. *Introduction Into the Theory of Differented Structures*. 1$^{st}$ ed. pgs. 535-537 (1971) (in Russian); and D. K. Faddeev & V. N. Faddeeva. *Calculation Methods of Linear Algebra*. (1963) (in Russian).

Any modeled piping system can further be viewed as the interconnection of at least two types of principle elements and/or the combination thereof. One principle element is preferably configured as a non-branching principle element, and another principle element is preferably configured as having two branches. Each of the principle elements is preferably defined by an arrangement of nodes and interconnecting pipes. Any particular pipe forming a principle element can be designated with subscript i, i=1, . . . , M, where M is the total number of pipes, and the nodes forming the principle element can be designated with subscript j, j=1, . . . , N, where N is the number of internal nodes (all nodes excluding end nodes). The two numbers are related by formula:

$$M = 1 + N + K \quad \text{(Eq. 76)}$$

where K is the number of tee fittings in the system. Table 2 below provides the two preferred configurations for the principle elements which can be used to form a fire protection system.

TABLE 2

Configuration of Principle Elements

| Configuration | Schema of Principle Elements |
|---|---|
| No Branching | $P^{jL}$ —[ $\frac{f_i h_{iL}}{D_i} \frac{\rho v_i^2}{2}$ ]—[ $\frac{f_i h_i}{D_i} \frac{\rho v_i^2}{2}$ ]—[ $\rho g h_i \sin\alpha$ ]—[ $\frac{f_i h_{iR}}{D_i} \frac{\rho v_i^2}{2}$ ]— $P^{jR}$ |
| Two Branches | $P_L$ —$F_{i1}$, i1— $P_C$ —$F_{i2}$, i2— $P_R$ ; branch up: $F_{i3}$, i3 to $P_U$ |

Governing equations can be generated by considering a simplified case of unsteady motion of an incompressible fluid in a tree type system. Next, the analysis can be extended to the case of the presence of moveable air-liquid boundaries. Typical momentum balance equation for movement of incompressible fluid along i-th pipe is as follows:

$$\rho h_i \dot{v}_i = P^{jL} - P^{jR} - \frac{f_i h_i}{D_i} \frac{\rho v_i^2}{2} - \frac{f_i h_{iL}}{D_i} \frac{\rho v_i^2}{2} - \frac{f_i h_{iR}}{D_i} \frac{\rho v_i^2}{2} - \rho g h_i \sin\alpha \quad \text{(Eq. 77)}$$

or transitively:

$$\frac{h_i}{A_i} \dot{m}_i = P^{jL} - P^{jR} - \frac{f_i h_{iL}}{D_i} \frac{\rho v_i^2}{2} - \frac{f_i h_i}{D_i} \frac{\rho v_i^2}{2} - \frac{f_i h_{iR}}{D_i} \frac{\rho v_i^2}{2} - \rho g h_i \sin\alpha \quad \text{(Eq. 78)}$$

where $$\dot{v}_i = \frac{dv_i}{dt}$$

is the time derivative of velocity, $$\dot{m}_i = \frac{dm_i}{dt}$$

the time derivative of mass flow rate, $h_i$, $D_i$ are the length and diameter of i-th pipe, respectively;

$f_i$ the friction factor, and $h_{iL}$ and $h_{iR}$ are the equivalent lengths responsible for local pressure drops at the left and right ends of pipe, sin α is a pitch.

As depicted in Table 2, Pressure drops at the entrance and at the end of pipe include losses due to fitting, turn of the flow etc. Pressures $P^{jL}$ and $P^{jR}$ are located at the left and right sides of the pipe, accordingly. Furthermore, pressure $P^{jR}$ is located in the branching point. Local pressure drops due to tees are located to the right of branching point, at the beginning of the next two pipes starting from this point. Equation (Eq. 77) and (Eq. 78) can also include a local hydrodynamic resistance at the right end of the pipe, $$\frac{f_i h_{iR}}{D_i} \frac{\rho v_i^2}{2},$$

which is located before branching, that is to the left of branching point of two flows. This resistance can be originated, for instance, from fitting losses at the entrance of a tee.

It should be noted that all the terms in the right hand side (RHS) of equations (Eq. 77) and (Eq. 78) are known except for pressures $P^{jR}$ and $P^{jL}$. For the velocity $v_i$, differential equation (Eq. 77) is created, so for the task of calculation of the RHS in this equation the value $v_i$ is assumed to be known. The same is true for the mass flow rates in, in equations (Eq. 78).

For determination of pressures $P^j$, $j=1, \ldots, N$, the conditions of mass flow rates balance in every internal point of the system can be enumerated as follows:

$$m_{i1(j)} = m_{i2(j)} + m_{i3(j)}, j=1, \ldots, N \quad \text{(Eq. 79)}$$

For every internal node j the numbers of pipes connected to the left side of the node i1(j) and to the right side of the node i2(j), i3(j) are prescribed. In a particular case, when only two pipes join in the node one of the flow rates will be zero $m_{i3(j)} = 0$. The relations between the numbers of nodes and pipes, which are the functions i1(j), i2(j), i3(j), is formulated below.

All the open ends of the system (open sprinklers) provide additional algebraic relations between pressure in these points $P_j$, air pressure ahead of a nozzle, sprinkler head or other open nodal device $P_a$, ambient pressure $P_\infty$, and mass flow rate $m_a$, thus describing the laws of fluid flowing out through open nozzles, sprinkler heads or other open nodal devices. For air discharging from the nozzle, sprinkler head or other open nodal device these relations are of the type:

$$m_a = \left[ \frac{g\gamma}{RT_a} \left( \frac{2}{\gamma+1} \right)^{(\gamma-1)/(\gamma+1)} \right]^{1/2} A_a P_a \quad \text{(Eq. 80)}$$

for $P_\infty/P_a < 0.528$ or $$m_a = \left[\frac{2g\gamma P_a}{RT_a(\gamma-1)}\left(\left(\frac{P_\infty}{P_a}\right)^{\frac{2}{\gamma}} - \left(\frac{P_\infty}{P_a}\right)^{\frac{\gamma+1}{\gamma}}\right)\right]^{1/2} A_a \quad \text{(Eq. 81)}$$

for $P_\infty/P_a \geq 0.528$,
where $A_a$ is the cross section area of opening,
$\gamma = c_p/c_v$, g is the acceleration due to gravity constant,
R is the universal gas constant,
$P_\infty$ is the ambient pressure and $P_a$ is the air pressure in the system ahead of the nozzle, sprinkler head or other open nodal device.

For fluid discharging from the system the additional equation describing opening is:

$$A_a v_a \rho = f(P_a, P_\infty, A_a, A_T) \quad \text{(Eq. 82)}$$

where $A_a$ is the cross section area of the nozzle, sprinkler head, or other nodal device
$A_T$ is the cross section area of the throttle,
$v_a$ is the fluid velocity at the entrance of the nozzle, sprinkler head, or other nodal device
$P_a$ is the pressure at the entrance of the nozzle, sprinkler head or other open nodal device.

For the purpose of describing this pressure drop the following formula can be used instead:

$$A_a v_a = k_D K_F (P_a^* - P_\infty)^{1/2}, \quad \text{(Eq. 83)}$$

where $K_F$ is the K-factor (dimensional value),
$k_D$ is the coefficient depending on measurement system unit,
$P_a^*$ is the total internal pressure ahead of the nozzle, sprinkler head, or open nodal device (that is a static pressure plus dynamic head), and
the values of $K_F$ depend on geometry of the nozzle, sprinkler head or open nodal device.

Algebraic equations (Eq. 79) together with N differential equations (Eq. 78) and 1+K, additional algebraic equations (Eq. 80)-(Eq. 83) written for each end node form a closed mathematical system for determination of M mass flow rates at every pipe and
N*=M pressures at every node.

Algebraic system for determination of unknown pressures can be obtained by the following way. Equation (Eq. 79) can be differentiated over time to give the following:

$$\dot{m}_{i1(j)} = \dot{m}_{i2(j)} + \dot{m}_{i3(j)}, j = 1, \ldots, N \quad \text{(Eq. 84)}$$

The RHSs of equations (Eq. 78) can be substituted here. An algebraic relation which ties pressures in four different nodes for the case of tees and pressure in three different nodes for the case of two connected pipes can be obtained. Considering, for example, the latter case, we obtain:

$$\frac{A_{i1}}{h_{i1}}\left(P^{jL(i1)} - P^{jR(j1)} - \frac{f_{i1}h_{i1}^*}{D_{i1}}\frac{\rho v_{i1}^2}{2} - \rho g h_{i1}\sin\alpha_{i1}\right) = \quad \text{(Eq. 85)}$$

$$= \frac{A_{i2}}{h_{i2}}\left(P^{jL(i2)} - P^{jR(j2)} - \frac{f_{i2}h_{i2}^*}{D_{i2}}\frac{\rho v_{i2}^2}{2} - \rho g h_{i2}\sin\alpha_{i2}\right)$$

where equivalent lengths $h_{i1}^*$ and $h_{i2}^*$ were introduced in such a way that $$\frac{f_{i1}h_{i1}^*}{D_{i1}} = \frac{f_{i1}h_{i1}}{D_{i1}} + \frac{f_{i1}h_{i1L}}{D_{i1}} + \frac{f_{i1}h_{i1R}}{D_{i1}} \text{ and}$$

$$\frac{f_{i2}h_{i2}^*}{D_{i2}} = \frac{f_{i2}h_{i2}}{D_{i2}} + \frac{f_{i2}h_{i2L}}{D_{i2}} + \frac{f_{i2}h_{i2R}}{D_{i2}}$$

Taking into account that jL(i2)=jR(i1) and denoting the pressure at this central node as $P^{jL(i2)}=P^{jR(i1)}=P_C$ and the pressures at the left and right neighboring nodes as $P^{jL(i1)}=P_L$ and $P^{jR(i2)}=P_R$, a three-point algebraic equation for pressures is obtained:

$$\frac{A_{i2}}{h_{i2}}P_R - \left(\frac{A_{i2}}{h_{i2}} + \frac{A_{i1}}{h_{i1}}\right)P_C + \frac{A_{i1}}{h_{i1}}P_L = F_{i1} - F_{i2}, \quad \text{(Eq. 86)}$$

where the following was denoted for brevity $$F_{i2} = \frac{A_{i2}}{h_{i2}}\left(\frac{f_{i2}h_{i2}^*}{D_{i2}}\frac{\rho|v_{i2}|}{2}v_{i2} + \rho g h_{i2}\sin\alpha_{i2}\right)$$

and $$F_{i1} = \frac{A_{i1}}{h_{i1}}\left(\frac{f_{i1}h_{i1}^*}{D_{i1}}\frac{\rho|v_{i1}|}{2}v_{i1} + \rho g h_{i1}\sin\alpha_{i1}\right).$$

Here, the squared velocity was replaced by the product of absolute value of velocity to the velocity itself. After this correction, the terms $$\frac{f_{i2}h_{i2}^*}{D_{i2}}\frac{\rho|v_{i2}|}{2}v_{i2} \text{ and } \frac{f_{i1}h_{i1}^*}{D_{i1}}\frac{\rho|v_{i1}|}{2}v_{i1}$$

have proper signs of friction losses for negative direction of velocity in a pipe.

In the case of three pipes joining in a node (Table 2) the equation of unsteady mass flow rates balance (Eq. 86) takes the form $$\frac{A_{i2}}{h_{i2}}P_R + \frac{A_{i3}}{h_{i3}}P_U - \left(\frac{A_{i3}}{h_{i3}} + \frac{A_{i2}}{h_{i2}} + \frac{A_{i1}}{h_{i1}}\right)P_C + \frac{A_{i1}}{h_{i1}}P_L = \quad \text{(Eq. 87)}$$

$$F_{i1} - F_{i3} - F_{i2}$$

where $P_U = P^{jR(i3)}$ is the pressure at the right end of pipe i3, and $$F_{i3} = \frac{A_{i3}}{h_{i3}}\left(\frac{f_{i3}h_{i3}^*}{D_{i3}}\frac{\rho|v_{i3}|}{2}v_{i3} + \rho g h_{i3}\sin\alpha_{i3}\right) \quad \text{(Eq. 88)}$$

The case of gas being present in the system is more complicated in comparison with the pure liquid case discussed above. Thus, the mathematical description of the problem can be changed to accommodate this case. These changes consider, first, the equation of motion in a pipe. Second, the equation of mass balance in a node should also be modified. Third, additional equations of gas mass balance must be added to the set of equations solved. These equations of gas mass balance should be written for every volume of trapped air. They are needed for determination of position of liquid-air interface. And, fourth, an equation of state is necessary for linking pressure and air density.

The model can be configured to preferably describe the gas behavior in pipes as either isentropic or isothermal. The equation defining temperature T of gas flowing through a pipe with constant velocity v while pipe walls are maintained at constant temperature $T_w$ is the following convective heat transfer equation:

$$\frac{\partial T}{\partial t} = v\frac{\partial T}{\partial x} + \frac{1}{r}\frac{\partial}{\partial r}\left(r\kappa\frac{\partial T}{\partial r}\right),\quad \text{(Eq. 89)}$$

where: t=time, s; x=coordinate along pipe centerline, m; κ=cumulative (turbulent and molecular) coefficient of temperature conductivity, m²/s.

Supposedly, gas inflows into the pipe with initial temperature $T_0$ different from $T_w$. In order to estimate the distance along which gas temperature equalizes with pipe wall temperature the equation (Eq. 89) is integrated along the pipe cross section. Designating with top bar values averaged within the pipe cross section and taking into account that $\overline{vT} \approx \overline{v}\overline{T}$ get the approximate equation for gas temperature T averaged within pipe cross section:

$$\pi R^2 \frac{\partial \overline{T}}{\partial t} = \pi R^2 \overline{v}\frac{\partial \overline{T}}{\partial x} + 2\pi R\kappa \frac{\partial \overline{T}}{\partial r}\bigg|_{r=R},\quad \text{(Eq. 90)}$$

where R=pipe radius. The last item is heat flow upon the pipe wall. It could be described with the heat emission coefficient α:

$$2\pi R\kappa \frac{\partial \overline{T}}{\partial r}\bigg|_{r=R} = \alpha(\overline{T} - T_w),\quad \text{(Eq. 91)}$$

where $$\alpha = \pi\kappa Nu,\quad \text{(Eq. 92)}$$

Nu=Nusselt number, the approximate value is defined as follows. See E. R. G. Eckert & R. M. Drake, *Introduction to the Transfer of Heat and Mass* (1959)

$$Nu = 3.66 \text{ if } Re<2300,\quad \text{(Eq. 93)}$$

$$Nu = 0.023 Re^{0.8} Pr^{0.4} \text{ if } Re>2300,\quad \text{(Eq. 94)}$$

where Re=Reynolds number; Pr—Prandtl number. Substituting (Eq. 91)-(Eq. 94) into (Eq. 90) and considering steady state flow, get relaxation length L, i.e. sufficient distance for gas and pipe wall temperatures to equalize:

$$L = R\frac{Re}{2NuPr}\quad \text{(Eq. 95)}$$

Relaxation length vs. flow velocity ratio is time value within which liquid particle temperature equalizes with pipe wall temperature:

$$\tau = L/v\quad \text{(Eq. 96)}$$

Typical sizes of dry pipe fire protection system are as follows:
Head opening (sprinkler head) diameter: 0.25 . . . 2.5 cm;
Branch lines diameter: 5 . . . 8 cm;
Branch lines length: 20 . . . 45 m;
Cross mains diameter: 10 . . . 16 cm;
Cross mains length: 15 . . . 90 m;
Riser nipples diameter: 5 . . . 8 cm;
Riser nipples length: 0 . . . 1.2 m;
Feed main length: 10 . . . 25 cm;
Feed main length: 5 . . . 50 m;
Drops/sprigs diameters: 1.2 . . . 3.8 cm;
Drops length: 30 . . . 60 cm;
Water pressure: up to 11 atm;
Initial gas pressure: 1.7 . . . 4 atm;
DPV trip pressure: 1.35 . . . 3.1 atm.

Table 2A contains calculation results for time and relaxation length for air flowing with different velocities in pipes of three different diameters which are typical for branch lines, cross mains and feed mains.

TABLE 2A

| | Diameter = | | | | | |
|---|---|---|---|---|---|---|
| | 6.0 cm | | 12.0 cm | | 20.0 cm | |
| Velocity, m/s | T, s | L, m | T, s | L, m | T, s | L, m |
| 0.0018 | 32.79 | 0.06 | 131.15 | 0.23 | 364.3 | 0.65 |
| 0.0032 | 32.79 | 0.1 | 131.15 | 0.41 | 364.3 | 1.15 |
| 0.0056 | 32.79 | 0.18 | 131.15 | 0.74 | 364.3 | 2.05 |
| 0.01 | 32.79 | 0.33 | 131.15 | 1.31 | 364.3 | 3.64 |
| 0.018 | 32.79 | 0.58 | 131.15 | 2.33 | 364.3 | 6.48 |
| 0.032 | 32.79 | 1.04 | 131.15 | 4.15 | 364.3 | 11.52 |
| 0.056 | 32.79 | 1.84 | 131.15 | 7.37 | 364.3 | 20.49 |
| 0.1 | 32.79 | 3.28 | 131.15 | 13.11 | 105.3 | 10.53 |
| 0.18 | 32.79 | 5.83 | 35.99 | 6.4 | 66.44 | 11.82 |
| 0.32 | 9.89 | 3.13 | 22.71 | 7.18 | 41.92 | 13.26 |
| 0.56 | 6.24 | 3.51 | 14.33 | 8.06 | 26.45 | 14.87 |
| 1 | 3.94 | 3.94 | 9.04 | 9.04 | 16.69 | 16.69 |
| 1.8 | 2.48 | 4.42 | 5.7 | 10.14 | 10.53 | 18.73 |
| 3.2 | 1.57 | 4.95 | 3.6 | 11.38 | 6.64 | 21.01 |
| 5.6 | 0.99 | 5.56 | 2.27 | 12.77 | 4.19 | 23.57 |
| 10 | 0.62 | 6.24 | 1.43 | 14.33 | 2.65 | 26.45 |
| 18 | 0.39 | 7 | 0.9 | 16.08 | 1.67 | 29.68 |
| 32 | 0.25 | 7.85 | 0.57 | 18.04 | 1.05 | 33.3 |
| 56 | 0.16 | 8.81 | 0.36 | 20.24 | 0.66 | 37.36 |
| 100 | 0.1 | 9.89 | 0.23 | 22.71 | 0.42 | 41.92 |
| 180 | 0.06 | 11.09 | 0.14 | 25.48 | 0.26 | 47.04 |
| 320 | 0.04 | 12.44 | 0.09 | 28.59 | 0.17 | 52.78 |

As it follows from the Table 2A, gas which moves along branch lines with velocities around tens of m/s is likely to have temperature close to pipe wall temperature as relaxation lengths around ten meters (10 m.) are less than branch line lengths. The same could be true for sufficiently long cross mains. However, gas trapped in closed branch lines might not manage to acquire pipe wall temperature within the time period of trip time and transit time as mentioned time periods could be comparable with relaxation time (32 s). Relaxation lengths in feed mains are comparable with their geometric lengths, hence the internal process there is neither isothermal nor isentropic.

Accordingly, the polytropic process is considered so as to facilitate better trip time match or accuracy in accordance with the test data. A polytropic process may be reduced to two specific cases of isentropic and isothermal processes.

If supposing that the compression process of entrapped gas is isothermal or isentropic, the temperature can be excluded from equation of state, and thermal problem can be avoided. At isothermal, i.e. infinitely slow process of gas compression, the temperature is equal to ambient temperature. Isentropic process represents other extreme case of very fast compression of gas at which heat exchange with an environment is insignificant. Let us estimate an opportunity of existence of one or another regime in our system.

The first law of thermodynamics:

$$\Delta U = Q - A,$$

where $\Delta U$ is variation of internal energy, Q is the heat supplied to gas, and A is the work done by gas.

It is possible to say, that a process is close to isothermal, if the ratio of heat and work is near unity $$\frac{|Q|}{|A|} \sim 1 \qquad \text{(Eq. 97)}$$

In opposite extreme case $$\frac{|Q|}{|A|} \ll 1, \qquad \text{(Eq. 98)}$$

the process of gas compression can be considered as isentropic one.

First, we shall assume that the process is realized according to isentropic law. In this case the equation of state for the constant mass of gas is $$P\rho^{-\gamma} = \text{const} \qquad \text{(Eq. 99)}$$

where $\gamma = C_p/C_v \approx 1.41$ for air. The ideal gas equation of state can be written as $$\frac{P}{\rho} \sim T \qquad \text{(Eq. 100)}$$

where T is the absolute temperature in Kelvin degrees. Getting rid of pressure in equations (Eq. 99) and (Eq. 100), we obtain $$\rho^{1-\gamma}T = \text{const} \qquad \text{(Eq. 101)}$$

Differentiating equation (Eq. 101) and replacing differentials with final increments results in $$(1-\gamma)\rho^{-\gamma}\Delta\rho T + \rho^{1-\gamma}\Delta T = 0 \qquad \text{(Eq. 102)}$$

From here it follows that $$\Delta T = (1-\gamma)\frac{\Delta\rho}{\rho}T$$

Average change of gas temperature in the process can be estimated as $$\langle \Delta T \rangle = \frac{1}{2}\Delta T.$$

Supposing, that at the initial moment the temperature of gas is equal to environment temperature, we obtain an estimation of average gas temperature excess over environment temperature as $$\langle \Delta T \rangle = \frac{1}{2}(1-\gamma)\frac{\Delta\rho}{\rho}T \qquad \text{(Eq. 103)}$$

For a constant mass of gas the change of density occurs because of change of volume occupied by gas, i.e.

$$\left|\frac{\Delta\rho}{\rho}\right| = \left|\frac{\Delta L}{L}\right| \qquad \text{(Eq. 104)}$$

Estimating $\Delta L = v\Delta t$, where v is the velocity of movement of the interface liquid-gas, and $\Delta t$ is the characteristic time of this movement, we obtain $$\frac{\Delta\rho}{\rho} = \frac{v\Delta t}{L} \qquad \text{(Eq. 105)}$$

Substitution of (Eq. 105) into (Eq. 103) leads to $$\langle \Delta T \rangle = \frac{1}{2}(1-\gamma)\frac{(v\Delta t)}{L}T \qquad \text{(Eq. 106)}$$

One can choose an environment temperature $T_\infty = 300$ K for estimation. Then $$\langle \Delta T \rangle = \frac{1}{2}(1-\gamma)\frac{(v\Delta t)}{L}T_\infty \qquad \text{(Eq. 107)}$$

For estimation of the value of heat Q we suppose, that heat is transferred through a lateral surface of cylindrical tube, which area is $$S = L\pi D \qquad \text{(Eq. 108)}$$

It is possible to estimate the value of heat transfer coefficient, characteristic for a free convection from the horizontal cylinder heated up in air surrounding by $$\alpha = 5 \qquad \text{(Eq. 109)}$$

Using formulas (Eq. 105)-(Eq. 107) results in $$\begin{aligned} Q &= \alpha S \langle \Delta T \rangle \Delta t \\ &= \alpha L \pi D \langle \Delta T \rangle \Delta t \\ &= \alpha L \pi D \frac{1}{2}(1-\gamma)\frac{(v\Delta t)}{L}T_\infty \Delta t \end{aligned} \qquad \text{(Eq. 110)}$$

Let's estimate now the work done at compression of gas $$\begin{aligned} A &= p\Delta V \\ &= p\Delta L \frac{\pi D^2}{4} \\ &= p(v\Delta t)\frac{\pi D^2}{4} \end{aligned} \qquad \text{(Eq. 111)}$$

Now we can form the ratio $$\frac{|Q|}{|A|}$$

and calculate it using (Eq. 109)

$$\frac{|Q|}{|A|} = \frac{\alpha L \pi D \frac{1}{2}(1-\gamma)(v\Delta t)T_\infty \Delta t}{p(v\Delta t)\frac{\pi D^2}{4}L} \qquad \text{(Eq. 112)}$$

-continued $$= \frac{2\alpha(1-\gamma)T_\infty \Delta t}{pD}$$

$$= \frac{2 \cdot 5 \cdot 0.4 \cdot 300 \Delta t}{2 \cdot 10^5 \cdot 5 \cdot 10^{-2}}$$

$$= 0.12 \Delta t$$

Supposing $\Delta t \sim 1$ sec., we obtain the estimation $$\frac{|Q|}{|A|} = 0.12.$$

Considering form the other side and supposing $$\Delta t = \frac{\Delta L}{v} \approx \frac{L}{v},$$

$L \sim 1$, $v \sim 1$, results in the same estimation. This estimation shows that the case of isentropic compression of gas is close to reality.

Since two extreme processes, indefinitely fast, i.e. isentropic (Eq. 99), and indefinitely slow, i.e. isothermal $$p\rho^{-1} = \text{const} \tag{Eq. 113}$$

are represented by similar expressions with only the exponent at $\rho$ differing, it is possible to construct the formula for general polytropic process by assuming $$p\rho^{-(\epsilon+(1-\epsilon)\gamma)} = \text{const}, \tag{Eq. 114}$$

where $\epsilon = |Q|/|A|$ is the ratio of heat and work, estimated on the ground of formula (Eq. 114). As easy to see, expression (28) goes to isentropic process at $\epsilon=0$ and to isothermal process at $\epsilon=1$.

Supposition on constant gas pressure in pipes filled with gas is not used. Instead, equation $$\rho h_i \frac{dw_i}{dt} = A_i(P^j - P^i - F_i), i = 1, \ldots, M \tag{Eq. 115}$$

where $$F_i = \rho_{\Sigma i} \frac{f_i h_i^*}{D_i} \frac{|v_i|}{2} v_i + \rho_{\Sigma i} g h_i \sin \alpha_i \tag{Eq. 116}$$

is solved for all pipes. In so doing it is necessary to know an effective density $\rho_\Sigma$. For the purpose we need to know the values of $L_i$ and $\rho_g$ for each instance of time and for all pipes. Gas density $\rho_g$ is determined from the equation of state (Eq. 114)

$$\rho_g^{-(\epsilon+(1-\epsilon)\gamma)} = \frac{P_0}{P} \rho_{g0}^{-(\epsilon+(1-\epsilon)\gamma)} \tag{Eq. 117}$$

where values of $P_0$ and $\rho_{g0}$ are registered at the moment of k-th isolated volume creation. At this moment the previously existing volume of gas which the given pipe belongs to is divided in two. For definition of $\rho_{g0}$ it is necessary to subdivide the current mass of gas in existing gas volume proportionally to new gas volumes, originating at division of this volume in two. Then during evolution of the created volume the current density of gas $\rho_g$ for each pipe belonging to this new volume, is evaluated on the given mean pressure in pipe $P=(P^{iL}+P^i)/2$ according to formula (Eq. 117).

The equation of state for volume of trapped air can be written either in isentropic, isothermal, or polytropic approach. It is believed that a common approach consists in using ideal gas equation, which, of course, is suitable for air with sufficient accuracy. The ideal gas equation contains temperature, and thus requires the calculation of temperature field in the whole system. Hence, this approach requires additional information such as the ambient condition and other temperature conditions. If supposing that the process of entrapped gas compression can occur by isothermal or isentropic manner, the temperature is not included into equation of state, and the thermal problem may not be solvable.

At isothermal, i.e., an infinitely slow process of gas compression, the temperature is constant and equal to ambient temperature. Isentropic process represents other extreme case of a very fast compression of gas at which heat exchange with an environment is insignificant. Whether the process involves an isentropic or isothermal process, such process will be considered in the analysis. Again, the first law of thermodynamics can be represented by the following equation:

$$\Delta U = Q - A$$

It is possible to say, that a process is close to isothermal, if the relation of heat and work is $$\frac{|Q|}{|A|} \sim 1 \tag{Eq. 118}$$

In an opposite case, the process of gas compression can be considered to be isentropic:

$$\frac{|Q|}{|A|} \ll 1, \tag{Eq. 119}$$

An assumption is made that the process is isentropic. In such case, the equation of state is $$P\rho^{-\gamma} = \text{const} \tag{Eq. 120}$$

where $\gamma = C_p/C_v \approx 1.41$ for air.

The ideal gas equation of a state can be written as $$\frac{P}{\rho} \sim T \tag{Eq. 121}$$

where T is the absolute temperature measured in Kelvin degrees. Eliminating pressure in equations (Eq. 119) and (Eq. 120), the following equation is obtained:

$$\rho^{1-\gamma} T = \text{const} \tag{Eq. 122}$$

Differentiating equation (15) and replacing differentials with final increments provide for the following equation:

$$(1-\gamma)\rho^{-\gamma} \Delta \rho T + \rho^{1-\gamma} \Delta T = 0 \tag{Eq. 123}$$

It follows that $$\Delta T = (1-\gamma) \frac{\Delta \rho}{\rho} T \tag{Eq. 124}$$

The average change of gas temperature in a process can be estimated as $$\langle \Delta T \rangle = \frac{1}{2}\Delta T.$$

Assuming that at the initial moment, the temperature of gas is equal to environment temperature, an estimate of average gas temperature being excess over the environment temperature can be given as:

$$\langle \Delta T \rangle = \frac{1}{2}(1-\gamma)\frac{\Delta \rho}{\rho}T \quad \text{(Eq. 125)}$$

Because of change of volume, the density also changes, which means that within the length of that part of pipe, gas is present, i.e.

$$\left|\frac{\Delta \rho}{\rho}\right| = \left|\frac{\Delta L}{L}\right| \quad \text{(Eq. 126)}$$

Assuming that $\Delta L = v\Delta t$, where v is velocity of movement of the interface liquid-gas, and $\Delta t$ is time of movement, the following equation is obtained:

$$\frac{\Delta \rho}{\rho} = \frac{v\Delta t}{L} \quad \text{(Eq. 127)}$$

Substituting (Eq. 127) in (Eq. 125) leads to:

$$\langle \Delta T \rangle = \frac{1}{2}(1-\gamma)\frac{(v\Delta t)}{L}T \quad \text{(Eq. 128)}$$

Assuming that the environment temperature $T_\infty = 300$ K as the temperature is included in the estimation. Then equation (Eq. 128) becomes $$\langle \Delta T \rangle = \frac{1}{2}(1-\gamma)\frac{(v\Delta t)}{L}T_\infty \quad \text{(Eq. 129)}$$

For estimation of the value of heat Q, the assumption is that heat is transferred through a lateral surface of cylindrical pipe, which area S is provided by:

$$S = L\pi D \quad \text{(Eq. 130)}$$

It is possible to take the value, characteristic for a free convection from the horizontal cylinder heated up in air surrounding as the heat-transfer coefficient α through a lateral surface of a cylindrical pipe:

$$\alpha = 5 \quad \text{(Eq. 131)}$$

Using equations (Eq. 129)-(Eq. 131) results in $$Q = \alpha S \langle \Delta T \rangle \Delta t \quad \text{(Eq. 132)}$$
$$= \alpha L \pi D \langle \Delta T \rangle \Delta t$$
$$= \alpha L \pi D \frac{1}{2}(1-\gamma)\frac{(v\Delta t)}{L}T_\infty \Delta t$$

An estimate on the work done at compressing the gas is shown by the following equation.

$$A = p\Delta V \quad \text{(Eq. 133)}$$
$$= p\Delta L \frac{\pi D^4}{4}$$
$$= p(v\Delta t)\frac{\pi D^4}{4}$$

The ratio $$\frac{|Q|}{|A|}$$

can be formed and further providing $$\frac{|Q|}{|A|} = \frac{\alpha L \pi D \frac{1}{2}(1-\gamma)(v\Delta t)T_\infty \Delta t}{p(v\Delta t)\frac{\pi D^2}{4}L} \quad \text{(Eq. 134)}$$
$$= \frac{2\alpha(1-\gamma)T_\infty \Delta t}{pD}$$
$$= \frac{250.4300\Delta t}{2\cdot 10^5 5\cdot 10^{-2}}$$
$$= 0.12\Delta t$$

Supposing $\Delta t \sim 1$ sec., an estimation of the ratio $$\frac{|Q|}{|A|} = 0.12.$$

Alternatively, supposing $$\Delta t = \frac{\Delta L}{v} \approx \frac{L}{v},$$

L~1, v~1, thereby resulting in the same estimation. This estimation shows that the case of isothermal compression of gas is really a basic one. At the same time it is possible to pick up such values of parameters in (Eq. 132) at which this estimation becomes disputable. Since two extreme processes, indefinitely fast, i.e. isentropic $p\rho^{-\gamma}$=const, and indefinitely slow, i.e. isothermal $p\rho^{-1}$=const, are represented by similar expressions with only the exponent at ρ differing, in the program it is possible to create the formula for general process by assuming $$p\rho^{-(\epsilon + (1-\epsilon)\gamma)} = \text{const}, \quad \text{(Eq. 135)}$$

where $\epsilon = |Q|/|A|$ is the ratio of heat and work, estimated on the basis of formula (Eq. 132).

Expression (Eq. 135) goes to formula for isentropic process at $\epsilon=0$ and to formula for isothermal process at $\epsilon=1$. Thus, changes should be made accordingly for a description of a two-phase flow. Assuming that a liquid with density ρ flows along a part of pipe L and a gas with average density $\rho_g$ flows along the other part $L_g = h_t - L$ of the same pipe. An equation of the motion of the fluid for this pipe partially filled with liquid can be derived as follows.

A common integral equation of motion for volume V bounded by surface σ looks as follows $$\frac{\partial}{\partial t}\int_V \rho v dV + \int_\sigma \rho v v_n d\sigma = \int_V \rho F dV + \int_\sigma P_n d\sigma \qquad (Eq.\ 136)$$

where F is the vector of acceleration caused by external forces, $P_n$ the vector of stresses due to action of surface forces at boundary σ.

For our case, equation (Eq. 136) becomes:

$$h_i A_i \frac{\partial}{\partial t}(\rho_\Sigma v_i) + A_i v_i^2 (\rho_g - \rho) = \qquad (Eq.\ 137)$$
$$-h_i A_i \rho_\Sigma g \sin\alpha_i - A_i \frac{f_i h_i^*}{D_i} \frac{\rho_\Sigma v_i^2}{2} - A_i (P^i - P^{iL})$$

where $i_L$ (i) is the index of a node situated to the left from node i, $$\rho_\Sigma = \rho \frac{L}{h_i} + \rho_g \frac{L_g}{h_i}$$

is a total density at the pipe.

According to numbering schema, an index of pipe i coincides with the index of the node at the right side of the node, and taking into account that $$\frac{d\rho_\Sigma}{dt} = \frac{\rho}{h_i}\frac{dL}{dt} - \frac{\rho_g}{h_i}\frac{dL}{dt} = \frac{v}{h_i}(\rho - \rho_g)$$

equation (Eq. 137) becomes $$h_i \rho_\Sigma \dot{v}_i = P^{iL} - P^i - h_i \rho_\Sigma g \sin\alpha_i - \frac{f_i h_i^*}{D_i}\frac{\rho_\Sigma v_i^2}{2} \qquad (Eq.\ 138)$$

It means that the equation for a pipe with moving boundary liquid-gas looks the same as corresponding equation (Eq. 77) for liquid except for density of liquid being replaced with the average total density $\rho_\Sigma$.

For gas flowing along the entire pipe, the equation of motion is slightly different from that of fluid by the presence of additional term $$-\frac{\partial}{\partial x}(\rho_g v^2)$$

in the right hand side in equation (Eq. 139).

$$h_i \rho_g \dot{v}_i = \qquad (Eq.\ 139)$$
$$P^{iL} - P^i - \frac{f_i h_i^*}{D_i}\frac{\rho_g v_i^2}{2} - \rho_g g h_i \sin\alpha_i - \left((\rho_g v^2)^i - (\rho_g v^2)^{iL}\right)$$

There are two ways of formulating the equations for gas. First, a more simple approach uses the assumption that there are no pressure drops along all the parts of mains filled with gas. It is the consequence of considerably low density of gas as compared with that of water. This case can be obtained from equations (Eq. 138), (Eq. 139) by supposing $\rho_g$=0. The last term in (Eq. 139) should also be omitted since there is a minor variation of pressure along a pipe filled with gas. This term becomes significant for fast processes like flow with sonic velocity, shock waves, etc. With account of what was said $h_i \rho_\Sigma \approx L\rho$, and equation of motion (Eq. 138) for a pipe partially filled with liquid is as follows:

$$L\rho \dot{v}_i = P^{iL} - P^i - \frac{f_i h_i^*}{D_i}\frac{L}{h_i}\frac{\rho v_i^2}{2} - \rho g L \sin\alpha_i \qquad (Eq.\ 140)$$

where $h_i^*$ should also be modified considering the fact that only a part of the pipe is filled with liquid.

In particular, if L=0 in (Eq. 140), this equation becomes $$P^i - P^{iL} = 0 \qquad (Eq.\ 141)$$

Equation (Eq. 141) means that the pressure is uniform everywhere in entrapped gas volume. It should be noted that within the second approach, which can be more accurate and more complex, the proposal on uniform gas pressure is not used, as the following equation (Eq. 142) is written for every pipe. This approach has the advantage, that the structure of the solved equations remains the same, i.e., the number of solved differential equations for velocities and algebraic equations for pressures remains constant. Otherwise, the number of solved differential and algebraic equations constantly varies. For example, differential equation (Eq. 140) transforms to algebraic equation (Eq. 141).

$$h_i \rho_\Sigma \dot{v}_i = P^{iL} - P^i - \frac{f_i h_i^*}{D_i}\frac{\rho_\Sigma v_i^2}{2} - \rho_\Sigma g h_i \sin\alpha_i \qquad (Eq.\ 142)$$

Time steps in solution of differential equations have to be taken in such a manner, that formation of new volumes of entrapped gas would coincide with the beginning of the next time step. This enables determination of the initial mass of gas and also its initial pressure and density, which are required for subsequent consideration of gas compression according to equation of state. Thus, the moment of formation of new entrapped gas volume and blocking of a new pipe demands an adjustment of accuracy for the computing of the solution of ordinary differential equations. On each new time step there is a possibility to redefine the structure of solved equations, so it does not create specific problems, besides an increase in the complexity of the program.

For a gas volume with open sprinklers the value of gas pressure in this volume is related to atmospheric pressure $P_\infty$ by formulas (Eq. 80)-(Eq. 81). In any case, for gas volumes with or without open sprinklers, the pressure is determined by instantaneous value of gas mass in this volume and equation of state. Gas mass balance for a particular gas volume with index k is given by differential equation $$\dot{M}_k = -\Sigma m_\alpha \qquad (Eq.\ 143)$$

with the initial condition $$M_k|_{t=t_0} = M_{k0} \qquad (Eq.\ 144)$$

where $\Sigma m_\alpha$ is the sum of all mass flow rates determined by formulas (Eq. 80)-(Eq. 81) for all open sprinklers belonging to k-th isolated volume of gas, $M_{k0}$ is the initial mass of gas in k-th volume at the moment of this volume creation, which is at the moment when this part of system becomes isolated from other gas contained in the system.

At the moment when calculation starts, there is only one such gas volume. It is the volume of the whole system. Further this volume starts to be divided into separate isolated parts, for each of them, equations (Eq. 143) and (Eq. 144) are generated. The position of the boundary fluid-gas, which is known at the initial moment of formation of new isolated volume, can be found at any subsequent moment on the current value of mass of gas $M_k$ in k-th isolated volume, its density, which can be found on the initial pressures and density and a current pressure. The every moment of a new isolated volume formation should be fixed in computing, and then the described above procedure is repeated.

Requirement of mass flow rates balance in a node and differential equation of mass flow rates (Eq. 84) can be modified in view of two-phase nature of medium. In a more simple approach, at which a pressure in particular isolated volume occupied with gas is considered constant, there is no necessity to generate or create the equation (Eq. 84) for nodes connecting three or two pipes completely filled with gas. Such a node is filled with gas, and a continuity equation is not used for a 'gas' node in this approach. Equation (Eq. 84) is generated only in the event if two or three pipes connected by the node filled with fluid. In this case, the node itself is filled with fluid, and equations (Eq. 84) and (Eq. 86) are generated, as described above, for the mass balance of fluid.

Equation (Eq. 87) can be updated for a node filled with liquid. In this case, the condition of mass balance is generated in regard to liquid only. Equation (Eq. 142) in form (Eq. 78) becomes:

$$\frac{h_i}{A_i}\frac{\rho_\Sigma}{\rho}\dot{m}_i = P^iL - P^i - \frac{f_i h_i^*}{D_i}\frac{\rho_\Sigma v_i^2}{2} - \rho_\Sigma g h_i \sin\alpha \qquad (\text{Eq. 145})$$

where $m_i = \rho v_i A_i$.

Neglecting gas density, the following can be derived:

$$\rho_\Sigma h_i \approx \rho L \qquad (\text{Eq. 146})$$

such that the ratio $$\frac{\rho_\Sigma}{\rho}$$

in (Eq. 142) is approximately equal to $$\frac{L}{h_i}$$

Considering the equation (Eq. 146), the equation (Eq. 145) for a pipe partially filled with liquid becomes $$\frac{L_i}{A_i}\dot{m}_i = P^iL - P^i - \frac{f_i h_i^*}{D_i}\frac{\rho_\Sigma v_i^2}{2} - \rho g L_i \sin\alpha_i \qquad (\text{Eq. 147})$$

Hence, equation (Eq. 87) in a more general case becomes $$\frac{A_{i_R}}{h_{i_R}}P^{iR} + \frac{A_{i_U}}{h_{i_U}}P^{iU} - \left(\frac{A_{i_R}}{h_{i_R}} + \frac{A_{i_U}}{h_{i_U}} + \frac{A_i}{h_i}\right)P^i + \frac{A_i}{h_i}P^iL = \qquad (\text{Eq. 148})$$

$$F_i - F_{i_U} - F_{i_R}$$

where instead of symbolic designations of pipes with letters i1, i2, i3 the corresponding values of single index i, $i_R(i)$, $i_U$ were substituted relative to a node.

According to developed numbering schema, the indexes of nodes coincide with indexes of pipes lying to the left of this node. So, instead of using symbolic designations of nodes L, C, R, U in (Eq. 145) the superscripts $i_L(i)$, i, $i_R(i)$, $i_U(i)$ are used. The functions in RHS of equation (Eq. 148) are:

$$F_j = \frac{A_j}{h_j}\left(\frac{f_j h_j^*}{D_j}\frac{\rho|v_j|}{2}v_j + \rho g h_j \sin\alpha_j\right), \; j = i, i_R, i_U \qquad (\text{Eq. 149})$$

An accounting of the number of unknown variables for entrapped volume of gas and the number of equations for their determination should indicate that they are equal. In particular, the unknown variables are mass of gas in volume $M_k$, gas pressure $P_g$, gas density $\rho_g$, and position of interface L.

For their determination the following equations are involved: (a) differential equation (Eq. 143) with initial condition of equation (Eq. 144), (b) mass of gas being represented through volume $M_k$ in equation (Eq. 150), (c) equation of state (Eq. 133) with the initial data $P_{|t=t_0}=P_0$, $\rho_{|t=t_0}=\rho_0$, where the moment $t_0$ is the moment of formation of k-th isolated volume, and equation $\dot{L}=v_i$, or in integrated form of equation (Eq. 151) as follows:

$$M_k = \sum_i \rho_g \frac{\pi D_i^2}{4} L_i \qquad (\text{Eq. 150})$$

$$L_i = v_i(t - t_0) \qquad (\text{Eq. 151})$$

The above four equations can solve the problem of determining the unknown variables in entrapped gas volume. Additionally, there is algebraic equation (Eq. 148) connecting gas pressure $P_R = P_C = P_U = P_g$ with the pressure in the previous node $P_L$. This equation is necessary for determination of $P_L$ in the corresponding momentum equation (Eq. 140) for i-th pipe.

According to the above written equations, each trapped volume of gas is considered to be isolated from other such volumes. If there are open sprinklers in this volume, the gas discharges through them to atmosphere. However, it is necessary to emphasize that according to the given statement of the problem, the flow of closed gas through the border liquid-gas is not provided. It is considered, instead, that the system has such a configuration, that there are no bubbles flowing from entrapped volumes of gas and their subsequent travel along the system. It is believed that the prediction of the emersion of bubbles from closed volumes of gas disposed within inclined pipes under buoyant forces and their subsequent travel along a general pipeline system is extremely difficult. That is, it is believed that the prediction of such flow modes may be solved based on precise assumptions and data obtained for a concrete configuration or for a family of similar configurations of a pipeline system.

In an alternative approach, the assumption of the constant gas pressure in the pipes where there is a gas is not used.

Instead, equation (Eq. 142) is solved for all pipes. In so doing it is necessary to know an effective density $\rho_\Sigma$. For the purpose in their turn, the values of $L_i$ and $\rho_g$ for each instant of time and for all pipes must be determined. Gas density $\rho_g$ is determined from the equation of state:

$$\rho_g^{-(\varepsilon+(1-\varepsilon)\gamma)} = \frac{P_0}{P}\rho_{g0}^{-(\varepsilon+(1-\varepsilon)\gamma)} \quad \text{(Eq. 152)}$$

where values of $P_0$ and $\rho_{g0}$ are registered at the moment of k-th isolated volume creation. At this moment, the existence of the isolated volume of gas, for which the given tube belongs, is divided into two. For definition of $\rho_{g0}$ it is necessary to subdivide the current mass of gas in existing gas volume proportionally to new gas volumes, and originating at the division of this volume in two. Then, during the evolution of the created volume, the current density of gas $\rho_g$ for each pipe belonging to this new volume, is evaluated on the given mean pressure $P=(P^{iL}+P^i)/2$ in the tube according to equation (Eq. 152).

Similar to the first approach, the solution of a system of ordinary differential equations is constructed in such a manner that at the moment of new trapped gas volume creation there is a stop in computation. It happens at the moment when the front of a liquid reaches the new branching node in the system. Following topology of the system the starting pipes of two new volumes connected to this node are known. These are the pipes where the boundaries liquid-gas will be after the computation is resumed. Such pipes should be registered as the ones with two-phase flow. The number of such pipes will constantly increase with time. In pipes registered in the described way, the value of $L_i$ is calculated according to formula $$L_i = \int_0^t v_i dt \quad \text{(Eq. 153)}$$

where $t_0$ is time of creation of the given isolated volume.

The requirement of mass flow rate balance may be replaced with a more common requirement of volume flow rate balance in a node $$A_i v_i = A_{i_R} v_{i_R} + A_{i_U} v_{i_U} \quad \text{(Eq. 154)}$$

For node filled with liquid, the relation (Eq. 154), being multiplied by liquid density, will give a condition of mass flow rate balance for liquid. For gas node, the given condition is equivalent to a requirement of gas mass balance.

For three pipes connected by node i, the equations of motion are as follows:

$$h_i \rho_{\Sigma i} \dot{v}_i = P^{iL} - P^i - F_i,$$

$$h_{i_R} \rho_{\Sigma i_R} \dot{v}_{i_R} = P^i - P^{iR} - F_{i_R},$$

$$h_{i_U} \rho_{\Sigma i_U} \dot{v}_{i_U} = P^i - P^{iU} - F_{i_U}, \quad \text{(Eq. 155)}$$

Substituting equations of motion (Eq. 155) to the volume flow rate balance (Eq. 143), we have an analog of four point equation (Eq. 149) in the following equation:

$$\frac{A_{i_R}}{\rho_{\Sigma i_R} h_{i_R}} P^{iR} + \frac{A_{i_U}}{\rho_{\Sigma i_U} h_{i_U}} P^{iU} - \quad \text{(Eq. 156)}$$

-continued $$\left(\frac{A_{i_R}}{\rho_{\Sigma i_R} h_{i_R}} + \frac{A_{i_U}}{\rho_{\Sigma i_U} h_{i_U}} + \frac{A_i}{\rho_{\Sigma i} h_i}\right) P^i +$$

$$\frac{A_i}{\rho_{\Sigma i} h_i} P^{iL} = \frac{F_i}{\rho_{\Sigma i}} \frac{F_{i_U}}{\rho_{\Sigma i_U}} - \frac{F_{i_R}}{\rho_{\Sigma i_R}}$$

To keep the number of solved differential equations constant, equations (Eq. 143) for the current mass of gas in each isolated volume are replaced with their integral forms. A current mass of gas in the volume is calculated through integral equation:

$$M_k = -\int_0^t \sum m_\alpha dt \quad \text{(Eq. 157)}$$

The current volume of liquid in the system may be obtained from equation $$V_f = \int_{t_1}^t v_1 A_1 dt \quad \text{(Eq. 158)}$$

where $t_1$ is equal to trip time moment. Accordingly, a preferred method has been provided for modeling a dry sprinkler system and develop a system of equations from which one or more time based parameters can be derived and/or determined for the solution of at least the trip time, transit time, and operating time. More specifically, from the set of differential equations the time at which the gas pressure of the system is equal to the trip pressure for the DPV can be identified to define the trip time. From the set of differential equations the time at which the distance between a moving fluid front and an open nozzle, sprinkler head, or other open nodal device decreases down to zero, can be calculated to identify the transit time. From the trip and transit time the water delivery time can be determined. Moreover, through identifying the moment which serves as a starting point from which the fluid pressure at an open nozzle, sprinkler head or other open nodal device for a predefined time period is not less than the specified pressure value, the operating time can be identified.

The preferred computational engines 24 for analysis of a tree-type piping configuration has been verified for accuracy. In order to determine the correlation between actual and modeled systems for a tree-type configuration, at least eight test systems were simulated after the pipe systems constructed by Factory Mutual Research Corporation (FMRC) for purposes of generating experimental data for trip and transit times for various pipe topologies as described in the FMRC Technical Report "*Water-Delay-Time Measurements for Selected Gridded Dry Pipe Sprinkler Systems*," FMRC J.I. 0Z2R5.RS, September 1999 Prepared for the Central Sprinkler Co. (hereinafter "FMRC Report"). Each of the systems is configured with a dry pipe valve, eleven to twelve sprinkler heads with twelve branch lines connected by two cross mains, which are connected by two connection pipes. Details of the configurations, methodology and parameters defining the FMRC experiments are provided in the FMRC Report. For the transit time verification, four test cases, identified as the test cases A4, B4, C4, and an additional test case D4 are described in Table 4. And although eight referential systems were tested with 4-inch and 8-inch risers (A4, B4, C4, D4 and A8, B8, C8 and D8), only four (A4, B4, C4, D4) are described for the sake of brevity.

In particular, the actual test systems are for a 4 in. riser for four different configurations (hereinafter referred to as referential test cases A4, B4, C4, D4 to identify the 4-inch risers in the system) of the above system layout of a tree-type system (i.e., a system having a branch line connected by a single main feed) that were constructed from a grid-type system test apparatus (i.e., cross mains connecting multiple branch pipes), shown here as FIG. 7A, FIG. 13, FIG. 13B and FIG. 13C, respectively. The actual test systems were all constructed in accordance with a "base" tree type system having 12 1¼ in. branch pipes ($b_1, b_2, b_3, b_4, \ldots b_{12}$) and two 4 in. cross-mains ($CM_1$ and $CM_2$). The base system has an array of first through twelve generally parallel branch pipes ($b_1, b_2, b_3, b_4, \ldots b_{12}$) arranged generally on a first horizontal plane located approximately 14 feet and 4 inches above a floor. The first branch line located proximate a first end of the array and a twelfth branch line located proximate the second end of the array. Each of the branch pipes defines a pipe having an internal diameter of approximately 1.25 inches and having a ball valve located proximate at a midpoint of each branch line. The ball valve has an internal diameter of approximately 1.25 inches with a flow coefficient of approximately 120 gpm/psig$^{1/2}$. Branch pipes were spaced 8 ft. 9 in. apart between pipe center lines and located 28 in. above the cross-mains $CM_1$ and $CM_2$, as measured from branch line and cross main center lines. A conversion from the general, grid-type system of the test apparatus to the tree-type system for running the experiments data was accomplished by closing ball valves located on the branch line riser as well as butterfly valve on the Cross Main. A ball valve BV of approximately 1¼ in. diameter was installed on each branch line riser. The K-factor value for the valve was 120 gallon per minute divided by the square root of pound per square inch (gpm/psi$^{1/2}$). The ball valve BV was located 14 in. above the top of the cross main $CM_1$. Ball valves of the same type and size were also installed proximate the midpoint of individual branch pipes.

The first and second cross mains $CM_1$ and $CM_2$ are spaced from the plane and extending in a direction generally orthogonal to the branch pipes. The first and second cross mains are disposed proximate a respective one of the first and second end of the array on a second horizontal plane spaced at approximately 28 inches from the first plane. Each of the cross-mains has an internal diameter of approximately 4 inches and connected to each other by a first connection pipe proximate the first end of the array and by a second connection pipe proximate the second end of the array. The first and second connection pipes have an internal diameter of approximately 4 inches and being elevated above the cross main by approximately 10 inches between a centerline of each of the cross mains to a centerline of each of the connection pipes. Each of the connection pipes has a butterfly valve with a flow coefficient of approximately 630 gpm/psig$^{1/2}$ at each location where the connection pipes are connected to the cross mains. The butterfly valves permit fluid to flow through the connection pipes. Each of the first and second cross mains are connected at a lower surface of the cross main with first, second and third drain pipes of approximately 2 inches in diameter disposed generally perpendicular to the floor. The drain pipes have a first through third respective ball valves bv1 and bv2, each with an internal diameter of approximately 2 inches with a flow coefficient of approximately 120 gpm/psig$^{1/2}$. Each of the ball valves was connected to the drain pipes at a location nearest the floor. For drainage purposes the midpoints of all the branch pipes were made 4 in. higher than the risers. The two cross-mains were connected with two loop mains of the same diameters as the cross mains. Loop mains pipes connect to a Near the Main where System Riser was connected and a Far Main, which runs parallel to Near Main on the other side of branch pipes. Loop mains were elevated above the cross mains by 10 in., as measured from the loop main pipe centerline to cross main pipe centerline. A butterfly valve was installed at each end of the loop mains. The K-factor of the butterfly valve BV was 630 gpm/psi$^{1/2}$. The length of the pipe from the bottom of the cross-mains to the center of the ball valve for the drain pipe near the north-west corner was 10 in. and all others were about 8 ft. Directly over each drain pipe, a section of 1 ft 6 in. long, 2 in. pipe was welded vertically to the top surface of the cross-main. Another piece of 11-in. long 2-in. pipe was connected from above to the 1 ft 6 in. long pipe via a 2-in. ball valve BV. Although the layout provides for exhauster connected to the top of each of the 11-in. long pipes, the exhausters were not modeled by the preferred embodiment. Otherwise, the ball valves above the 1 ft 6 in. long pipes were closed. The system riser R was positioned near the midpoint of the west cross-main. A 4 in. Schedule 10 pipe was used for the system riser.

A plurality of branch line risers connects the first cross main CM1 and the second cross main CM2 to each of the branch pipes. Each of the plurality of branch line risers being connected to the branch line at a position approximately 4 inches lower than a midpoint of each of the branch pipes, and each of the plurality of branch line risers includes a ball valve having an internal diameter of approximately 1.25 inches with a flow coefficient of approximately 120 gpm/psig$^{1/2}$, which was located approximately 14 inches above a top surface of each of the cross-mains CM1 and CM2.

A plurality of upright Central® GB ½ inches sprinkler heads with a K factor of 5.6 gpm/psig$^{1/2}$ was connected to each of the plurality of branch pipes. The sprinkler heads are spaced apart from each other at a distance of approximately 9 feet and 4.5 inches on center to center of the sprinkler heads. A sidewall type sprinkler head functions as a "test" sprinkler. The sidewall test sprinkler head has a K factor of 5.6 gpm/psig$^{1/2}$ and can be placed at the most remote hydraulic location in the system.

The test sprinkler head was connected to a 1.25-inch by 0.5-inch by 0.5 inch reduction Tee with a length of 2.7 inches. The Tee was connected at one end to a Setra Model 205-2 gauge and connected at the second end to a 1.25 inch nipple Schedule 40 with a length of 2.2 inches. The 1.25-inch nipple was connected to a 1.25-inch ASCO® solenoid valve with a length of 3.8 inches on a horizontal plane. The solenoid valve was connected to a 1.25-inch adapter nipple Schedule 40 with a horizontal length of 3.7 inches. The adapter nipple was connected to a first 1.25-inch Victaulic® Style 77 coupling. The Style 77 coupling was connected to a Victaulic® No. 10 90-degree elbow. The elbow was connected to a second 1.25-inch Victaulic® Style 77 coupling and spaced horizontally from the first 1.25-inch coupling by a distance of about 2.8 inches. The second 1.25 inch coupling was connected to the first branch line.

The fluid supply includes a pump that provides a plurality of different water flow rate (in gallons per minute or "gpm") according to one of at least three pressure to flow rate curves ("pressure-flow curves") A, B, and C. The first pressure-flow curve A can be defined as a Cartesian plot connecting nine points on the plot. The first point has values of approximately 107 psig to 200 gpm; the second point of approximately 99 psig to 400 gpm; third point of approximately 92 psig to 600 gpm; fourth point of approximately 82 psig to 800 gpm; fifth point of approximately 72 psig to 1000 gpm; sixth point of approximately 63 psig to 1200 gpm; seventh point of approximately 48 psig to 1400 gpm; eight point of approximately 28 psig to 1600 gpm, ninth point of approximately 6 psig to 1730 gpm. The second pressure-flow rate curve B can be defined as a Cartesian plot connecting seven points on the plot that include a first point of approximately 87 psig to 200 gpm, second point of approximately 63 psig to 400 gpm, third point of approximately 58 psig to 600 gpm, fourth point of approximately 50 psig to 800 gpm, fifth point of approximately 40 psig to 1000 gpm, sixth point of approximately 26 psig to 1200 gpm, seventh point of approximately 8 psig to 1400 gpm. The third pressure-flow rate curve C can be defined as a Cartesian plot connecting five points including a first point of approximately 41 psig to 200 gpm, second point of approximately 37 psig to 400 gpm, third point of approximately 32 psig to 600 gpm, fourth point of approximately 24 psig to 800 gpm, fifth point of approximately 13 psig to 1000 gpm.

The base system includes first and second risers R1 and R2. Each of the risers R1, R2 includes an 8-inch Tee No. 20 Victaulic® connected to an 8-inch diameter Schedule 10 pipe oriented generally perpendicular to the floor via an 8-inch coupling style 77 Victaulic®. The 8-inch pipe was connected to a 8"×6" concentric reducer No. 50 Victaulic® via an 8-inch coupling style 77 Victaulic® and a 6-inch coupling style 77 Victaulic®. The concentric reducer was connected to a 6-inch Model 90 check valve Central®. The check valve was connected to a 6-inch grooved butterfly valve Mech-Line® via two 6-inch couplings style 77 Victaulic®. The butterfly valve was connected to a 6-inch Tee No. 20 Victaulic® via two 6-inch couplings style 77 Victaulic®. The 6-inch Tee was connected to a second 6-inch Tee No. 20 Victaulic® via a 6-inch couplings style 77 Victaulic®. The 6-inch Tee was also connected to a 6" to 4" concentric reducer No. 50 Victaulic® via a 6-inch coupling style 77 Victaulic® and a 4-inch coupling style 77 Victaulic®. The second 6-inch Tee was connected to a supply pipe and spaced at a distance of approximately 126 inches from the centerline of the supply pipe to the center line of the 8-inch Tee. The reducer was connected first to a 4-inch Tee No. 20 Victaulic® and second to a Setra/Gauge assembly. The 4-inch Tee was connected to a 4-inch grooved butterfly valve Mech-Line via two 4-inch couplings style 77 Victaulic®. The 4-inch butterfly valve was connected to a 4-inch Model 90 check valve Central®. The 4-inch check valve was connected a 4-inch Schedule 10 pipe having a length of approximately 97.1 inches oriented generally perpendicular to the floor.

A dry pipe valve with a pressure differential of 5.5 was disposed in fluid communication with the fluid supply and connected to at least one of the first and second risers. The dry pipe valve can be configured in a closed position to prevent fluid communication between the water supply and the riser and in an open position (i.e., a "tripped" position) to permit fluid communication between the water supply and the riser. Finally, each of the test systems was initially filled with pressurized gas prior to the dry pipe valve being tripped.

Referring to FIG. 7A, which shows a wire frame isometric representation of the configuration of the first referential tree system using a 4-inch riser in combination with the base tree type system (hereafter "Tree A4") is shown. In Tree A4, the test sprinkler head SH is located on branch line $b_6$.

Figure 13:
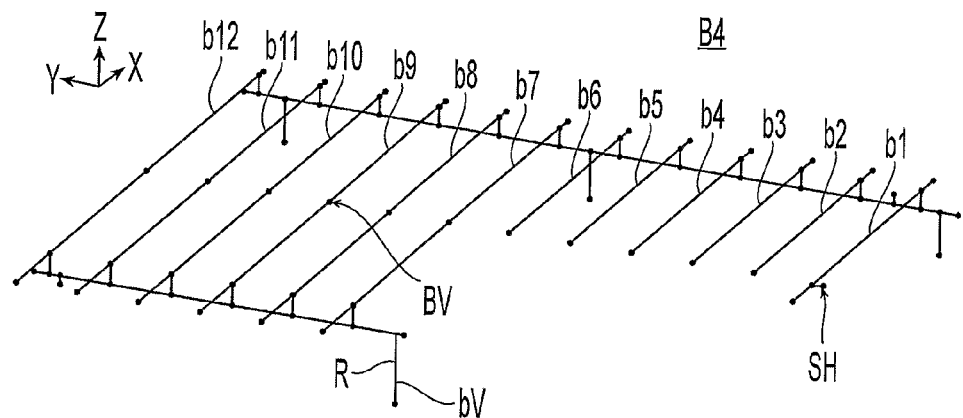
FIG. 13 illustrates a second referential model that can be used to verify the results of the preferred computer-modeling program of FIG. 2 and/or FIG. 2A.

Referring to FIG. 13, which shows a wire frame isometric representation of the configuration of the second referential tree system using a 4-inch riser in combination with the base tree type system (hereafter "Tree B4") is shown. In Tree B4, half of the branch pipes $b_1$-$b_6$ are not connected to cross main CM1 and the test sprinkler head SH is located at branch line $b_1$.

Figure 13A:
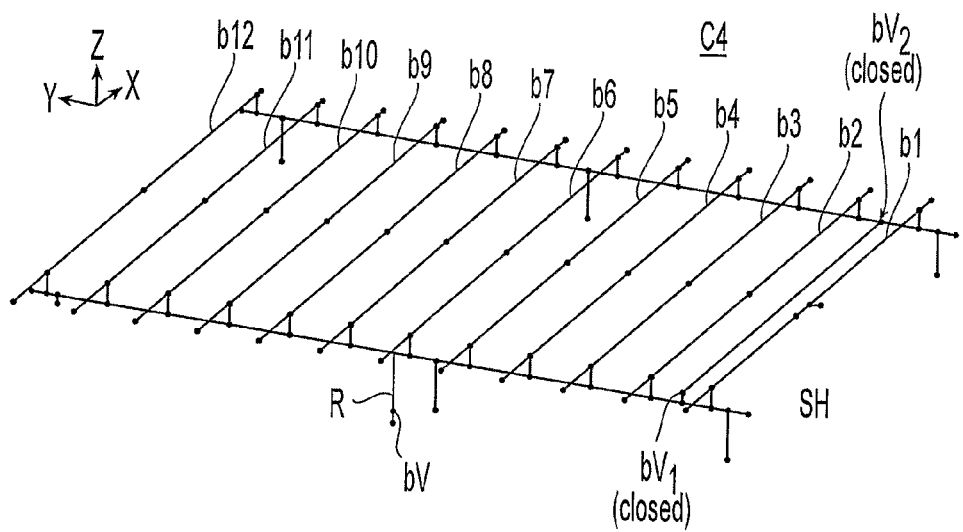
FIG. 13A illustrates a third referential model that can be used to verify the results of the preferred computer-modeling program of FIG. 2 and/or FIG. 2A.

Referring to FIG. 13A, a wire frame isometric representation of the configuration of the third referential tree system using a 4-inch riser in combination with the base tree type system (hereafter "Tree C4") is shown. In Tree C4, all of the branch pipes $b_1$-$b_{12}$ are connected to cross-mains CM1 and CM2 while the test sprinkler head is located at branch line $b_1$. The butterfly valve $bv_1$ is closed while the butterfly valve $bv_2$ is opened.

Figure 13B:
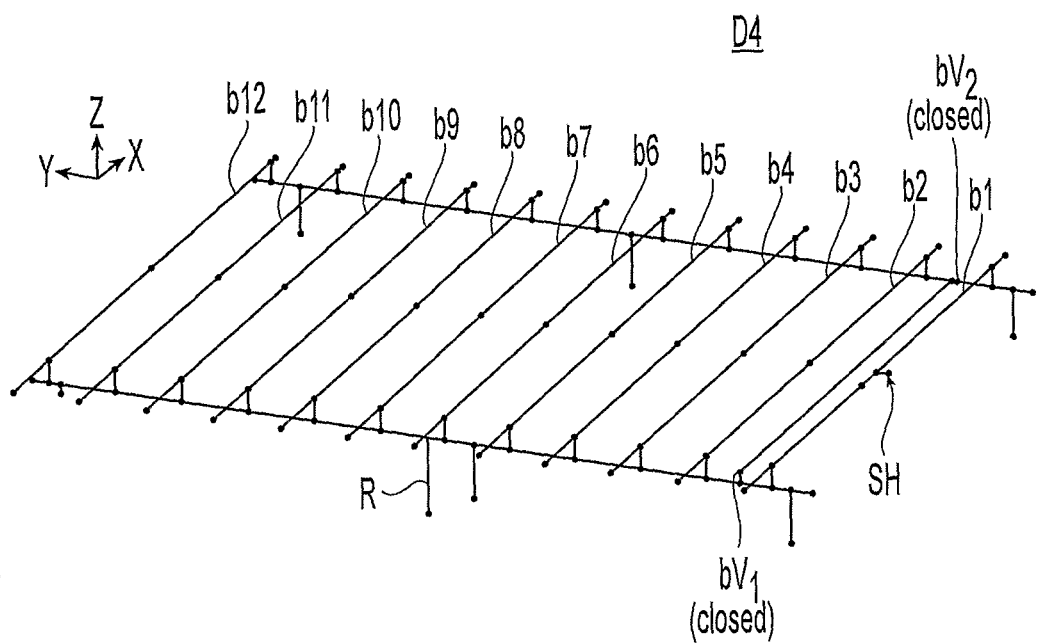
FIG. 13B illustrates a fourth referential model that can be used to verify the results of the preferred computer-modeling program of FIG. 2 and/or FIG. 2A.

Referring to FIG. 13B, which shows a wire frame isometric representation of the configuration of the fourth referential tree system using a 4-inch riser in combination with the base tree type system (hereafter "Tree D4") is shown. In Tree C4, all of the branch pipes $b_1$-$b_{12}$ are connected to cross-mains CM1 and CM2 while the test sprinkler head is located at branch line $b_1$. Both of the butterfly valves $bv_1$ and $bv_2$ are closed.

Tables 3 and 4 compare, respectively, the predicted vs. test values for the dry pipe valve trip time and transit or fluid delay time. The transit time is defined as the sum of the dry pipe valve trip time and transient time. The test data consisted of recorded transit times and dry pipe valve trip times for the test cases described above, where transit and dry pipe valve trip times were typically recorded for three initial system pressures and associated trip pressures (Appendix D). Referring to Table 3, model vs. test dry pipe valve trip times are shown for initial pressures ranging from 10 to 35 psig for the A4, B4 and C4 test cases.

TABLE 3

Dry pipe valve trip time of Model to Measured Data

| Systems | Trip Pressure (psig) | Initial Pressure (psig) | Measured Trip Time, (seconds) | Calculated Trip Time, (seconds) | Percent to Measured |
|---|---|---|---|---|---|
| Tree A4 | 5 | 10 | 20 | 18.53 | 92.65% |
| Tree A4 | 15 | 20 | 14 | 12.10 | 86.43% |
| Tree A4 | 30 | 35 | 9 | 8.24 | 91.56% |
| Tree B4 | 5 | 10 | 13 | 12.57 | 96.69% |
| Tree B4 | 30 | 35 | 6 | 5.59 | 93.17% |
| Tree C4 | 5 | 10 | 20 | 18.66 | 93.30% |
| Tree C4 | 30 | 35 | 9 | 8.30 | 92.22% |

TABLE 4

Transit Time of Model to Measured Data

| Systems | Trip Pressure (psig) | Initial Pressure (psig) | Fluid Supply Pressure (psig) | Supply v. Flow Rate Curve A, B, or C (from FIG. 10 of FMRC Report) | Measured Transit Time, (seconds) | Calculated Transit Time, (seconds) | Percent to Measured |
|---|---|---|---|---|---|---|---|
| Tree A4 | 5 | 10 | 45 | C | 35 | 35.51 | 101.46% |
| Tree A4 | 15 | 20 | 45 | C | 43 | 39.94 | 92.88% |
| Tree A4 | 30 | 35 | 45 | C | 58 | 52.54 | 90.59% |

TABLE 4-continued

Transit Time of Model to Measured Data

| Systems | Trip Pressure (psig) | Initial Pressure (psig) | Fluid Supply Pressure (psig) | Supply v. Flow Rate Curve A, B, or C (from FIG. 10 of FMRC Report) | Measured Transit Time, (seconds) | Calculated Transit Time, (seconds) | Percent to Measured |
|---|---|---|---|---|---|---|---|
| Tree A4 | 5 | 10 | 72 | B | 27 | 27.74 | 102.74% |
| Tree A4 | 15 | 20 | 72 | B | 31 | 30.22 | 97.48% |
| Tree A4 | 30 | 35 | 72 | B | 37 | 35.95 | 97.16% |
| Tree A4 | 5 | 10 | 111 | A | 22 | 22.84 | 103.82% |
| Tree A4 | 15 | 20 | 111 | A | 24 | 24.16 | 100.67% |
| Tree A4 | 30 | 35 | 111 | A | 27 | 27.03 | 100.11% |
| Tree B4 | 5 | 10 | 72 | B | 17 | 17.26 | 101.53% |
| Tree B4 | 30 | 35 | 72 | B | 24 | 22.34 | 93.08% |
| Tree C4 | 5 | 10 | 72 | B | 20 | 20.72 | 103.60% |
| Tree C4 | 30 | 35 | 72 | B | 25 | 24.04 | 96.16% |
| Tree D4 | 5 | 10 | 72 | B | 19 | 19.17 | 100.89% |
| Tree D4 | 30 | 35 | 72 | B | 24 | 23.34 | 97.25% |

Thus, the preferred embodiments allow a user to predict trip and liquid delivery time parameters of a model of an arbitrary design (e.g., prototype or existing) of a tree type piping system topology with a high degree of correlation (i.e., less than ±20%) based on the above comparisons between tested dry pipe systems (e.g., systems A, B, C, and D) and the predicted parameters by the preferred embodiments of these systems.

Moreover, the preferred embodiments can be used to (a) to design a dry pipe system with a capacity greater than 500 gallons without a quick opening device and without having to actually test such dry pipe system to determine whether the system will deliver water to a sprinkler in compliance with actual code requirements; (b) to verify whether an existing dry pipe system of between 501 to 750 gallons would deliver fluid within a desired time duration when local flow conditions are accounted for and when the use of a quick opening device is eliminated; and (c) to modify existing system to pass these tests based on modifications to the existing system design without having to actually test the system with the modifications. These results in the competitive advantage in that the capital outlay for an accurate and verifiable computer modeling would be lower than the cost of physical testing.

The method includes an arbitrary design of a dry pipe fire protection sprinkler system design (with the appropriate size risers, e.g., 4-inch or 8-inch) with a design system capacity of greater than 500 gallons of fluid that does not rely on a quick opening device. The design is converted into a mathematical model by at least one of the preferred embodiments of the computer program. The computer program would predict a liquid delivery time (i.e., trip time and transit time) between an actuation of a dry pipe valve and delivery of fluid at a sprinkler head. That is, the computer program can model the physical attributes of the pipe design as a set of nodes and pipes where the attributes of the nodes represent at least a point of transition from one pipe size to another, elbows or bends, tees and laterals for redirecting, dividing or mixing streams, exit openings or nozzles, sprinkler heads, and exhausters. The attributes of the pipes represent at least a type, size, material, C-factor, absolute roughness of the pipes or pressure loss (valves and valve assemblies) or pressure boost (pumps) parameters. Further, the computer can estimate a time duration for gas pressure in the network to drop below a threshold pressure when the gas is permitted to escape from the network through an open node in the network, approximate a time duration for a fluid front to travel from an initial location in the network to the open node, and determine an approximation of the pressure of the fluid over time as the fluid front travels from the initial location to the open node. If the predicted transit time for the design is less than sixty seconds or any desired threshold value, the computer program can be used to adjust the physical attributes of the design by the user so that the predicted transit duration conforms to a desired duration. When the predicted transition time is within a desired duration (e.g., sixty, fifty, forty five, forty or fifteen seconds depending on the type of hazard classified under NFPA 13 (2002)) and within an acceptable error rate, the design would then be implemented by an actual construction of dry pipe fire sprinkler system based on the design without any necessity for actual testing certification.

The process is also applicable to retrofitting an existing dry pipe sprinkler system to account, for example, to local operating parameters (e.g., pressure, flow), fire pump or to eliminate some components. For example, the existing system would be modeled without the accelerator to determine whether the modeled system would be capable of delivering fluid to a minimum number of hydraulically remote sprinkler(s) at a suitable threshold such as, for example, fifteen seconds or less with one opened sprinkler for residential applications; forty seconds or less with four opened sprinklers for high-piled storage applications; forty-five seconds or less with four opened sprinklers for extra hazard; fifty seconds or less with two opened sprinklers for ordinary storage; and sixty seconds or less with one opened sprinkler for light hazard applications.

Where the model of the existing system would indicate, via the program, that the existing system would fail the test, the user would have an opportunity to modify the model by taking into account local conditions such as, for example, increased pressure and flow rate or the user could modify other parameters of the system to permit the model to comply with the test. Furthermore, by using the preferred embodiments of the program, individuals would be able to determine with a reasonable degree of certainty whether existing systems would pass the transit time test.

The advantages of the preferred embodiments are numerous. Individuals employing the dry pipe sprinkler system are now capable of maximizing the system size based on the available water supply and the geometry of the building to be protected. The preferred embodiments would allow the individuals to examine various options for conformance with installation requirement such as, for example, NFPA 13 (2002 Ed.) prior to establishing a final design and procuring components for the project. In addition, final calculations would confirm the ability of the system to provide water to most remote portion of the sprinkler system within a suitable time. This would eliminate the time, expense, and downsides of actual testing.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A method of analyzing a dry pipe system, the method comprising:
   configuring a model of at least a referential dry pipe system having a wet portion including a liquid source and a dry portion defining a volume of gas; and
   computing fluid flow from the wet portion to the dry portion including flow time from the wet portion to the dry portion, the computing providing verification of the fluid flow time in the model within 20% of an actual fluid flow time of a liquid in the at least one referential dry pipe system.

2. The method of claim 1, wherein configuring the model includes interconnecting a plurality of nodes to define the wet portion and the dry portion, the nodes corresponding to a pipe connector and the interconnection between the nodes corresponding to a pipe device, the configuring further including configuring at least a portion of the nodes in the dry portion to define at least one sprinkler device.

3. The method of claim 2, wherein computing fluid flow includes determining the gas and liquid flow characteristics between at least one pair of nodes including determining gas pressure and gas volume against at least one liquid front so as to define a pipe device partially filled with liquid.

4. The method of claim 2, wherein computing fluid flow includes determining a first liquid front and a second liquid front in the dry portion so as to define at least one pipe device partially filled with liquid including a bubble.

5. The method of claim 2, wherein configuring the model includes configuring at least one pair of nodes in the dry portion as comprising one node being a dead-end of a pipe and wherein the calculating fluid flow comprises calculating gas flow characteristics including gas volume.

6. The method of claim 4, wherein configuring the model includes configuring at least one pair of nodes in the dry portion as comprising one node being open to ambient, and wherein the calculating fluid flow comprises calculating gas flow characteristics including gas volume, the gas volume being determined dynamically relative to the at least one liquid front.

7. The method of claim 2, wherein configuring the model includes interconnecting the plurality of nodes to define at least one loop.

8. The method of claim 7, wherein computing the fluid flow includes determining gas and liquid characteristics of the portion of the system including the at least one loop.

9. The method of claim 2, wherein configuring the model includes configuring at least one of the plurality of pipe devices as a dry pipe valve by one of equivalent pipe length or an array of points defining a pressure loss vs. flow function for the valve.

10. The method of claim 9, wherein configuring the model includes defining the dry pipe valve, including a differential trip ratio.

11. The method of claim 9, wherein configuring the model includes configuring the dry pipe valve coupled to an accelerator having at least one of an accelerator pressure differential and an accelerator fixed time.

12. The method of claim 2, wherein configuring the model includes configuring at least a portion of the nodes of the dry portion to model an exhauster having an opening size, a tripping pressure differential and a closing time.

13. The method of claim 2, wherein configuring the model includes configuring the wet portion as including at least one node modeling a supply of liquid and further defining the supply of liquid by a pressure vs. flow function.

14. The method of claim 13, wherein defining the supply of liquid by pressure vs. flow function such that the function is a polynomial of the flow rate raised in 1.85 power.

15. The method of claim 2, wherein configuring the model includes configuring the wet portion to include a fire pump and further defining the fire pump by a pressure vs. flow function.

16. The method of claim 15, wherein defining the fire pump by a pressure vs. flow function such that the function is a polynomial of the flow rate raised in 1.85 power.

17. The method of claim 2, wherein configuring the model includes configuring at least one interconnection of the wet portion to model a back flow preventer.

18. The method of claim 2, wherein configuring the model includes simulating a sequence of events, the sequence of events including sequencing opening a plurality of nodes so as to simulate sequential opening of the sprinklers in the dry portion.

19. The method of claim 1, wherein configuring the model includes modeling the system as one of a single-interlock preaction system, a double-interlock preaction system, or a non-interlock preaction system.

20. The method of claim 1, wherein configuring the model includes entering in a user interface characteristics of the dry pipe system, the user interface including at least one data entry field to characterize an entity as being one of a pipe, opening device, pipe fitting, valve or pump.

21. The method of claim 1, further comprising displaying the flow of liquid and gas through the model as a graphic display, the graphic display including a real-time animated simulation.

22. The method of claim 21, wherein the displaying includes displaying the model in a reference frame having three orthogonal axes.

23. The method of claim 22, wherein the displaying includes rotating the model about any one of the three axes.

24. The method of claim 1, wherein the computing fluid flow includes generating a system of equations describing a motion of the liquid flow over time in the wet and dry portions and altering the system of equations depending on whether the system is provided with gas interacting with at least one liquid front in any of the pipes in the system.

25. The method of claim 2, wherein computing the fluid flow includes estimating of the time duration of a pressure of the gas to be below a threshold pressure when the gas is permitted to escape from at least one sprinkler device open to ambient.

26. The method of claim 1, wherein configuring the model of the at least referential dry pipe system includes modeling the referential dry pipe system as including a system volume of at least 395 gallons, the dry pipe sprinkler system being initially filled with pressurized gas, the dry pipe system including:
- an array of first through twelfth generally parallel branch pipes arranged generally on a first horizontal plane generally parallel to and above a floor, each of the branch pipes having a ball valve located proximate at a midpoint of each branch line;
- first and second cross mains disposed between the floor and the first plane and extending generally orthogonal to the branch pipes, the cross-mains connected to each other by a first connection pipe and by a second connection pipe, the first and second connection pipes being elevated above the cross mains, each of the connection pipes having a butterfly valve at each location where the connection pipes are connected to the cross mains, each of the first and second cross mains connected at a lower surface of the cross main with first, second and third drain pipes, the drain pipes having a first through third respective ball valve, each of the ball valves connected to the drain pipes;
- a plurality of branch line risers connecting the first cross main and the second cross main to each of the branch pipes, each of the plurality of branch line risers being connected to the respective branch line at a position lower than a midpoint of each of the branch pipes, each of the plurality of branch line risers including a ball valve located above a top surface of each of the cross-mains;
- a plurality of sprinkler heads connected to each of the plurality of branch pipes, the plurality of sprinkler heads being spaced apart from each other;
- a liquid supply having a liquid flow rate corresponding to one of a plurality of pressure to flow rate curves; and
- a dry pipe valve in communication with the liquid supply and connected to at least one of the first and second risers with a pressure differential between the pressure of the liquid in the supply and the pressure of gas in the risers.

27. The method of claim 26, wherein configuring the model of the referential dry pipe system includes modeling the referential dry pipe system including an actual liquid flow time of approximately 58 seconds between a dry pipe valve and a sprinkler, the referential dry pipe system consisting essentially of:
(a) an array of twelve generally parallel branch pipes located approximately 14 feet and 4 inches above a floor, the first branch line proximate a first end of the array and a twelfth branch line proximate the second end of the array, each of the branch pipes defining a pipe having an internal diameter of approximately 1.25 inches, the ball valve having an internal diameter of approximately 1.25 inches with a flow coefficient of approximately 120 gpm/psig$^{1/2}$;
(b) first and second cross mains spaced at approximately 28 inches from the first plane, each of the cross-mains having an internal diameter of approximately 4 inches, the first and second connection pipes having an internal diameter of approximately 4 inches and being elevated above the cross main by approximately 10 inches between a centerline of each of the cross mains to a centerline of each of the connection pipes, the butterfly valve of each of the connection pipe having a flow coefficient of approximately 630 gpm/psig$^{1/2}$ at a location where the connection pipes are connected to the cross mains, the butterfly valves configured in a full flow position, each of the first and second cross mains connected at a lower surface of the cross main with first, second and third drain pipes of approximately 2 inches in diameter disposed generally perpendicular to the floor, the drain pipes having a first through third respective ball valves, each with an internal diameter of approximately 2 inches, each of the ball valves connected to the drain pipes at a location nearest the floor;
(c) each of the plurality of branch line risers being connected to the respective branch line at a position approximately 4 inches lower than a midpoint of each of the branch pipes, each of the plurality of branch line risers including a ball valve having an internal diameter of approximately 1.25 inches with a flow coefficient of approximately 120 gpm/psig$^{1/2}$ and located approximately 14 inches above a top surface of each of the cross-mains;
(d) a plurality of sprinklers including a plurality of upright ½ inches sprinkler heads CENTRAL® GB with a K factor of 5.6 gpm/psig$^{1/2}$ connected to each of the plurality of branch pipes, the plurality of sprinkler heads being spaced apart from each other at a distance of approximately 9 feet and 4.5 inches on center to center of the sprinkler heads, each of the risers including an 8-inch Tee No. 20 VICTAULIC® connected to an 8-inch diameter Schedule 10 pipe oriented generally perpendicular to the floor via an 8-inch coupling style 77 VICTAULIC®, the 8-inch pipe connected to a 8"×6" concentric reducer No. 50 VICTAULIC® via an 8-inch coupling style 77 VICTAULIC® and a 6-inch coupling style 77 VICTAULIC®, the concentric reducer connected to a 6-inch Model 90 check valve CENTRAL®, the check valve connected to a 6-inch grooved butterfly valve MECH-LINE® via two 6-inch couplings style 77 VICTAULIC®, the butterfly valve connected to a 6-inch Tee No. 20 VICTAULIC® via two 6-inch couplings style 77 VICTAULIC®, the 6-inch Tee connected to a second 6-inch Tee No. 20 VICTAULIC® via a 6-inch couplings style 77 VICTAULIC®, the 6-inch Tee also connected to a 6" to 4" concentric reducer No. 50 VICTAULIC® via a 6-inch coupling style 77 VICTAULIC® and a 4-inch coupling style 77 VICTAULIC®, the second 6-inch Tee being connected to a supply pipe being spaced at a distance of approximately 126 inches from the centerline of the supply pipe to the center line of the 8-inch Tee, the reducer being connected first to a 4-inch Tee No. 20 VICTAULIC® and second to a Gauge assembly SETRA®, the 4-inch Tee being connected to a 4-inch grooved butterfly valve MECH-LINE® via two 4-inch couplings style 77 VICTAULIC®, the 4-inch butterfly valve connected to a 4-inch Model 90 check valve CENTRAL®, the 4-inch check valve being connected a 4-inch Schedule 10 pipe having a length of approximately 97.1 inches oriented generally perpendicular to the floor;
(e) a liquid supply having a water flow rate in gallons per minute corresponding to a pressure to flow rate curve defined as a Cartesian plot connecting five points on the plot including a first point of approximately 41 psig to 200 gpm, second point of approximately 37 psig to 400 gpm, third point of approximately 32 psig to 600 gpm, fourth point of approximately 24 psig to 800 gpm, fifth point of approximately 13 psig to 1000 gpm;
(f) the dry pipe valve being configured to open at 30 psig with the initial system gas pressure of 35 psig and the liquid supply pressure at 45 psig at the pressure to flow rate curve;

(g) the sidewall type test sprinkler head having a K factor of 5.6 gpm/psig$^{1/2}$ connected to a 1.25-inch by 0.5-inch by 0.5 inch reduction Tee with a length of 2.7 inches, the Tee connected at one end to a Model 205-2 gauge SETRA® and connected at the second end to a 1.25 inch adapter nipple Schedule 40 with a length of 2.2 inches, the 1.25-inch adapter nipple connected to a 1.25-inch solenoid valve ASCO® with a length of 3.8 inches, the solenoid valve connected to a 1.25-inch nipple Schedule 40 with a length of 3.7 inches, the adapter nipple connected to a first 1.25-inch Style 77 coupling VICTAULIC®, the Style 77 coupling connected to a No. 10 90-degree elbow VICTAULIC®, the elbow connected to a second 1.25-inch Style 77 coupling VICTAULIC® and spaced from the first 1.25-inch coupling by a distance generally parallel to the floor of about 2.8 inches, the second 1.25 inch couplings connected to the first branch line.

28. The method of claim 1, wherein computing fluid flow includes verifying the liquid delivery time of the model of the referential dry pipe system is within 10% of the actual liquid flow time for the referential dry pipe system.

29. The method of claim 1, wherein configuring the model includes configuring the system to include at least one of a plurality of piping mains, plurality of piping branches, plurality of sprigs, plurality of drops, and any combination thereof such that the piping system includes at least 2000 pipes.

30. The method of claim 1, wherein configuring the model includes defining the system to have at least one of an opening device diameter ranging from about 0.25 cm to about 2.5 cm, a branch line diameter ranging from about 5 cm. to about 8 cm.; a branch line length ranging from about 20 m. to about 45 m., a cross main diameter ranging from about 10 cm. to about 16 cm.; a cross main length ranging from about 15 m. to about 90 m., a riser nipple diameter ranging from about 5 cm. to about 8 cm.; a riser nipple length up to about 1.2 m; a feed main length ranging from about 10 cm. to about 25 cm.; a feed main length of about 5 m. to about 50 m.; a drops/sprigs diameter of about 1.2 cm. to about 3.8 cm; a drops/sprigs length of about 30 cm. to about 60 cm.; a water pressure up to about 11 atm.; an initial gas pressure ranging from about 1.7 to about 4 atm.; and a DPV trip pressure ranging from about 1.35 atm. to about 3.1 atm.

31. A computer program embodied as a computer readable program on a computer readable medium for analyzing models of dry pipe systems comprising:
a user interface;
a model generator in communication with the user interface, the model generator being configured to define a model of at least a referential dry pipe system, the model including a plurality of interconnected nodes, the nodes corresponding to a pipe connector, the interconnection between the nodes corresponding to a pipe device, the plurality of nodes defining a dry portion and a wet portion, the wet portion including a liquid source, the dry portion including a plurality of interconnected pipes to define a volume of gas, at least a portion of the nodes in the dry portion defining at least one sprinkler device; and
a computational engine being configured to simulate the liquid flowing from the wet portion to the dry portion to determine gas and liquid flow characteristics of the gas and the liquid through the pipes, so as to determine at least flow time of the liquid from the wet portion to the at least one sprinkler device, the computational engine providing a verification of the liquid flow time in the model within 20% of an actual flow time of the liquid in the at least one referential dry pipe system.

32. The computer program product of claim 31, wherein the computational engine is configured to determine the gas and liquid flow characteristics between at least one pair of nodes, the characteristics including gas pressure and gas volume against at least one liquid front so as to define a pipe partially filled with liquid.

33. The computer program product of claim 32, wherein the at least one liquid front comprises a first liquid front and a second liquid front such that the pipe partially filled with liquid includes a bubble.

34. The computer program product of claim 32, wherein the at least one pair of nodes comprise one node being a dead-end of a pipe and wherein further the gas flow characteristics include the gas volume as a function of time as the liquid flows from the wet portion to the dry portion.

35. The computer program product of claim 33, wherein the at least one pair of nodes comprise one node being opened to ambient, the gas flow characteristics including gas volume, the gas volume being determined dynamically relative to at least one liquid flow front.

36. The computer program product of claim 31, wherein the plurality of interconnected pipes define at least one loop.

37. The computer program product of claim 36, wherein the computational engine is configured to determine gas and liquid characteristics in a portion of the system including the at least one loop.

38. The computer program product of claim 31, wherein at least one of the plurality of pipes models a dry pipe valve by one of equivalent pipe length or an array of points defining a pressure loss vs. flow function for the valve.

39. The computer program product of claim 38, wherein the dry pipe valve includes a differential trip ratio.

40. The computer program product of claim 38, wherein the dry pipe valve includes an accelerator having at least one of an accelerator pressure differential and an accelerator fixed time.

41. The computer program product of claim 31, wherein at least one node of the dry portion models an exhauster having an opening size, a tripping pressure and a closing time.

42. The computer program product of claim 31, wherein at least one node modeling the supply of liquid defines the supply of liquid by pressure vs. flow function.

43. The computer program product of claim 42, wherein the function is a polynomial of the flow rate raised in 1.85 power.

44. The computer program product of claim 31, wherein the wet portion includes at least one interconnection configured to model a fire pump by a pressure vs. flow function.

45. The computer program product of claim 44, wherein the function is a polynomial of the flow rate raised in 1.85 power.

46. The computer program product of claim 31, wherein the wet portion includes at least one interconnection to model a back flow preventer.

47. The computer program product of claim 31, wherein the computational engine includes a sequencer to simulate a sequence of events, the sequence of events including sequencing opening a plurality of nodes so as to simulate sequential opening of the nodal devices in the dry pipe system.

48. The computer program product of claim 31, wherein the computational engine is configured to model a single-interlock preaction system, a double-interlock preaction system, or a non-interlock preaction system.

49. The computer program product of claim 31, wherein the user interface is configured for entering characteristics of the dry pipe system, the user interface including at least one data entry field to characterize an entity as being one of a pipe, opening device, pipe fitting, valve or pump.

50. The computer program product of claim 31, wherein the computer program is accessed by a computer processing device having a display device coupled to the computational engine and the model generator to generate a graphic display of the flow of liquid and gas through the model dry system, wherein the graphic display is a real-time animated simulation.

51. The computer program product of claim 50, wherein the computational engine and the model generator display the model in a reference frame having three orthogonal axes.

52. The computer program product of claim 51, wherein the computational engine and the model generator can rotate the model about any one of the three axes.

53. The computer program product of claim 31, wherein the computational engine is provided with a system of equations describing a motion of the liquid fronts over time in at least one of the wet and dry portions and configured to alter the system of equations depending on whether the system is provided with gas interacting with the liquid fronts in any pipe in the system such that, when the computational engine is embodied in a computer, the engine provides data for a graphical display of the time duration for liquid to flow through the system and, additionally, an estimate of a time duration for gas pressure in the network to drop below a threshold pressure defined as a preset ratio of a pressure of the liquid to the pressure of the gas when the gas is permitted to escape from the network through an open node in the network.

54. The computer program product of claim 31, wherein the gas flow characteristics include an estimate of the time duration of a pressure of the gas to be depleted down to a threshold pressure when the gas is permitted to escape from a set of the nodes open to ambient.

55. The computer program product of claim 31, wherein the modeled system is a referential dry pipe system having a system volume of at least 395 gallons, the dry pipe sprinkler system being initially filled with pressurized gas, the referential dry pipe system including:

an array of first through twelfth generally parallel branch pipes arranged generally on a first horizontal plane generally parallel to and above a floor, each of the branch pipes having a ball valve located proximate at a midpoint of each branch line;

first and second cross mains disposed between the floor and the first plane and extending generally orthogonal to the branch pipes, the cross-mains connected to each other by a first connection pipe and by a second connection pipe, the first and second connection pipes being elevated above the cross mains, each of the connection pipes having a butterfly valve at each location where the connection pipes are connected to the cross mains, each of the first and second cross mains connected at a lower surface of the cross main with first, second and third drain pipes, the drain pipes having a first through third respective ball valves, each of the ball valves connected to the drain pipes;

a plurality of branch line risers connecting the first cross main and the second cross main to each of the branch pipes, each of the plurality of branch line risers being connected to the respective branch line at a position lower than a midpoint of each of the branch pipes, each of the plurality of branch line risers including a ball valve located above a top surface of each of the cross-mains;

a plurality of sprinkler heads connected to each of the plurality of branch pipes, the plurality of sprinkler heads being spaced apart from each other;

a liquid supply having a liquid flow rate corresponding to one of a plurality of pressure to flow rate curves; and a dry pipe valve in communication with the liquid supply and connected to at least one of the first and second risers with a pressure differential between the pressure of the liquid in the supply and the pressure of gas in the risers.

56. The computer program product of claim 31, wherein the modeled system is a referential tree-type dry pipe system having an actual liquid flow time of approximately 58 seconds between a dry pipe valve and a sprinkler, the referential dry pipe system consisting essentially of:

(a) an array of twelve generally parallel branch pipes located approximately 14 feet and 4 inches above a floor, the first branch line proximate a first end of the array and a twelfth branch line proximate the second end of the array, each of the branch pipes defining a pipe having an internal diameter of approximately 1.25 inches, the ball valve having an internal diameter of approximately 1.25 inches with a flow coefficient of approximately 120 $gpm/psig^{1/2}$;

(b) first and second cross mains spaced at approximately 28 inches from the first plane, each of the cross-mains having an internal diameter of approximately 4 inches, the first and second connection pipes having an internal diameter of approximately 4 inches and being elevated above the cross main by approximately 10 inches between a centerline of each of the cross mains to a centerline of each of the connection pipes, the butterfly valve of each of the connection pipe having a flow coefficient of approximately 630 $gpm/psig^{1/2}$ at a location where the connection pipes are connected to the cross mains, the butterfly valves configured in a full flow position, each of the first and second cross mains connected at a lower surface of the cross main with first, second and third drain pipes of approximately 2 inches in diameter disposed generally perpendicular to the floor, the drain pipes having a first through third respective ball valves, each with an internal diameter of approximately 2 inches, each of the ball valves connected to the drain pipes at a location nearest the floor;

(c) each of the plurality of branch line risers being connected to the respective branch line at a position approximately 4 inches lower than a midpoint of each of the branch pipes, each of the plurality of branch line risers including a ball valve having an internal diameter of approximately 1.25 inches with a flow coefficient of approximately 120 $gpm/psig^{1/2}$ and located approximately 14 inches above a top surface of each of the cross-mains;

(d) a plurality of sprinklers including a plurality of upright ½ inches sprinkler heads CENTRALS® GB with a K factor of 5.6 $gpm/psig^{1/2}$ connected to each of the plurality of branch pipes, the plurality of sprinkler heads being spaced apart from each other at a distance of approximately 9 feet and 4.5 inches on center to center of the sprinkler heads, each of the risers including an 8-inch Tee No. 20 VICTAULIC® connected to an 8-inch diameter Schedule 10 pipe oriented generally perpendicular to the floor via an 8-inch coupling style 77 VICTAULIC®, the 8-inch pipe connected to a 8"×6" concentric reducer No. 50 VICTAULIC® via an 8-inch coupling style 77 VICTAULIC® and a 6-inch coupling style 77 VICTAULIC®, the concentric reducer connected to a 6-inch Model 90 check valve CENTRAL®, the check valve connected to a 6-inch grooved butterfly valve MECH-LINE® via two 6-inch couplings style 77 VICTAULIC®, the butterfly valve connected to a 6-inch Tee No. 20 VICTAULIC® via two 6-inch couplings style 77 VICTAULIC®, the 6-inch Tee connected to a second 6-inch Tee No. 20 VICTAULIC® via a 6-inch couplings style 77 VICTAULIC®, the 6-inch Tee also connected to a 6" to 4" concentric reducer No. 50 VICTAULIC® via a 6-inch coupling style 77 VICTAULIC® and a 4-inch coupling style 77 VICTAULIC®, the second 6-inch Tee being connected to a supply pipe being spaced at a distance of approximately 126 inches from the centerline of the supply pipe to the center line of the 8-inch Tee, the reducer being connected first to a 4-inch Tee No. 20 VICTAULIC® and second to a Gauge assembly SETRA®, the 4-inch Tee being connected to a 4-inch grooved butterfly valve MECH-LINE® via two 4-inch couplings style 77 VICTAULIC®, the 4-inch butterfly valve connected to a 4-inch Model 90 check valve CENTRAL®, the 4-inch check valve being connected a 4-inch Schedule 10 pipe having a length of approximately 97.1 inches oriented generally perpendicular to the floor;

(e) a liquid supply having a water flow rate in gallons per minute corresponding to a pressure to flow rate curve defined as a Cartesian plot connecting five points on the plot including a first point of approximately 41 psig to 200 gpm, second point of approximately 37 psig to 400 gpm, third point of approximately 32 psig to 600 gpm, fourth point of approximately 24 psig to 800 gpm, fifth point of approximately 13 psig to 1000 gpm;

(f) the dry pipe valve being configured to open at 30 psig with the initial system gas pressure of 35 psig and the liquid supply pressure at 45 psig at the pressure to flow rate curve;

(g) the sidewall type test sprinkler head having a K factor of 5.6 gpm/psig$^{1/2}$ connected to a 1.25-inch by 0.5-inch by 0.5 inch reduction Tee with a length of 2.7 inches, the Tee connected at one end to a Model 205-2 gauge SETRA® and connected at the second end to a 1.25 inch adapter nipple Schedule 40 with a length of 2.2 inches, the 1.25-inch adapter nipple connected to a 1.25-inch solenoid valve ASCO® with a length of 3.8 inches, the solenoid valve connected to a 1.25-inch adapter nipple Schedule 40 with a length of 3.7 inches, the adapter nipple connected to a first 1.25-inch Style 77 coupling VICTAULIC®, the Style 77 coupling connected to a No. 10 90-degree elbow VICTAULIC®, the elbow connected to a second 1.25-inch Style 77 coupling VICTAULIC® and spaced from the first 1.25-inch coupling by a distance generally parallel to the floor of about 2.8 inches, the second 1.25 inch coupling connected to the first branch line.

57. The computer program product of claim 56, wherein the verification of liquid delivery time of the model of the referential dry pipe system is within 10% of the actual liquid flow time for the referential dry pipe system.

58. The computer program product of claim 31, wherein the non-transitory computer readable storage media comprises: a computer disc, CD-ROM, hard disk, or centralized server.

59. A method for use in a design of a piping system having a wet portion and a dry portion, the method comprising:
modeling the piping system including defining a time sequence of activation for a plurality of nodal devices located in the dry portion; and
generating at least a time based characteristic of at least one of liquid and gas flow through the piping system based upon the time sequence, the liquid flowing from the wet portion to the plurality of activated nodal devices.

60. The method of claim 59, wherein defining the time sequence for each of a plurality of nodal devices includes defining a first moment in time when a first nodal device opens and at least a second moment in time delayed relative to the first moment in time when a second nodal device opens.

61. The method of claim 59, wherein modeling includes defining a moment in time when a dry pipe valve is activated and further defining the time sequence relative to the moment in time when the dry pipe valve is activated.

62. The method of claim 59, wherein the modeling includes defining the plurality of nodal devices as comprising a plurality of sprinkler heads.

63. The method of claim 59, wherein the modeling includes defining the piping system so that the piping system comprises at least one of a plurality of piping mains, plurality of piping branches, plurality of sprigs, plurality of drops, and any combination thereof such that the piping system includes at least 2000 pipes.

64. The method of claim 59, wherein the modeling includes defining the piping system so that the piping system defines at least one of an opening device diameter ranging from about 0.25 cm to about 2.5 cm, a branch line diameter ranging from about 5 cm. to about 8 cm.; a branch line length ranging from about 20 m. to about 45 m., a cross main diameter ranging from about 10 cm. to about 16 cm.; a cross main length ranging from about 15 m. to about 90 m., a riser nipple diameter ranging from about 5 cm. to about 8 cm.; a riser nipple length up to about 1.2 m; a feed main length ranging from about 10 cm. to about 25 cm.; a feed main length of about 5 m. to about 50 m.; a drops/sprigs diameter of about 1.2 cm. to about 3.8 cm; a drops/sprigs length of about 30 cm. to about 60 cm.; a water pressure up to about 11 atm.; an initial gas pressure ranging from about 1.7 to about 4 atm.; and a DPV trip pressure ranging from about 1.35 atm. to about 3.1 atm.

* * * * *

UNITED STATES PATENT AND TRADEMARK OFFICE
CERTIFICATE OF CORRECTION

PATENT NO. : 8,612,189 B2  Page 1 of 1
APPLICATION NO. : 12/089034
DATED : December 17, 2013
INVENTOR(S) : Golinveaux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1618 days.

Signed and Sealed this
Twenty-second Day of September, 2015

Michelle K. Lee
*Director of the United States Patent and Trademark Office*